(12) United States Patent
Yan et al.

(10) Patent No.: US 10,572,640 B2
(45) Date of Patent: Feb. 25, 2020

(54) SYSTEM FOR IDENTITY VERIFICATION

(71) Applicant: Personnus, Bainbridge Island, WA (US)

(72) Inventors: Samuel Yan, San Ramon, CA (US); S. Keith Muma, Bainbridge Island, WA (US); Richard Huang, San Ramon, CA (US); Dan Alan Preston, Bainbridge Island, WA (US); Trinitie Marie Vance, Tahuya, WA (US)

(73) Assignee: Personnus, Bainbridge Island, WA (US)

( * ) Notice: Subject to any disclaimer, the term of this patent is extended or adjusted under 35 U.S.C. 154(b) by 513 days.

(21) Appl. No.: 15/353,584

(22) Filed: Nov. 16, 2016

(65) Prior Publication Data

US 2017/0140141 A1 May 18, 2017

Related U.S. Application Data

(60) Provisional application No. 62/255,973, filed on Nov. 16, 2015.

(51) Int. Cl.
| | |
|---|---|
| *G06F 21/32* | (2013.01) |
| *G06F 21/31* | (2013.01) |
| *G06F 17/30* | (2006.01) |
| *H04L 29/08* | (2006.01) |
| *H04L 29/06* | (2006.01) |

(52) U.S. Cl.
CPC .......... *G06F 21/32* (2013.01); *G06F 21/316* (2013.01); *H04L 63/0861* (2013.01); *H04L 67/22* (2013.01)

(58) Field of Classification Search
CPC ... G06F 21/32; G06F 21/316; H04L 63/0861; H04L 67/22; H04W 12/06; H04W 12/00508
See application file for complete search history.

(56) References Cited

U.S. PATENT DOCUMENTS

| | | | |
|---|---|---|---|
| 9,147,117 B1* | 9/2015 | Madhu | H04L 63/0861 |
| 2010/0106558 A1* | 4/2010 | Li | G06F 21/316 |
| | | | 705/317 |
| 2011/0148633 A1* | 6/2011 | Kohlenberg | G06F 21/30 |
| | | | 340/541 |

(Continued)

*Primary Examiner* — Joseph P Hirl
*Assistant Examiner* — Thomas A Gyorfi
(74) *Attorney, Agent, or Firm* — Athorus, PLLC

(57) ABSTRACT

A system for a dynamically evolving cognitive architecture for the development of a secure key and confidence level based data derived from biometric sensors and a user's behavioral activities. The system comprises one or more processors, one or more sensors, one or more databases, and non-transitory computer readable memory. The non-transitory computer readable memory comprises a plurality of executable instructions wherein the instructions, when executed by the one or more processors, cause the one or more processors to process operations comprising creating a set of policies based on user data sets and inputs, creating a faceted classification, establishing a Trust Level, processing sensor data, comparing data to one or more databases, correlating data, updating Trust Levels, updating security keys, and storing the keys in memory. In certain embodiments, the stored data is used to create a usage schema independent from a user's actual identity.

26 Claims, 30 Drawing Sheets

(56) References Cited

U.S. PATENT DOCUMENTS

| | | | |
|---|---|---|---|
| 2012/0151553 A1* | 6/2012 | Burgess | G06F 21/00 726/1 |
| 2014/0289828 A1* | 9/2014 | Gross | A63F 13/12 726/6 |
| 2014/0317726 A1* | 10/2014 | Turgeman | G06F 21/32 726/19 |
| 2015/0294097 A1* | 10/2015 | Ramachandran | G06F 21/32 726/28 |

* cited by examiner

Identity Facet 240

| Permanent Factors 410 | Biometrics 420 | Long Term Factors 430 | Password Index 440 |
|---|---|---|---|
| Device Affinity Index 450 | Professional Social Media 460 | Abstract Index 465 | Multi Factor Identity Index 470 |

SYSTEM FOR IDENTITY VERIFICATION

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto and All Rights Reserved.

CROSS-REFERENCE TO RELATED APPLICATIONS

The following related applications are expressly incorporated by reference in their entirety: Provisional application 62/255,973, filed Nov. 16, 2015, entitled System and Method for Modeling Human Behavior for Use in Identity Verification and Authentication Software, to which the present application claims priority.

TECHNICAL FIELD OF THE INVENTION

This disclosure relates generally to statistical modeling and analysis of human behavior for use in identity verification and authentication software.

BACKGROUND OF THE INVENTION

The widespread use of the Internet and computing/communication devices has led to an explosive growth in the electronic dissemination of information. However, verifiable control over the recipient(s) of secure information remains an important issue in the field of cyber security. Moreover, recipients of information can also become sources of sensitive information where real time knowledge of the identity of such a source can be an important security issue. An example of this situation is knowledge of the identity of an individual entering credit card (or other account) information during the process of making an online purchase. Present-day techniques commonly used to remotely identify the recipients or sources of secure information are readily susceptible to deception. In the United States, identity theft affects approximately fifteen million individuals each year with an estimated financial impact of $50 billion. Additionally, it has been noted by the security industry the average cost of a data breach per organization is now $3.79 million, a cost which has risen annually. New research suggests the global cost of a data breach may reach $2.1 trillion by 2019. The global cost estimate is set to increase almost four times the estimated cost for 2015 and the average cost per organization is expected to exceed $150 million by 2020.

According to the research, the increase in data breach costs are associated with the rapid digitization of consumer and enterprise records, driving an increase in cybercrime. In the past year, the "cybercrime as business" model has become more commonplace, with more off-the-shelf products and large cybercrime organizations driving attacks for corporate data. The research suggests that the majority of these breaches will come from existing information technology (IT) and network infrastructure, including mobile devices, connected devices, smart devices, buildings embedded with electronics, software, sensors, actuators, and network connectivity that enables these objects to collect and exchange data.

Further complicating this is the rapid evolution of how a user interacts with the Internet and services available coupled with internet fraud and user identity theft of compromise. New methods of nonrepudiation (e.g. acceptance by having authority) need to be developed and implemented. In a general sense, nonrepudiation involves associating actions or changes to a unique individual. In a secure facility, for example, nonrepudiation would be violated if it were not also a strictly enforced policy to prohibit sharing of the key cards and to immediately report lost or stolen cards. Otherwise determining who performed the action of opening the door cannot be accurately determined. Similarly, for computer accounts, the individual owner of the account must not allow others to use that account, especially, for instance, by giving away their account's password, and a policy should be implemented to enforce this. This prevents the owner of the account from denying actions performed by the account.

Regarding digital security, the cryptological meaning and application of nonrepudiation shifts to mean:

a. A service that provides proof of the integrity and origin of data.

b. An authentication that can be asserted to be genuine with high assurance.

Proof of data integrity is typically the easiest of these requirements to accomplish. A data hash, such as SHA-2, is usually sufficient to establish that the likelihood of data being undetectably changed is extremely low. Even with this safeguard, it is still possible to tamper with data in transit, either through a man-in-the-middle attack or phishing. Due to this flaw, data integrity is best asserted when the recipient already possesses the necessary verification information. The most common method of asserting the digital origin of data is through digital certificates, a form of public key infrastructure, to which digital signatures belong. Note that the public key scheme is generally not used for encryption in this form. Confidentiality is not achieved by signing a message with a private key (since anyone can obtain the public key to reverse the signature). Verifying the digital origin means that the certified/signed data can be, with reasonable certainty, trusted to be from somebody who possesses the private key corresponding to the signing certificate. If the key is not properly safeguarded by the original owner, digital forgery can become a major concern.

To solve these problems, there is a need to re-think system architectures and roles with a specific view on data security and nonrepudiation of a user's electronic signature (e.g. password), where the authenticity of the signature is being challenged. Systems and methods are disclosed for providing a Persona Credential Engine (PCE) that may be used to eliminate tedious and insecure authentication procedures, such as typing in passwords. The PCE may empower a user to be conveniently authenticated via one or more Facets to achieve any kind of logical or physical access to a device or devices, restricted area, or other such place or thing requiring identity authentication for access. The Persona Credential Engine in some embodiments is multi-dimensional and dynamic. In some embodiments one or more elements of the key change constantly rendering the key nearly impossible to crack mathematically. Normal uses of cryptography may apply; however, the system is further safe-guarded in the fact that credentials in some embodiments are never static for long periods of time.

So as to reduce the complexity and length of the Detailed Specification, and to fully establish the state of the art in certain areas of technology, Applicant(s) herein expressly incorporate(s) by reference all of the following materials identified in each numbered paragraph below. The incorporated materials are not necessarily "prior art" and Applicant(s) expressly reserve(s) the right to swear behind any of the incorporated materials.

System and Method for Modeling Human Behavior for Use in Identity Verification and Authentication Software, Ser. No. 62/255,973 filed Nov. 16, 2015, which is herein incorporated by reference in its entirety.

Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

DESCRIPTION OF RELATED ART

In a discussion of prior art, U.S. patent application Ser. No. 13/907,421 filed May 31, 2013, titled METHOD AND APPARATUS FOR PROVIDING MULTI-SENSOR MULTI-FACTOR IDENTITY VERIFICATION, generally describes an approach for multi-sensor multi-factor identity verification. An identity verification platform determines biometric data associated with a user from one or more sources. The one or more sources are associated with one or more respective network sessions. The platform generates one or more respective trust scores for the one or more sources, the one or more respective network sessions, or a combination thereof based on one or more contextual parameters associated with the user, the one or more sources, the one or more respective network sessions, or a combination thereof. Then the platform verifies an identity of the user based on the biometric data and the one or more respective trust scores. What this application does not disclose is trust level decaying with time.

In a discussion of prior art, U.S. Pat. No. 6,554,705 issued Apr. 29, 2003, titled PASSIVE BIOMETRIC CUSTOMER IDENTIFICATION AND TRACKING SYSTEM, generally describes a computer-based customer tracking system uses a passive biometric identification for identifying customers. Neither the customer, nor any establishment personnel, is required to enter any informational data with respect to the customer; identification is done completely biometrically. Biometric identification information is sent to a central computer processor, which searches files in a library for matching biometric data. If no match is found, the processor opens a new file in the library, assigning a code or identification number to the file. Information with respect to the customer's biometric data, along with any transactional information, is stored in the file. If prior activity information stored in the file exceeds a predetermined level, information with respect to the customer's prior activity is retrieved from the file and sent to a terminal, preferably at the location of the transaction. Any new information from the transaction is then sent to the processor and stored for future access. The processor scans the files periodically, and deletes files for which the activity level in the file is below a certain predetermined level over a preselected time period. Deletion of inactive files precludes the processor memory from being overloaded with information which is not useful to the establishment, and also reduces the amount of time necessary for the processor to search library files for biometric matches. What this patent does not disclose is use of individual identifying mechanisms other than biometrics. Additionally this patent has a simplistic trust degradation scheme in which data is removed entirely from the history once activity falls below a certain threshold. Further, this patent did not disclose a user-based system for personal authentication rather than for use by an establishment to track general user trends and other information useful to sales and marketing.

In a discussion of prior art, U.S. Pat. No. 8,892,697 issued Nov. 18, 2014, titled SYSTEM AND DIGITAL TOKEN FOR PERSONAL IDENTITY VERIFICATION, generally describes a system and a digital token for user identity verification comprise a control device for communicating over a network. The control device executes program applications and displays outputs to a user. A server communicates over the network to the control device and to other devices. The server comprises a personal identity model, a personal identity engine and a personal identity controller. The personal identity model collects and stores user information comprising personal information, personality, and biometric information. The personal identity engine processes the stored user information to produce the digital token. The personal identity controller manages exchange of the digital token in a user identity verification process. A claim point exchanges the digital token with the server in the user identity verification process in which upon verification the user's identity, the claim point provides a service to the user. What this patent does not disclose is a passive identity verification method which involves little to no user input, a near frictionless identity verification scheme, and trust levels.

What is needed is a dynamic, comprehensive, highly passive identity verification system. Within this goal, Trust Levels may decay with time as well as be affected by events to provide more accurate and stronger Trust Levels. Trust Levels for various Facets need to be weighted differently according to importance and strength to further increase reliability of the system.

Aspects and applications presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the systems, methods, processes, and/or apparatuses disclosed herein. To the contrary, if the provisions of 35 U.S.C. § 112, ¶6 are sought to be invoked to define the embodiments, the claims will specifically and expressly state the exact phrases "means for" or "step for, and will also recite the word "function" (i.e., will state "means for performing the function of . . . "), without also reciting in such phrases any structure, material or act in support of the function. Thus, even when the claims recite a "means for performing the function of . . . " or "step for performing the function of . . . ", if the claims also recite any structure, material or acts in support of that means or step, or that perform the recited function, then it is the clear intention of the inventors not to invoke the provisions of 35 U.S.C. § 112, ¶6. Moreover, even if the provisions of 35 U.S.C. § 112, ¶6 are invoked to define the claimed embodiments, it is intended that the embodiments not be limited only to the specific structure, material or acts that are described in the preferred embodiments, but in addition, include any and all structures, materials or acts that perform the claimed function as described in alternative embodiments or forms, or that are well known present or later-developed, equivalent structures, material or acts for performing the claimed function.

BRIEF DESCRIPTION OF THE DRAWINGS

A more complete understanding of the systems, methods, processes, and/or apparatuses disclosed herein may be derived by referring to the detailed description when considered in connection with the following illustrative figures. In the figures, like-reference numbers refer to like-elements or acts throughout the figures.

FIG. 22 depicts the components of an embodiment of an Identity Facet.

Figure 1:
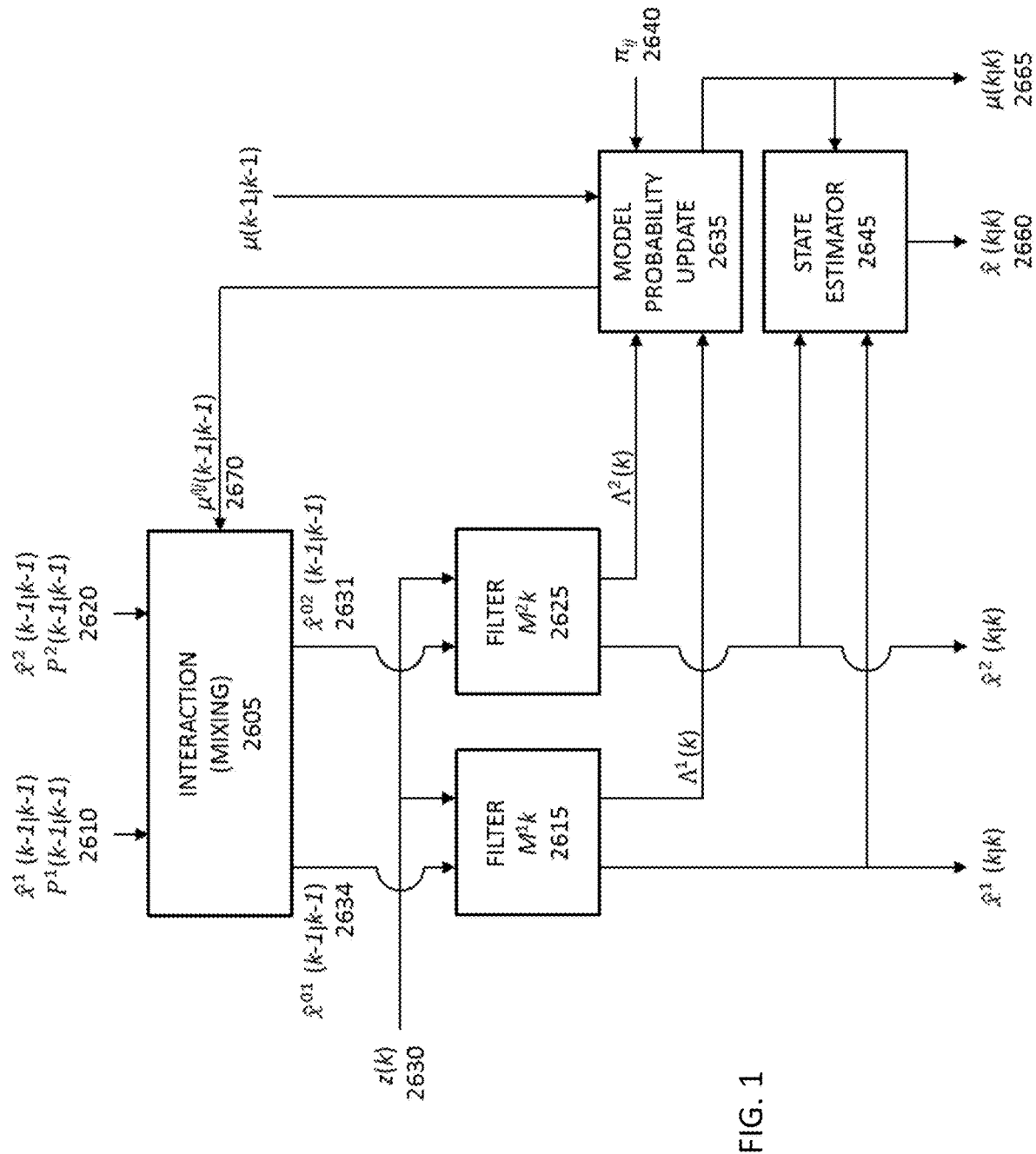
FIG. 1 a block diagram of an Interacting Multiple Model (IMM) estimator with only two models (for simplicity).

Elements and acts in the figures are illustrated for simplicity and have not necessarily been rendered according to any particular sequence or embodiment.

DETAILED DESCRIPTION

In the following description, and for the purposes of explanation, numerous specific details, process durations, and/or specific formula values are set forth in order to provide a thorough understanding of the various aspects of exemplary embodiments. It will be understood, however, by those skilled in the relevant arts, that the apparatus, systems, and methods herein may be practiced without these specific details, process durations, and/or specific formula values. It is to be understood that other embodiments may be utilized and structural and functional changes may be made without departing from the scope of the apparatus, systems, and methods herein. In other instances, known structures and devices are shown or discussed more generally in order to avoid obscuring the exemplary embodiments. In many cases, a description of the operation is sufficient to enable one to implement the various forms, particularly when the operation is to be implemented in software. It should be noted that there are many different and alternative configurations, devices, and technologies to which the disclosed embodiments may be applied. The full scope of the embodiments is not limited to the examples that are described below.

In the following examples of the illustrated embodiments, references are made to the accompanying drawings which form a part hereof, and in which is shown by way of illustration various embodiments in which the systems, methods, processes, and/or apparatuses disclosed herein may be practiced. It is to be understood that other embodiments may be utilized and structural and functional changes may be made without departing from the scope.

Glossary

Active Signatures: Active signatures include information the person supplies to their persona credentials themselves. These signatures may include habits of the user such as always whistling when walking or always ordering a vanilla latte at coffee shops. Additionally, active signatures may include proximity of a trusted friend, associate, and/or device and its acknowledgement of the user's presence.

Asymmetric Encryption: Encryption algorithms that require proper handling and use of two distinct keys. The two keys are based on the value of two prime numbers of which the product of the two numbers seeds the algorithm. This creates the basis of mutual shared trust and nonrepudiation.

Credentials: Sets of satisfying criteria to meet a standard of measure. Credentials include anything that can prove identity. There are two types of credentials: active and passive. Active credentials comprise passwords, challenge responses, captcha, and alternate path verifications (text codes, emailed verification links). Passive credentials comprise telemetry patterns based on multiple feeds and measured tolerance in variation and Web site, televised, radio or streamed content access, viewing and listening patterns.

Facet: A Facet is a verifiable physical or virtual property of a person, a group of persons, or a digital entity which can be used to authenticate this person, group, or identity.

Facet History: May include sourcing information from social media and related data, answers to a series of questions, item or movie ratings on a connected Amazon™ account, other data the user adds, or data from applications the user allows access to.

Hash Value: Mathematical fingerprinting of an arbitrary set of data such that the sum cannot be reversed to reveal the original.

Identity: A unique set of characteristics used for recognizing a person, thing, group, or concept.

Internet of Things: The Internet of Things (IoT) is a development of the Internet in which everyday objects have network connectivity allowing them to send and receive data.

Passive Signatures: Passive signatures are information about a person that is supplied by entities other than the person themselves. These signatures include things such as opt-in to a proxy service such as Starbucks®. The Starbucks® location will supply information about the location, date, time, and order for that particular visit.

Persona: An image, symbolic representation, or role made for the purpose of conveying an identity.

Persona Credential: The Persona Credential is a dynamic value that represents the user.

Persona Credential Engine: The Persona Credential Engine (PCE) is the system that performs the gathering and analysis of data to determine a user's persona and authentication levels.

Personal Telemetry: Personal telemetry includes person-specific Facets that include things like standard waking hours, average heart rate, and average activity levels, among other things. Personal telemetry data is constantly being gathered and validated in some embodiments.

Predictive Trust: The level of trust predicted by the model.

Realm: A Realm defines all attributes and policies to each Persona Facet.

Resilient: Automatically compensates against changes or possible failure both for the present as well as in the future. In some embodiments, any passive credential should be able to be substituted (or randomly rotated) for another at any time. More passive credential streams than necessary may be maintained. Any specific passive credential stream may be demoted or revoked at any time.

Signature: An action, marking, or product that is uniquely associated with an identity.

Symmetric Encryption: Encryption algorithms that require a single key to both encrypt and decrypt an arbitrary set of data.

Trust Covariance: The confidence level of the current state of trust. Higher covariance equals a lower Trust Level and vice versa.

Trust Level: The current level of trust held by the PCE that the user is authenticated. Lower Trust Level indicates there is lower certainty that the identity of the user can be authenticated. Higher Trust Level indicates higher probability that the identity of the user is authentic.

Introduction

The PCE in some embodiments provides personal security with respect to private key and public key generation and use. In some embodiments, the PCE may generate a dynamic private key for the user that is capable of holding multiple different levels of security access. The PCE in some embodiments requires little direct input from the user, i.e. it may be virtually invisible to the user.

Currently, internet usage is regularly tracked. Search engines know more about users than many users are aware of, yet not enough to allow access without challenges to certain things users may want to do. The challenge is achieving a much higher level of confidence at the lowest levels of "friction", where friction is resistance or difficulty. To reduce the friction that a user may encounter on a daily basis, the PCE can unobtrusively track the user, the user's activities, their daily habits, purchases, encounters, etc. and apply them to a system of models that allow the user's activities to be predicted and validated. This validation authenticates the user to the PCE when the user's activities support the user's normal activities. Essentially, the PCE is designed to model human behavior by observing the user's activities against certain policies the user sets, and use this data to anticipate continuously and dynamically refresh their Trust Levels. Uncertainties and evolving events will be anticipated, learned from, and adapted to.

The PCE is a new approach to certifying the digital origin of a user's private key, one where a private key in some embodiments is operably originated through a combination of one or more of a user's activities, biometrics, inputs, and passwords with sensitivities considered for the spatial and temporal aspects of a user, and particularly the variances around these activities. A series of models are developed that include linearized and non-linearized activities and events. An embodiment disclosed herein uses certain filtering techniques including Kalman filters, i.e., filters that reduce system noise and filter out certain data such that the data remaining is relevant to one of the state models.

Technology

To aid in the understanding of the systems and methods disclosed herein, the underlying technology, architecture, and network topology are first discussed with a focus on an evolution from a single device to cloud based system. Certain filter implementations may be used to authenticate a user by establishing a Predictive Trust and Trust Covariance value range based on the spatial and temporal activities of the user, both linearized and non-linearized, as well as certain biometric data, user inputs, and user activities.

Filtering and estimation are two of the most pervasive tools of engineering. Generally, these tools include a mathematical model of the system. This model may be used to anticipate the data values and variances in the data values in like terms; e.g. a distance measuring device that reports data to the system in terms of meters with a margin of error in meters. In some embodiments, the model may be used to form a prediction of state into the future, and then make an observation of state or actual measurement of the expectation. A comparison of the predicted state and the measured state is then made, and if the observations made are within the predicted measurements, the model may be adjusted by reducing the covariance of the next measurement. If the observations are outside of the predicted measurements the model may be adjusted to increase the covariance of the next measurement. This concept will be shown and described in more detail in FIG. 4.

Generally, filtering techniques, decision logic, and data association techniques are like building blocks; one must look at the data sets, the noise around the data, and then decide what model might best apply. Whenever the state of a system must be estimated from noisy information, a state estimator may be employed to fuse the data from different sources to produce an accurate estimate of the true system state. When the system dynamics and observation models are linear, the minimum mean squared error (MMSE) estimate may be computed using the standard Kalman filter. There are numerous types of Kalman filters to consider; essentially optimal models that exist in a linearized space and time relationships with measurable or known uncertainties; as an example, while walking, or driving, one can measure and predict state based on position and velocity, iterate the model, make a measurement, compare it the prediction, update the state, and then make another state prediction—this is termed recursive filtering.

FIG. 1 is a block diagram depicting the elements of a typical estimator. The depicted estimator is an Interacting Multiple Model (IMM) estimator with only two models shown for simplicity. It should be clear that any number of models may be incorporated and that other estimators may be implemented. This estimation approach looks at a global set of problem possibilities (more than one), and recognizes and quantifies models that could exist and establish a "family of multiple models". These models include both linear and nonlinear events that anticipate a broad range of uncertainties for each. The IMM estimator essentially results in linearizing all of the possibilities of a problem set and operates as a suboptimal hybrid filter. In particular, the IMM estimator operates as a self-adjusting variable-bandwidth filter, which makes it a viable selection for nonlinear, or in this case, behavioral events. The IMM is a computationally cost-effective hybrid state estimation scheme. The IMM model shown in FIG. 1 is described in more detail in the Models section below.

Model Switching and Weighting Strategy

In some embodiments, the switching strategy used in the PCE-IMM is a Markovian Jump System. These anticipate the family of models subject to abrupt variations. The main feature of this algorithm is the ability to estimate the state of a dynamic system with multiple behavior modes which can "switch" from one to another. The PCE-IMM is predicated on multiple models (two or more) running simultaneously. In some embodiments, these models are all linear where each model represents a set of conditions and expectations around what is sometimes referred to as a sigma point. Switching between models in the PCE-IMM, all the state models remain linear and valid; however, the state covariances may differ. The Trust Level may be derived from the covariance of the state estimate, e.g. a smaller covariance relates to a higher Trust Level and conversely a higher covariance yields a lower Trust Level. These varying Trust Levels may be used to assign levels of access to the system being protected. The fundamentals are the model switching functions and weighting strategies.

In some embodiments, the PCE-IMM algorithm may perform better than single model algorithms. To those skilled in the art of state estimation, it is understood that there are many weighting schemes. These comprise a matrix weighted IMM, a diagonal weighted IMM, and a scalar weighted IMM, to name a few.

In some embodiments, a Persona Credential is dynamic and may be generated as a multi-level value directly related to the confidence a user has to gain access to devices, programs, vehicles, structures, etc. Gaining access to a user's bank account and gaining access to the user's online music generally would have vastly differing values. In some embodiments, there may be two or more distinct values (thus the need for a multiple model estimator).

Figure 2:
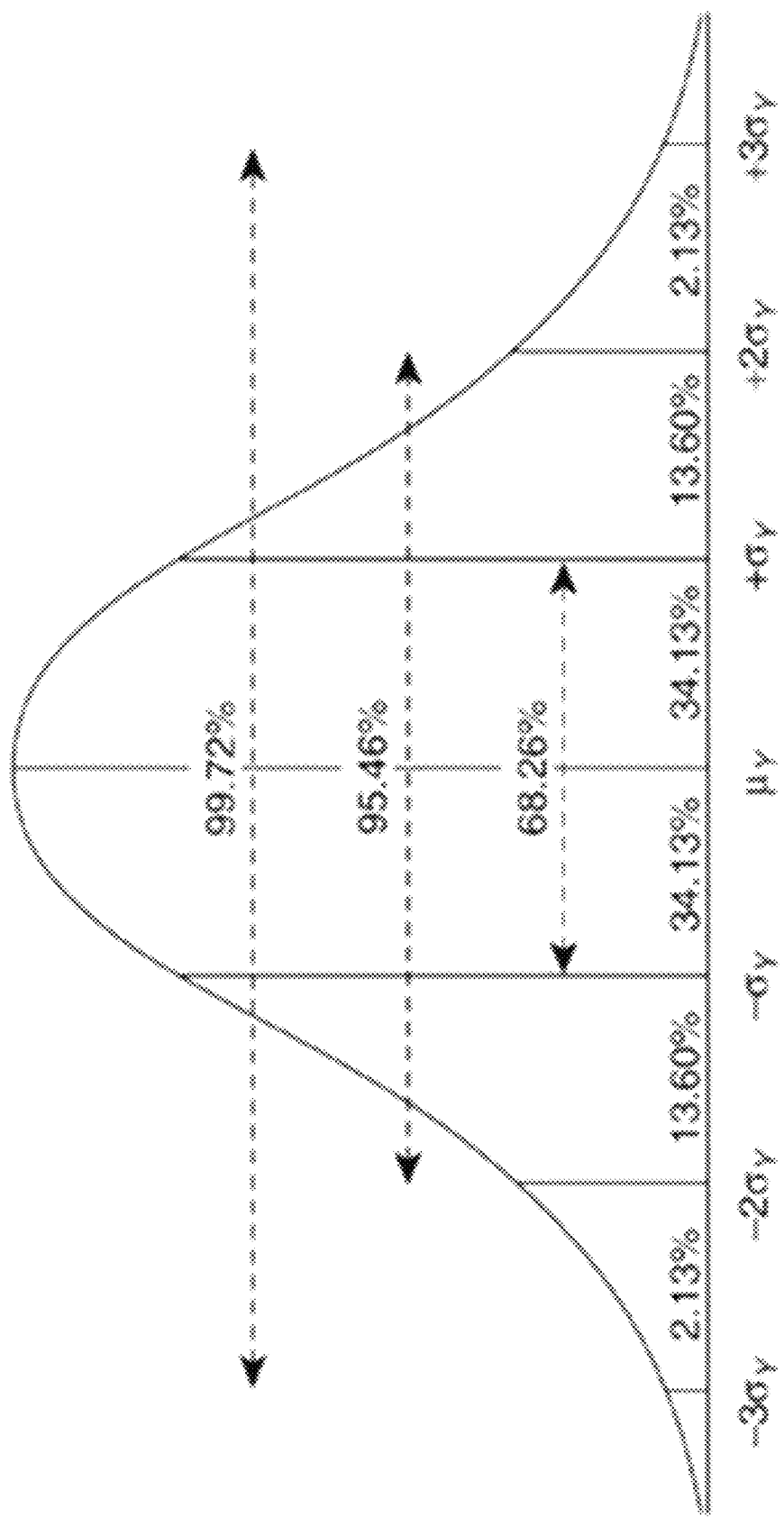
FIG. 2 depicts standard deviation.

FIG. 2 depicts a standard deviation graph. The vertical regions represent certain data populations and are typically represented by the Greek letter sigma ($\sigma$). These distributions represent a measure of the data and are used to quantify the amount of variation or dispersion of the data values. In addition to expressing the variability of the population, the standard deviation is commonly used to measure confidence in statistical conclusions, i.e., if 68% of the data are measurements or observations of state consistent with expectations, then a conclusion can be made with a confidence. For example, the margin of error in polling data is determined by calculating the expected standard deviation in the results if the same poll were to be conducted multiple times.

In an example embodiment depicted in FIG. 2, three distinct Trust levels are used. First is an arbitrarily assigned number value of 1-$\sigma$ representing a Trust Level of >68.26%, or T1, that is based on at least one or more Facets including data regarding a user's activities, where the user has been, what the user has been doing at specific times, user biometrics, etc. all of which are indeed unique to the user. This Trust Level allows the user to gain access to some, but not all, things in his or her day-to-day digital life. Second is an assigned number value of 2-$\sigma$ representing a Trust Level of 95.46%, or T2. Now the user has access to his or her devices, home, car, etc. The third is an assigned number value of 3-$\sigma$ representing a Trust Level of greater than 99.7%, or T3. This level allows access to banking and credit card purchases, whether online or retail.

Trust Levels may be arbitrary. There can be as many or as few as a user desires. Additionally, the user may set preferences for the Trust Level that each sigma value represents, as well as what Trust Levels are required for access to specific applications, devices, accounts, or types thereof (such as entertainment, financial, work, etc.). In some embodiments, one or more Trust Levels may be predetermined mandatory sets as defined by policy when there are organizational or institutional requirements to be met. In some embodiments, policies may mature to eventually be adaptive in nature.

In some embodiments, Trust Levels may be dynamic in that they will degrade over time or can be refreshed over time. The longer a user is tracked, and their activities are known and predictable, the higher Trust Level can be achieved and maintained. Unexpected events may result in a loss of confidence (higher covariance), resulting in a lower Trust Level. Despite the loss in Trust Level, unexpected events are recorded in history such that repeated occurrences may be determined and eventually raise the Trust Level when these events occur. Over time, the set of unexpected events may diminish as these events migrate from unexpected to rare or infrequent. Cautiously, binary events are expected and modeled; policy will allow a UPS delivery driver to function in a very "noisy" world because his models are shaped for that. However, an elderly grandfather likely lives in a much smaller and highly predictable lifestyle; his model expectations will likely have far less "noise" than a UPS delivery driver. The algorithm and model strategy may need to anticipate expected and unexpected events within historical data and policies. The Trust Levels may be based on the use of filters and state estimation algorithms in some embodiments. The Trust Levels required to access various accounts/data may be set according to user preferences, as well as the number and values of Trust Levels used.

Figure 3:
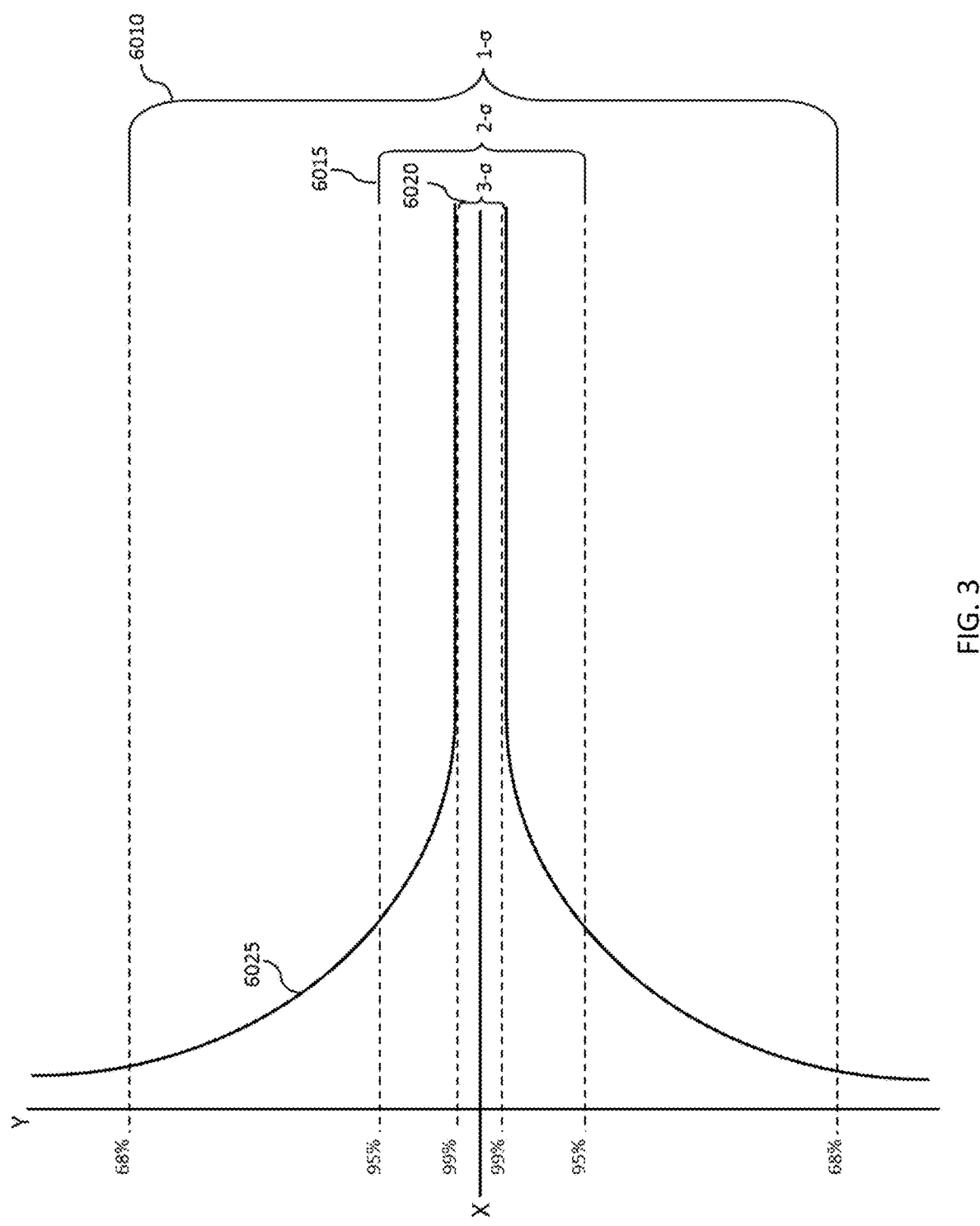
FIG. 3 depicts covariance terms and an embodiment with three distinct Trust Levels.

FIG. 3 is an example embodiment depicting covariance terms and three distinct Trust Levels. First is an arbitrarily assigned number value of 1-σ representing a Trust Level of 68% or T1 6010. Second is an arbitrarily assigned number value of 2-σ representing a Trust Level of 95% or T2 6015. The third is an arbitrarily assigned number value of 3-σ representing a Trust Level of greater than 99% or T3 6020. At startup, before Trust Level has been developed and maintained, the covariances (expectations) 6025 are outside of the 1-σ Trust Level and therefore the user will not be able to access anything they have set to require 1-σ 6010 or better Trust Level. As data is gathered the covariances may begin to converge towards the 3-σ Trust Level 6020. Over time, the state estimates and the predicted covariances may become smaller as the user performs consistent activities and maintains the 3-σ Trust Level 6020.

Figure 4:
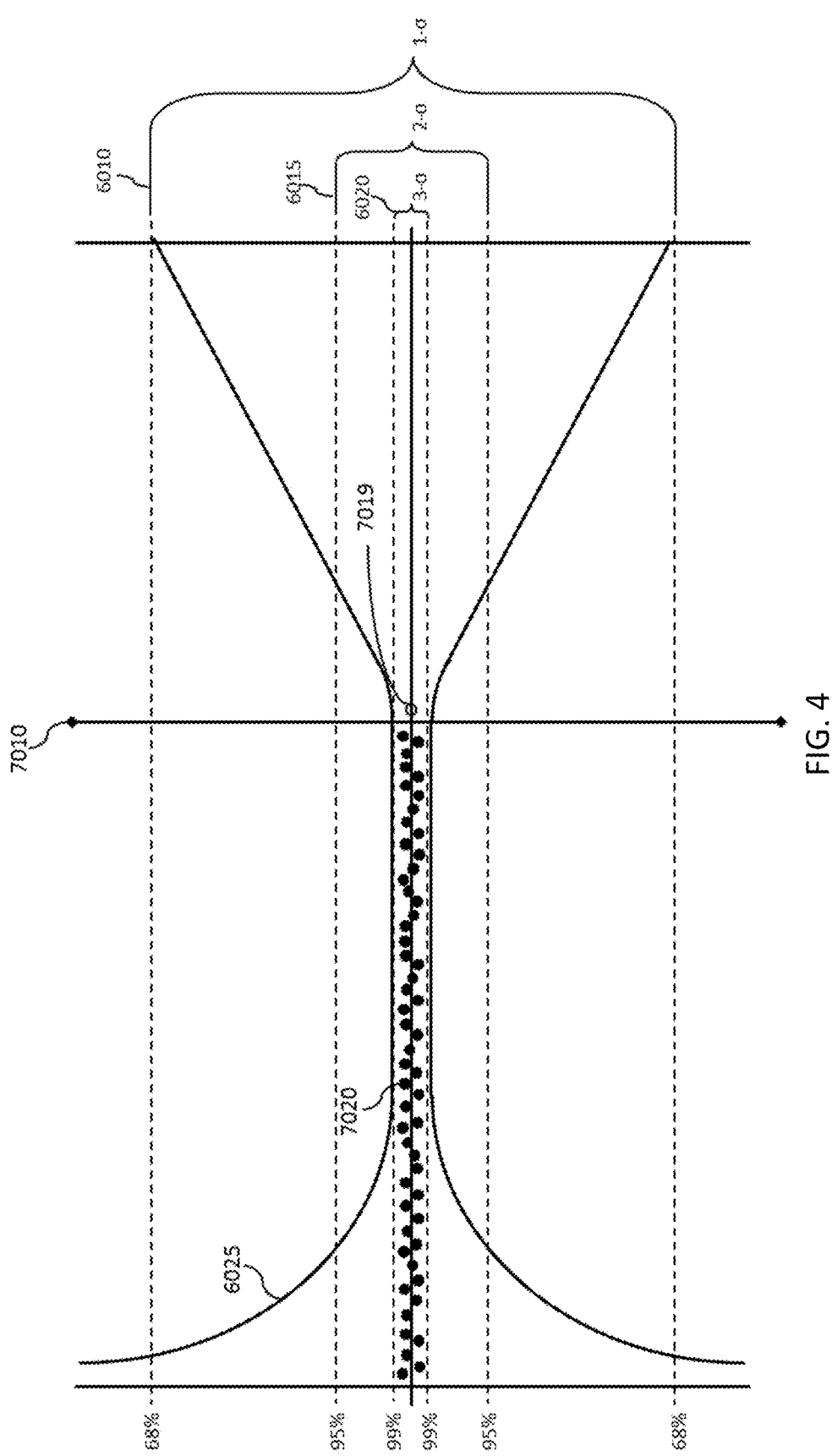
FIG. 4 depicts a system where covariance begins to degrade into lower Trust Levels over time when measurements stop being input to the system.

FIG. 4 depicts an extension of FIG. 3 where, for some reason, new measurements 7020 are no longer being added to the system (for instance, the user could be in the hospital and is therefore no longer using his devices, driving his vehicle, or accessing his accounts). The line 7010 indicates the time when measurements 7020 stopped being input. Prior to time 7010 the user's measurements 7020 were within the 3-σ Trust Level 6020 and were being maintained there for some period of time. When the system stops receiving new measurements 7020 the covariances 6025 will generally begin to degrade with time. In the depicted embodiment, the covariances degrade linearly, however they may degrade according to other functions. The covariances 6025 degrade to the worst expectations, or 1-σ 6010 in the depicted embodiment.

Figure 5:
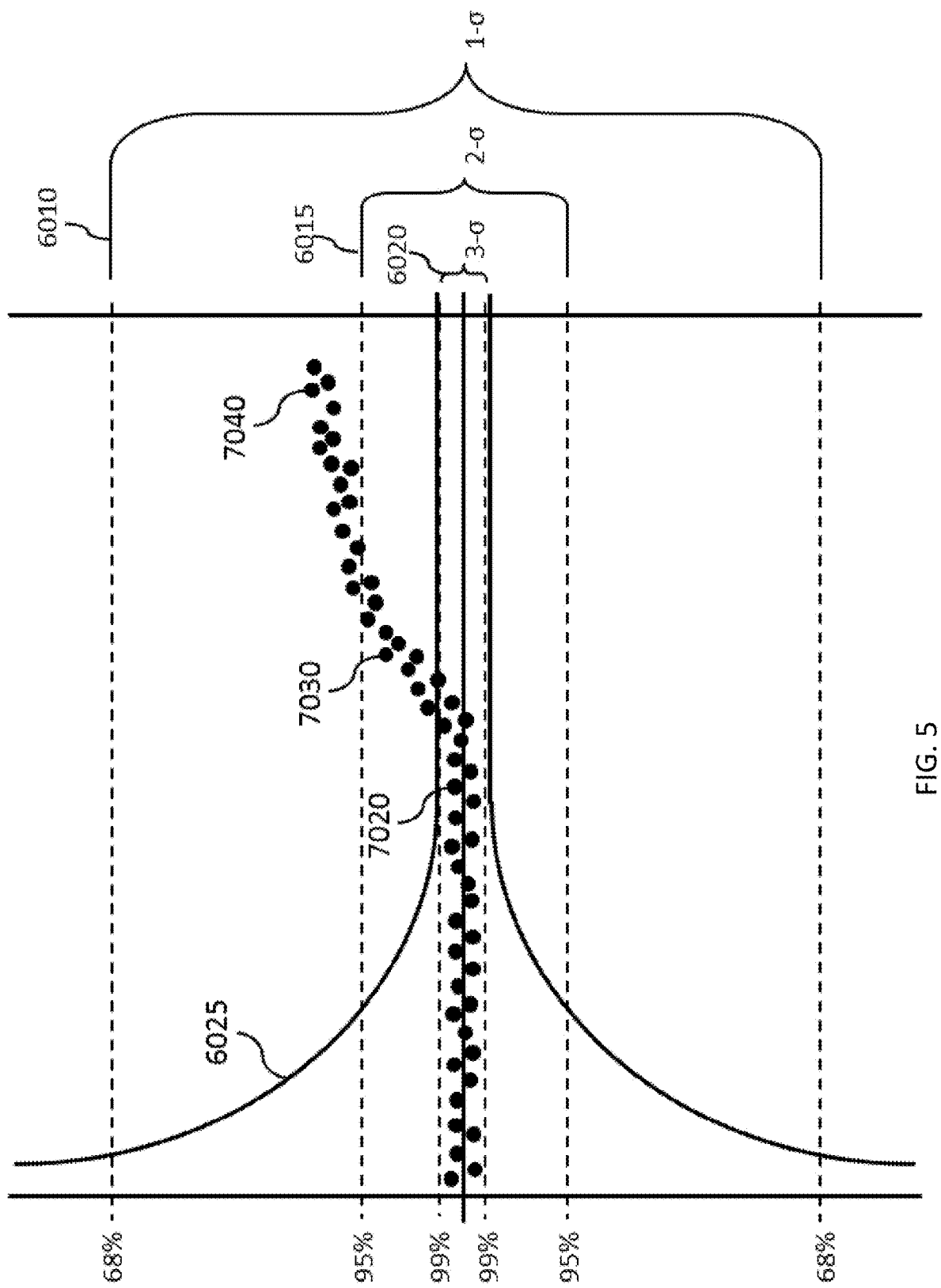
FIG. 5 depicts an example of when measurements are initially within a high Trust Level and then begin to diverge into lower Trust Levels.

FIG. 5 depicts an example embodiment of when the initial measurements 7020 are within the 3-α 6020 Trust Level and then begin to diverge 7030 into the 2-σ 6015 and eventually diverge further 7040 1-σ Trust Levels 6010. As the measurements 7020 begin to fall into the lower Trust Levels, the filter may need to change to a filter that allows that level of deviation. The covariance 6025 may update when the measurements and or filter change.

Figure 6:
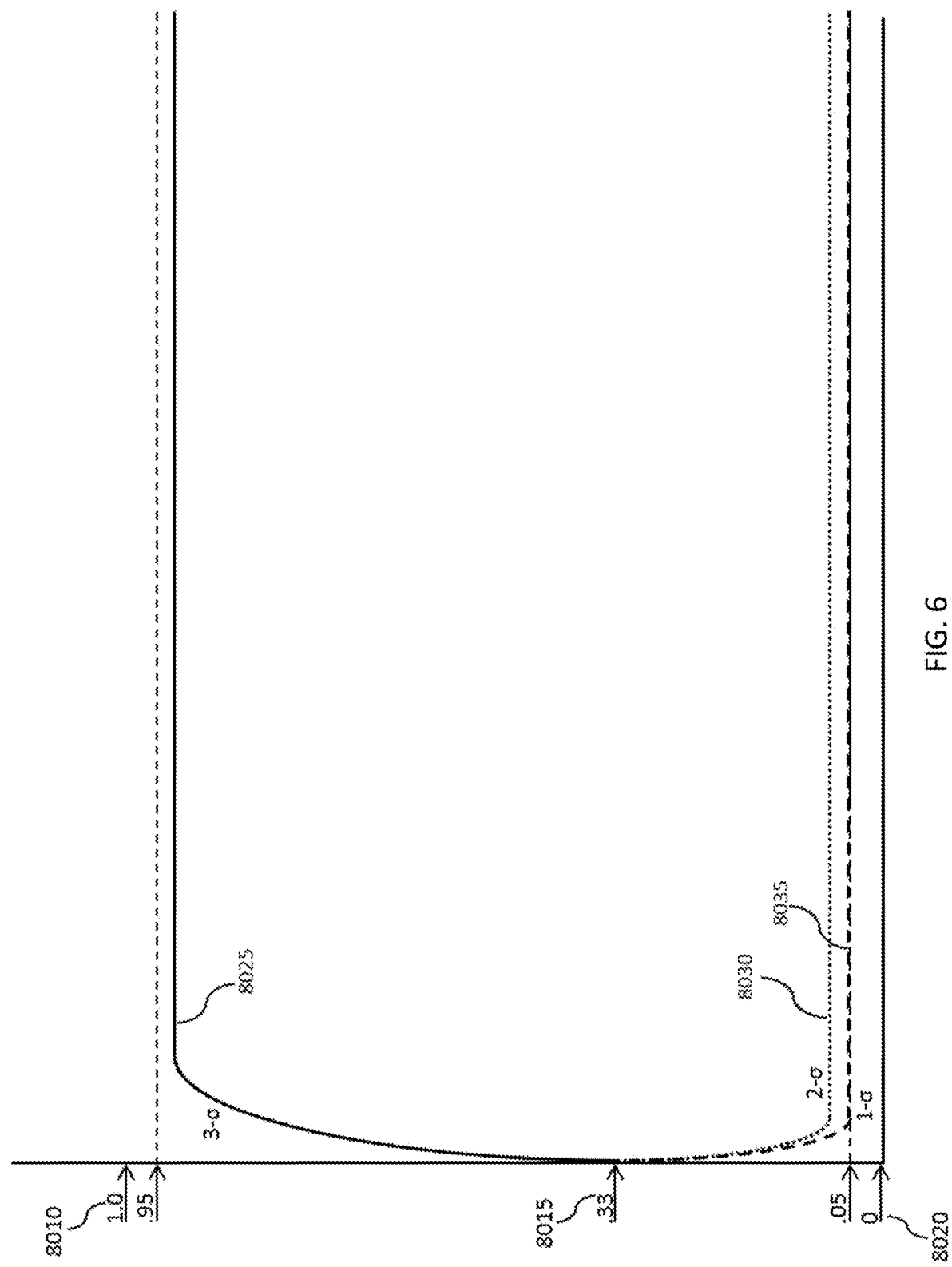
FIG. 6 depicts a system with three state models operating simultaneously.

FIG. 6 depicts a system embodiment with three state models operating simultaneously. The models run between probabilities of 0 8020 and 1 8010. At the beginning of operation, all of the models have the same probability. In the depicted embodiment, there are three models and since each model has an equal probability of being the appropriate model they each start at 0.33 probability 8015. As measurements are gathered, one or another model will be voted up above the others. In the depicted embodiment, 3-σ 8025 is active, has the highest confidence, and is operating within expectations. 2-σ 8030 and 1-σ 8035 are idling until 3-σ 8025 begins to deviate and another model is voted up.

Figure 7:
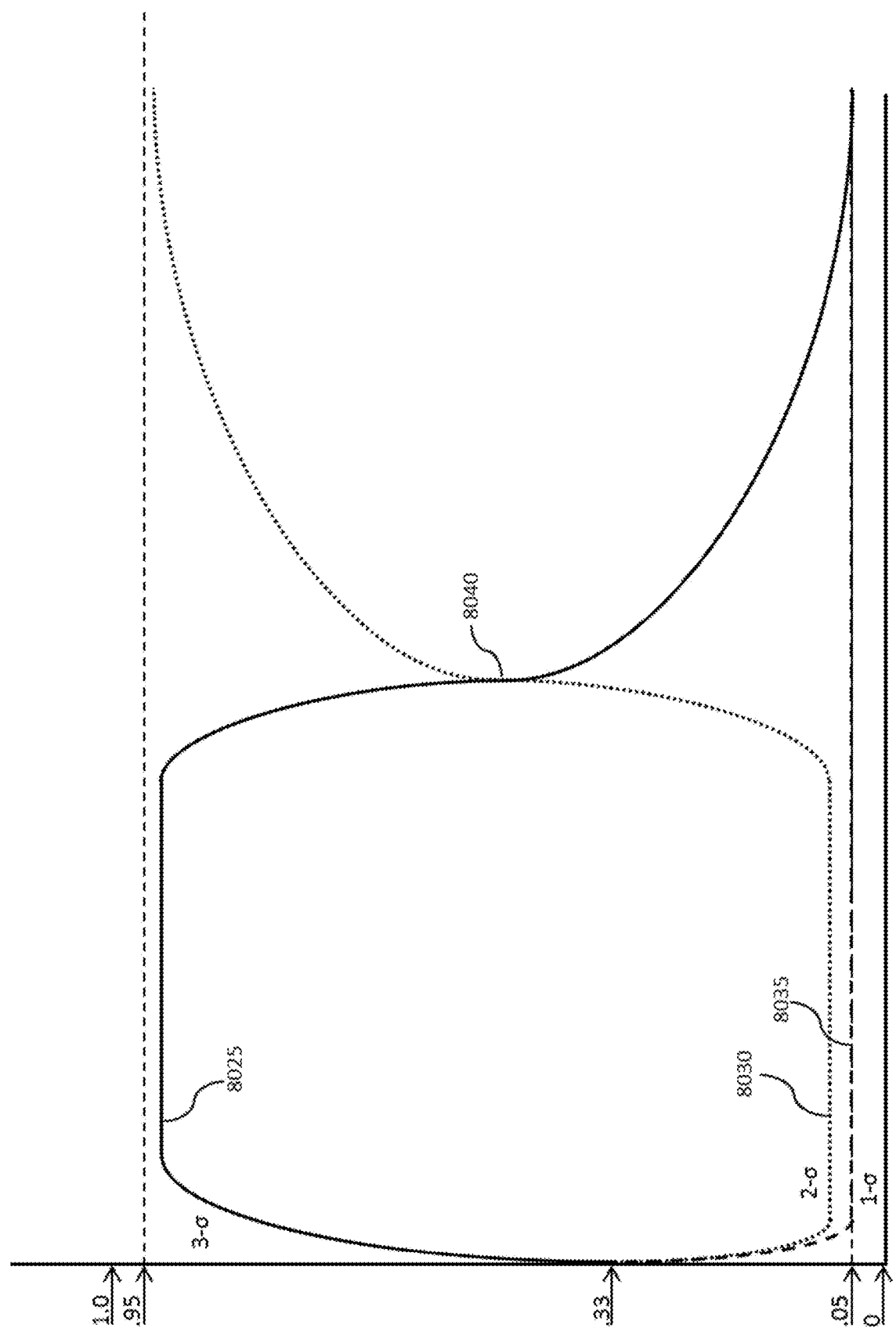
FIG. 7 depicts a crossover between models in the system.

FIG. 7 depicts an example continuing from FIG. 6 where 3-σ 8025 no longer fits the measurements and is being voted down. Meanwhile 2-σ 8030 begins to get voted up. At point 8040 3-σ 8025 and 2-σ 8030 cross at equal (50%) probability. 2-σ 8030 continues to vote up in confidence as 3-σ 8025 drops towards 0. Point 8040 on FIG. 7 corresponds to point 7030 on FIG. 5. Point 8040 is the point at which the model switches over to one that fits the data more closely.

Figure 8:
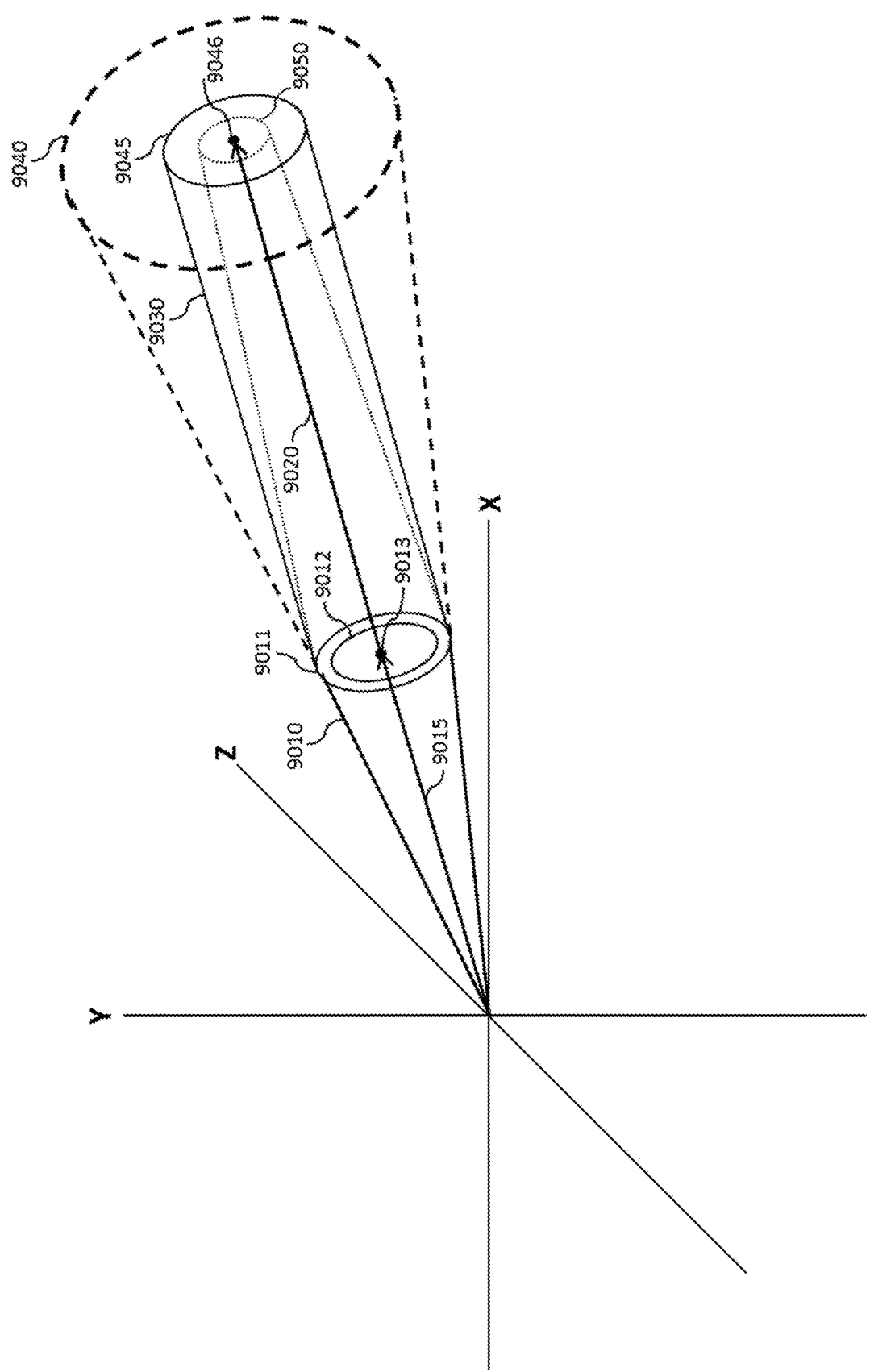
FIG. 8 depicts confidence as a vector in space-time or a scalar in discrete time.

FIG. 8 depicts an example of confidence (cone) around a vector in space-time. In some embodiments, confidence may be a scalar in discrete time. The depicted vector 9015 connects two states. The estimated covariance 9011 for the measurement 9013 should be larger than the actual covariance 9012 for the measurement 9013. 9010 depicts the bounds for the estimated covariance. The vector 9015 can theoretically fall anywhere within these bounds 9010, but should, in a perfect system, end at the center point 9013 of the estimated covariance 9011, as depicted. When a new measurement is taken, a second vector 9020 may begin at the end point of the first vector 9015. The second vector 9020 in some embodiments has the same magnitude of estimated covariance 9045 as the initial vector 9015. The bounds of the estimated covariance 9030 are depicted as linear if the estimated covariance does not change between measurements. The second vector 9020 will have a smaller actual covariance 9050 than the initial vector 9015 because the acquisition of more data in the depicted embodiment has increased the confidence. The end point 9046 of the second vector 9020 should fall within the estimated covariance 9045 if the measurement is within expectations. 9040 depicts the predicted covariance if the measurements did not fall within expectations. As new measurements fall within expectations, the covariance should continually become smaller and smaller.

Scalars and Facets

Figure 9:
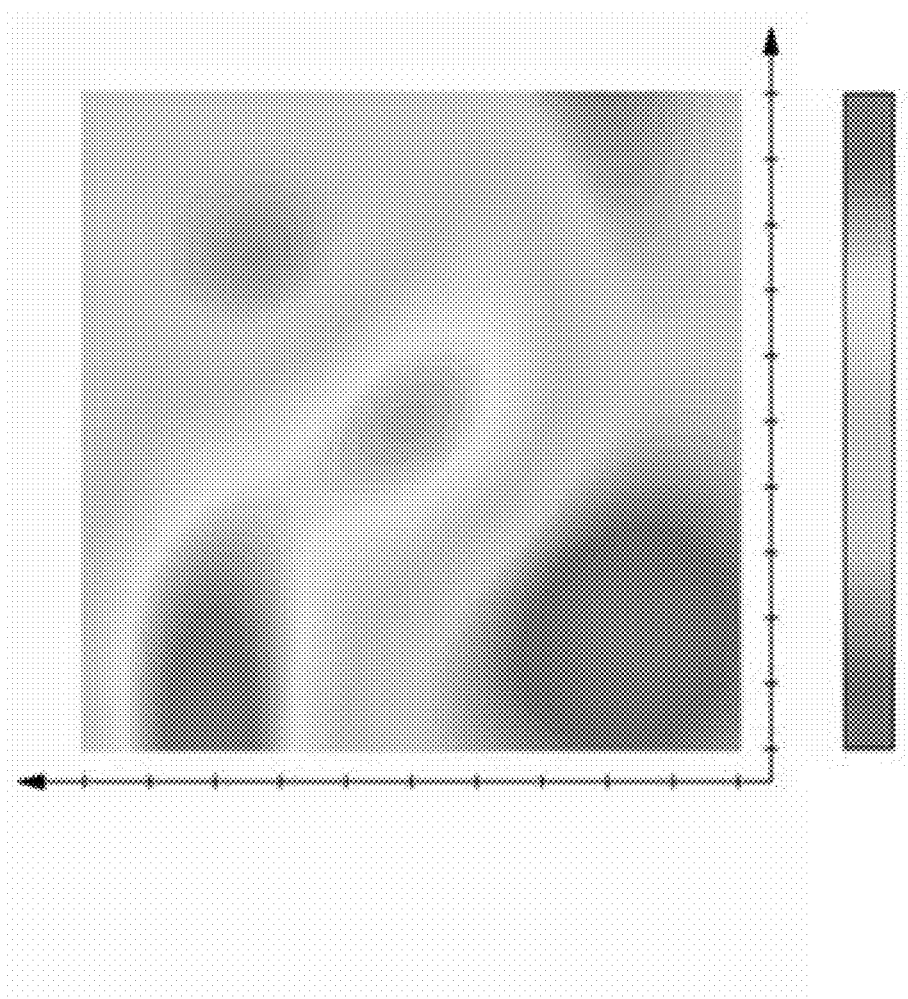
FIG. 9 depicts an example scalar region.
Figure 10:
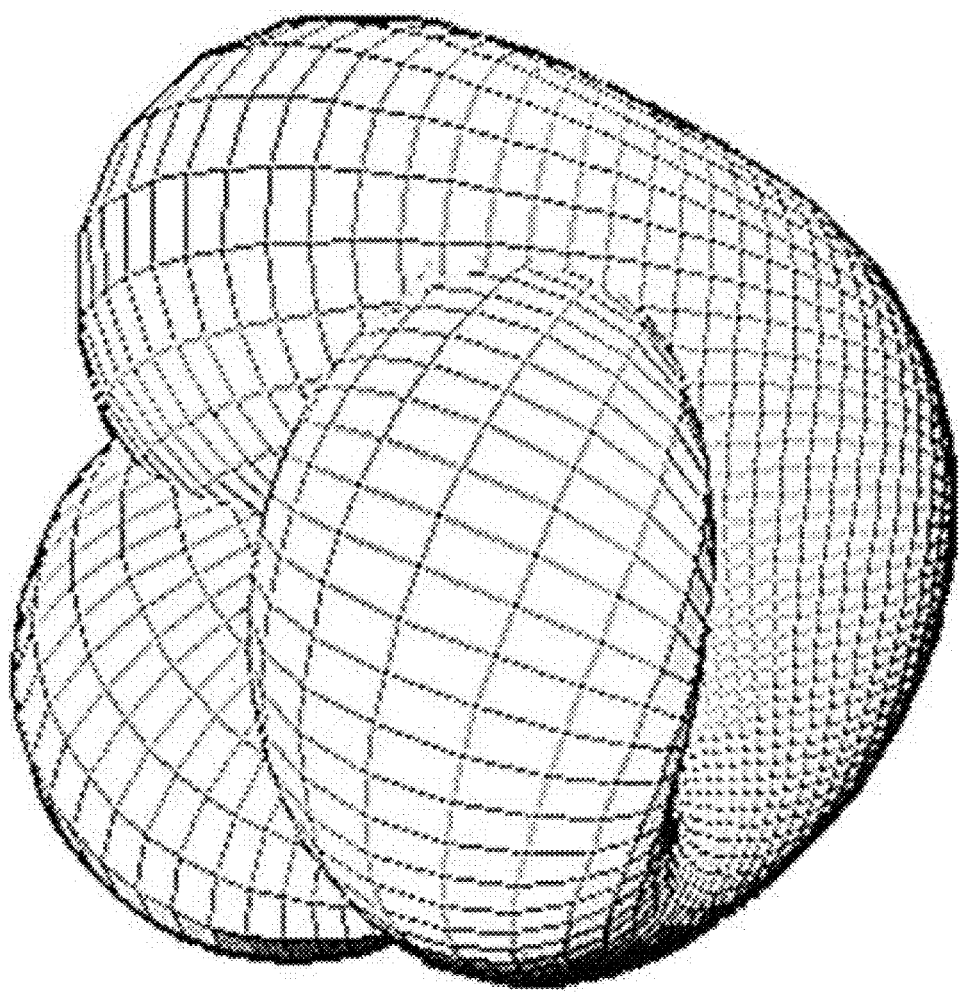
FIG. 10 depicts an example topological manifold.

FIGS. 9 and 10 depict the use of scalars for discrete time linear systems. A scalar value represents the magnitude of an observation; where the scalar may either be a mathematical number or a physical quantity and the scalar fields are coordinate-independent.

As an example, a 2-dimensional view would be a scalar field for temperature which may look like the scalar field in FIG. 9, where the magnitude of the scalars are shades of gray, the darker the gray, the higher the magnitude. Another way to view the scalar field is in a topological space in time as a set of continuous functions that form a manifold as depicted in FIG. 10. The manifold represents the scalar points along with their neighborhoods, where the neighborhoods make up the surface of the manifold. As stated earlier, the scalar fields are coordinate-independent, meaning that any two observers using the same units will agree on the value of the scalar field at the same absolute point in space at the same time, regardless of their respective points of origin.

A Facet is a verifiable physical or virtual property of a person, a group of persons, or a digital entity which can be used to authenticate this person, group, or identity.

In some embodiments, the neighborhood may be a set of Facets and the size of each Facet may represent the uncertainties of the scalar value which may be inversely related to a Trust Level. The larger the Facet, the lower the Trust Level. In an embodiment, Trust Level is a continuous inverse function of the scalar field, or could be seen as a homeomorphic value of the scalar field. In some embodiments, a cumulative set of Facets may be considered a portal to a user, where the portal extends through a device on the Internet. This portal can securely channel a consistent information stream to and from a user such that the stream contains unique information related to the user or the user's activities. Facets are described in more detail, in various embodiments and varying contexts, in the following sections.

Models are not limited to vector space models. Models can also be based on dimensionless scalar values, such as those depicted in a scalar map in FIG. 9. The varying shades of gray represent areas of interest typically in some value, which can be arbitrarily assigned. These are typically used in heat maps, with the differing colors representing intensities. In an example embodiment, the x axis represents friends and family and they axis represents activities. The intensities of the scalar regions represent the value of a likelihood that there is an association. The scalar field is time independent and dimensionless. This data is associated with what is referred to as neighborhoods and neighbors. As is understood in the art, one can add data and observations that are dimensionless scalar values; as with vectors, variances can be assigned and covariances can be determined.

As another example, a user is working on a public computer and reviewing her email. The user receives an email from her colleague and she responds. These activities can be represented arbitrarily on the horizontal and vertical axis as a hot region with an intensity diameter of 1 or facet 1-sigma, or a 68% likelihood resulting in a Trust Level. Next the user has accessed her email on her personal computer and is exchanging emails with her husband. Her Trust Level may increase to a 2-sigma number, which means there is a <90% probability it is really her, resulting visually in a Trust Level that is smaller in diameter and more intense than the 1-sigma. The higher Trust Level allows her to access a higher level of her private information. Finally, to establish a higher Trust Level she enters a password or answers a personal security question correctly and her Trust Level is elevated to a 3-sigma level or <99% resulting visually in a smaller diameter, more intense region.

The PCE in some embodiments continually operates under multiple models, which may be scalar and/or vectors. The model weighting engine may shift confidences on the model outputs, and weight the model probabilities such that at some point a new model is voted up, and, once voted up, the model takes over the estimator and shifts to a vector and maneuver model.

Filters

In some embodiments, when one needs to consider behavioral activities as part of the system models, these models may have system dynamics and observation equations that may be considered suboptimal, i.e. when the inputs to the model are not proportional to the outputs, this is typically termed nonlinear. For these nonlinear models there are filter types that are well suited. One example is the Extended Kalman Filter (EKF) that linearizes an estimate of the current mean and covariance. This is done by adding extensions to the Kalman filter. The most widely used estimator for nonlinear systems is the EKF, though other estimators are possible. However, in practice, the use of the EKF has two well-known drawbacks. First, linearization that can produce highly unstable filters if the assumptions of local linearity are violated. Second, the derivation of the Jacobian matrices is nontrivial in most applications and often lead to significant implementation difficulties.

The challenge remains to determine which theories best represent the simplest solution dealing with multiple states and multiple outcomes with varying uncertainties. In the mid 1990's a new theory evolved, termed "multiple hypothesis tracking", wherein each hypothesis has a different set of expectations, such that a target detected could be a missile capable of a 40 G maneuver, or a fighter plane capable of a 9 G maneuver, or a transport plane, capable of a 1 G maneuver. For every object detected, simultaneously all three models would calculate every possibility within 360 degrees of each of the three maneuver models in order to generate an estimation of state; this could be hundreds or thousands of calculations. Needless to say, this resulted in a system that was computationally expensive. The human maneuvering through their environment, seemingly randomly or unpredictably, is much like the maneuvering target in the 1990s described above.

A factor in selecting the right algorithms for the right job is understanding the basic aspects of the systems to be modeled. When inputs generate outputs that are proportional to each other, the system is considered linear. If the outputs are not proportional to the inputs, then it is considered to be non-linear. The "basic" Kalman filter is limited to linear models, meaning alternate systems are needed for nonlinear models. The extended Kalman filter does not need linear functions for the state transition and observation models. In the extended Kalman filter, the Jacobian matrix is computed for both the state transition and observation functions. As seen in the basic Kalman filter, as more measurements are observed the Jacobian matrices are updated with new predicted states. Essentially, rather than use linear functions, the extended Kalman filter uses the Jacobian matrices as linearization's of the functions at the current state estimate.

In some embodiments, when the state transition and observation functions are very nonlinear, the extended Kalman filter can give inaccurate results. The unscented Kalman filter uses a sampling technique called the "unscented transform" to pick a set of "sigma points" around the mean. The nonlinear functions are then applied to the sigma points, recovering the true mean and covariance of the estimate. This method is particularly efficient for complex functions, since computing Jacobians for complex functions can be especially difficult. When implementing the extended Kalman filter, extensive computer work is needed to calculate Jacobian matrices. The computer round-off errors can build up and cause numerical instability in the model. UD factorization is a term of art defined as a square root form of the Kalman filter that solves the issue of numerical stability. UD factorization decomposes positive definite matrices into the form $P=U \cdot D \cdot UT$ where U is a unit triangular matrix and D is a diagonal matrix. This form avoids many of the square root operations which can cause the model to lose numerical stability.

Models

With all of the above technology concepts and theories stated, an example embodiment to modeling human behavior is to consider the human as a machine that operates within a large number of linear models, each with its own particular set of conditions and transition probabilities between the model states. As an example, this type of model could be a number of standard linear recursive filters, each using different dynamics and different measurements, sequenced together within a Markov network of probabilistic transitions. The states of the model may be ranked and organized to describe both short-term and longer-term activities and events; one example is a discrete space time model operating in a 3-dimensional vector space such as driving an automobile or walking. Another approach is a discrete time based model operating in an n-dimensional coordinate-independent scalar field as an example repeating an activity at a certain place and certain time, where the variances are in discrete time against a magnitude of confidence driven by either learned behavior or user input data; e.g. like going to buy coffee every day at a certain coffee shop at 8:10 plus-minus 10 minutes, and where the order is the same. This model essentially maps a person's daily activities into what would look like a scalar field for temperature or pressure where magnitudes and times are represented as different shades of gray depicting areas of interest. So, visit Starbucks® once, earn a magnitude of 0.05, visit it a hundred times, and earn a magnitude of 0.95.

In some embodiments, when a new or anomalous activity is detected, the system may request that the user answer a series of questions (and further may request authentication) in order to gather more data. For instance, the user may join a gym for the first time. The system may ask the user if the user intends for gym visits to become a regular occurrence and what the planned schedule may be. If the user answers these questions, and further holds true to the provided answers, the Trust Level may be increased at a much higher rate than if the system has to determine that the gym visits are a regular occurrence over time.

Establishing the Models

Establishing the models can happen in a number of ways. The first is setting rules around the activities with a tolerance value, i.e. + or − some value. In some embodiments one or more rules may be based on user inputs. It is important to include as many elements as possible as well as the errors in each to achieve higher levels of accuracy. Next is to measure the activities of the user long enough that patterns in the data can be established. Once the patterns are established, accuracy of the population in terms of a standard deviation can be identified.

In some embodiments one or more collected data sets may be compared to the rules. The comparison may generate a score as a percentage of data sets that agree with the rule. In some embodiments, the score is represented as a standard deviation of scores from a median. The score may be used to generate a Trust Level. In some embodiments, the Trust Level may be timestamped and stored in memory. In some embodiments, the Trust Level represents the value of a secure key.

In some embodiments, the system is operatively configured as a dynamically evolving cognitive architecture, wherein the architecture includes processing the stored data using state models that make predictions of state, receive observations of state, compare the predictions to the observations of state, and use the differences to change the state model.

As an example, a model includes the location of a particular coffee shop as a place a user visits with his car and an onboard navigation system that includes a built-in GPS. The location of the coffee shop is known and referenced on a map; the map that shows the location of the front door of the coffee shop is accurate to +/−10 meters. This value can be obtained two ways: from either a series of direct measurements or from the map supplier. If the direct measurement is made a hundred times, it is calculated that the location of the front door is +/−10 meters 68% of the time. Alternately the map supplier already knows how accurate his maps are and simply makes the data available; this 10 meter error is also referred to as a variance. The location determining equipment may have its own set of accuracies or variances as well; for this example, +/−3 meters. Using this type of data in a mathematical model allows the data to be "fused" or filtered. A new variance, called a covariance, may be developed based on the two data sources. In some embodiments, the covariance is based on two or more data sources.

In some embodiments, it is important to note that when combining data, particularly data derived from disparate sources (such as the map and position determining device in the previous example), the resulting information may be "better" than would be possible when these sources were used individually. This process is predicated on the covariance (or the measure of how much two variables vary together) of non-independent sources. The term "better" in the case above can mean more accurate, more complete, or more dependable. When referring to the result of an emerging view or state estimation from the models, with respect to the example model, covariance may be directly related to Trust. Again, using the examples above, the combination of the two data sources in the model will not yield a total error as the sum of the variances, e.g. +/−13 meters, rather a number in the range of +/−1 meter. The more data there is to filter the better the estimates are. In an example embodiment, another data set is added, such as time, and that other data set has a variance. The time that a data observation is made and processed also has a tolerance of +/− seconds. All of this data is consumed by the model resulting in an estimate and covariance.

Referring again to the example embodiment, now that the models have been established, the state model can be called, sources of data may be identified, and the variances may be stored into memory. If the user navigates in the environment, i.e. drives around, data may be collected during his journey including location and time, and may be referenced on a map. In an example, assume it is 7:30 AM on a Monday morning and the user drives near his favorite coffee shop. At 7:43 AM, he pulls into the parking lot and at 7:49 AM he enters through the front door. His state model has predicted he would be there because this activity follows his established patterns, therefore all of the variances yield a covariance and Trust of >>99%, 3-sigma. This Trust Level allows the user to make a purchase with his credit card.

In some embodiments, these models represent human behavior and may produce improved human-machine systems interfaces especially in the area of security. When the machine recognizes the user's behavior after some period of time it will anticipate the behavior and adjust itself to serve the user's needs much better. Being able to anticipate, the machine would need to be able to determine which of the user's control states was currently active, and to predict transitions between the determined control states and best overall performance.

In an example embodiment, the user is driving. Assuming an IMM (FIG. 1) is used for the estimator (PCE-IMM) and is employed to make an estimate of state (e.g. position, velocity), since the movement of the user is not generally known ahead of time the estimator is based on using several (two or more) models in parallel to estimate the changing expectations and uncertainties of a user or user event. In some embodiments, a filter may use a different model for each event, e.g. a constant behavior both spatially and temporally; a change in only temporal expectations, or a change in only spatial expectations. Switching between these models during each sample period may be determined probabilistically. Unlike maneuver detection systems where only one filter model is used at a time, the PCE-IMM may use a variety of different filters at the same time. The overall state estimate output is a weighted combination of the estimates from the individual filters. The weighting is based on the likelihood that a filter model is the correct model, referred to herein as dynamic Markov models.

In some embodiments, these dynamic Markov models are then used to assist the machine in recognizing human behaviors from the sensory data, in this case GPS, or data from the vehicle to predict what the user is doing over the next period of time. In the maneuver embodiment disclosed above, two or more models may be running at once, the Markovian switching coefficients that are generally described by r (where r is the number of models), where $M^1$, $M^2, \ldots, M^r$, and given probabilities of switching between these models. The event that model j ($M^j$) is in effect during the sampling period ending at time $t_k$, $(t_{k-1}, t_k]$ will be denoted by $M^j(k)$. The dynamics and measurement for a linear system are given by $$x(k)=\Phi^j(k,k-1)x(k-1)+G^j(k,k-1)w^j(k-1), \quad (1)$$

and $$z(k)=H^j(k)x(k)+v^j(k), \quad (2)$$

where x(k) is the system state at time $t_k$, z(k) is the measurement vector at time $t_k$, $\Phi^j$ (k,k−1) is the state-transition matrix from time $t_{k-1}$ to time $t_k$ for $M^j$ (k), $G^j$(k, k−1) is the noise input matrix, and $H^j(k)$ is the observation matrix for $M^j(k)$. The process noise vector $w^j$(k−1) and the measurement noise vector $v^j(k)$ are mutually uncorrelated zero-mean white Gaussian processes with covariance matrices $Q^j(k-1)$ and $R^j(k)$ respectively.

The initial conditions for the system state under each model j are Gaussian random variables with mean $\bar{x}j(0)$ and covariance $P^j(0)$. These prior statistics are assumed known, as also is $\mu^j(0)=Pr\{M^j(0)\}$, which is the initial probability of model j at $t_0$.

The model switching is governed by a finite-state Markov chain according to the probability $\pi_{ij}=Pr\{M^j(k)|M^i(k-1)\}$ of switching from $M^i(k-1)$ to $M^j(k)$. The model switching probabilities, $\pi_{ij}$ 2640, are assumed known and an example is:

$$\pi_{ij} = \begin{bmatrix} .95 & .05 \\ .05 & .95 \end{bmatrix}. \quad (3)$$

A block diagram of the IMM estimator with only two models, for simplicity, is shown in FIG. 1.

In an embodiment, the inputs to the IMM estimator as depicted in FIG. 1, are $\hat{x}^1(k-1|k-1)$, $P^1(k-1|k-1)$ 2610, and $\hat{x}^2(k-1|k-1)$, $P^2(k-1|k-1)$ 2620, and $\mu^{i|j}(k-1|k-1)$ 2670, all from the sampling period ending at $t_{k-1}$. Where $\hat{x}^1(k-1|k-1)$ 2645 is the state estimate from filter 1 at time $t_{k-1}$ using measurements from time $t_{k-1}$ and $P^1(k-1|k-1)$ 2610 is the corresponding state covariance matrix. Each of the filters use a different mixture of $\hat{x}^1(k-1|k-1)$ 2610 and $\hat{x}^2(k-1|k-1)$ 2620 for their input, For r models, this mixing allows the model-conditioned estimates in the current cycle to be computed using r filters rather than $r^2$ filters, which greatly decreases the computational burden. The inputs to the filters 2615 and 2625, $\hat{x}^{01}(k-1|k-1)$ 2634, $\hat{x}^{02}(k-1|k-1)$ 2631, and the corresponding covariance matrices are computed in the Interaction (Mixing) block 2605.

For the filter matched to $M^j(k)$, the inputs are:

$$\hat{x}^{0j}(k-1|k-1) = \sum_{i=1}^{r} \mu^{i|j}(k-1|k-1)\hat{x}^i(k-1|k-1) \quad (4)$$

$$P^{0j}(k-1|k-1) = \quad (5)$$
$$\sum_{i=1}^{r} \mu^{i|j}(k-1|k-1)\{P^i(k-1|k-1) + [\hat{x}^i(k-1|k-1) - \hat{x}^{0j}(k-1|k-1)] * [\hat{x}^i(k-1|k-1) - \hat{x}^{0j}(k-1|k-1)]^T\},$$

where the conditional model probability is $$\mu^{i|j}(k-1|k-1) = \quad (6)$$
$$Pr\{M^i(k-1) | M^j(k), Z_1^{k-1}\} = \frac{1}{\mu^j(k|k-1)}\pi_{ij}\mu^i(k-1|k-1),$$

and the predicted model probability is $$\mu^j(k|k-1) = Pr\{M^j(k)|Z_1^{k-1}\} = \sum_{i=1}^{r}\pi_{ij}\mu^i(k-1|k-1). \quad (7)$$

Using the measurements, z(k) 2630, for the filter matched to $M^j(k)$, the updates are computed using the familiar Kalman Filter equations:

$$\hat{x}^j(k|k-1)=\Phi^j(k,k-1)\hat{x}^{0j}(k|k-1), \quad (8)$$

$$P^j(k|k-1)=\Phi^j(k,k-1)P^{0j}(k|k-1)[\Phi^j(k,k-1)]^T+G^j(k,k-1)Q^j(k-1)[G^j(k,k-1)]^T, \quad (9)$$

$$v^j(k)=z(k)-H^j(k)\hat{x}^j(k|k-1), \quad (10)$$

$$S^j(k)=H^j(k)P^j(k|k-1)[H^j(k)]^T+R^j(k), \quad (11)$$

$$K^j(k)=P^j(k|k-1)[H^j(k)]^T[S^j(k)]^{-1}, \quad (12)$$

$$\hat{x}^j(k|k)=\hat{x}^j(k|k-1)+K^j(k)v^j(k), \quad (13)$$

$$P^j(k|k)=[I-K^j(k)H^j(k)]P^j(k|k-1), \quad (14)$$

where $\hat{x}^j(k|k-1)$ is the predicted state estimate under $M^j(k)$ $P^j(k|k-1)$ is the corresponding prediction covariance, $v^j(k)$ is the residual, $S^j(k)$ is the residual covariance matrix, $K^j(k)$ is the Kalman gain matrix, $\hat{x}^j(k|k)$ is the updated state estimate under $M^j(k)$, and $P^j(k|k)$ is the updated covariance matrix.

The likelihood of the filter matched to $M^j(k)$ is defined by $\Lambda^j(k)=f[z(k)|M^j(k), Z_1^{k-1}]$, where f[•|•] denotes a conditional density. Using the assumption of Gaussian statistics, the filter residual and the residual covariance, the likelihood is $$\Lambda^j(k) = \frac{1}{\sqrt{\det[2\pi S^j(k)]}}\exp\left\{-\frac{1}{2}[v^k(k)]^T[S^j(k)]^{-1}v^j(k)\right\}. \quad (15)$$

The probability for $M^j(k)$ 2665 is:

$$\mu^j(k|k) = Pr\{M^j(k)|Z_1^k\} = \frac{1}{c}\mu^j(k|k-1)\Lambda^j(k), \quad (16)$$

where the normalization factor c is:

$$c = \sum_{j=1}^{r} \mu^i(k \mid k-1)\Lambda^i(k). \quad (17)$$

These computations are performed in the Model Probability Update block 2635.

Finally, the combined state estimate x̂(k|k) 2660 and the corresponding state error covariance for the IMM are given by:

$$\hat{x}(k \mid k) = \sum_{j=1}^{r} \mu^j(k \mid k)\hat{x}^j(k \mid k), \quad (18)$$

$$P(k \mid k) = \quad (19)$$
$$\sum_{j=1}^{r} \mu^j(k \mid k)\{P^j(k \mid k) + [\hat{x}^j(k \mid k) - \hat{x}(k \mid k)][\hat{x}^j(k \mid k) - \hat{x}(k \mid k)]^T\}$$

The final state estimate, x̂(k|k) 2660, is the best estimate of the target state and P(k|k) is the error covariance matrix for this optimal state estimate.

In the case of a series of seemingly random events, systems and methods for validating an event with other known events are further disclosed. For example, a user goes to Starbucks® each day at 8 AM and the Starbucks® is across the street from a different coffee shop. If the user's usual coffee shop is busy he may go across the street to buy his coffee. To validate the user's activities, similar events may be associated as likely the same, or may be distinguished as truly different. A Nearest Neighbor Joint Probabilistic Data Association Filter (NNJPDAF) may be applied. This filter handles the problem of taking a response measurement from an event and either associating it to an existing event, rejecting the response measurement because it is clutter, or sending it to an event management process to start a new event.

In some embodiments, the process is to first define a physical validation region for each event and to identify all response measurements that fall within that region. For a one-dimensional case the validation region for an event is constructed around the predicted measurement for the event. Using the previous event state, the predicted response measurement is computed by propagating this state to the time of the next response measurement. This predicted measurement is the center of the validation region. If the measurement falls within this validation region, then it is considered as a candidate for association to the event; otherwise, it is rejected.

The data association filter is the nearest-neighbor joint probabilistic data association filter (NNJPDAF). To help explain what the NNJPDAF is, the probabilistic data association filter (PDAF) for the single event case will be discussed first. The PDAF is a Bayesian approach that computes the probability that each measurement in an event's validation region is the correct measurement, and the probability that none of the validated measurements are the correct measurement. The non-parametric version of the filter will be used since it does not require prior knowledge of the special density of the clutter. Those skilled in the art of state estimation will academically understand the math as it is well known in the art, further discussion is therefore not required.

In another embodiment, the system models are discrete time linear systems, the vectors are scalar magnitudes, and the IMM is scalar weighted. The scalar Kalman can be represented in a state variable format given by the equation:

$$x_s = ax_{s-1} + bu_s \quad (20)$$

$$x_s = ax_{s-1} + bu_s + w_s \quad (21)$$

$$z_s = h\dot{x}_s + v_s \quad (22)$$

$$\hat{x}_s = a\hat{x}_{s-1} + bU_s \quad (23)$$

Where, for this discussion, the state, $x_s$, is a scalar, a and b are constants and the input $u_s$ is a scalar; l represents the time variable. Note that many texts use the variable k to represent time; here, s is used in place of the k. The equation states that the current value of the variable $(x_s)$ is equal to the last value $(x_s-1)$ multiplied by a constant (a) plus the current input $(u_s)$ multiplied by another constant (b). Equation 1 can be represented pictorially, where the block with T in it represents a time delay (the input is $x_s$, the output is $x_s-1$). Further discussion of this is not required as it is well known in the art the use of a scalar Kalman and its derivatives.

Topology

Today the technology sphere or technology "ecosystem" is dynamic and rapidly changing, where wireless capability is growing exponentially; cloud based architectures are becoming more appealing and attainable at manageable costs. It may be helpful to re-think the idea of this changing ecosystem with transitional and end architectures in mind, and the placement of what is called a "data abstraction layer". This abstraction layer is distinguished by data movement, defined as data on the move and data at rest, and includes considerations for data generation, data storage, data processing, and the role of the server and browser in the cloud.

A first transitional step for embracing a concept known as the Internet of Things (IoT, defined as a proposed development of the Internet in which everyday objects have network connectivity, allowing them to send and receive data) is the emergence of fog computing or fog networking. This is basically an architecture that uses one smart device, a collaborative multitude of smart devices, or near-user periphery devices to carry out a substantial amount of processing and storage (rather than stored primarily in cloud data centers), communication (rather than routed over the Internet backbone), control, configuration, measurement, and management rather than controlled primarily by network gateways such as those in the Long Term Evolution (LTE) such as 4G LTE.

In a further discussion of an embodiment with respect to security, data collected from the face, eye(s), or voice constitute unique biometric data of the user or user groups, if desired. Additionally, a user's habits, movements, gait, purchases, and numerous other aspects of their daily life may be used as personal identifiers. These collected data can be used to generate a unique private key in a system of public key and private key cryptography. Cryptographic systems have been widely used for information protection, authentication, and access control for many years and as such are well known in the art of information security.

Multi-factor authentication relies on "old school" security concepts. By increasing the factors from 1 to N, the assurance that the person is authentic is increased mathematically. Two-factor authentication is common in general commerce while three-factor authentication and beyond is common for national security. Factors comprise RSA tokens, Google authenticator, Email or text verification codes, and biometrics. However, multi-factor authentication has similar compromises to passwords: pass phrases are forgotten, secure tokens are lost, biometrics fall out of tolerance (for instance, a cut or bandage on a finger, in the case of fingerprint readers). These authentication schemes also tend to depend on specialized applications which can be uninstalled, compromised, or wiped. Additionally, smart phones and computers get lost, stolen, and hacked, too.

The key to any abstracted layer is the ability to abstract away from some device or software operational or strategic complexity; these could include proprietary aspects, including trade secrets and intellectual property. The abstraction can support extended or new business models to a technology supplier. A good example of this is the architecture is the NEST™ Labs business model. This model could be loosely referred to as a "razor/razor blade" model; in this case the NEST™ thermostat is the razor, the NEST™ Services and data collection are the razor blades, or, simply stated, the business model includes the sale of the thermostat and a monthly recurring service. In addition to the sale of hardware and services, this business model supports data harvesting of a user in his home. In this system, the thermostat serves data off to a centralized server for the purposes of "learning".

Figure 11:
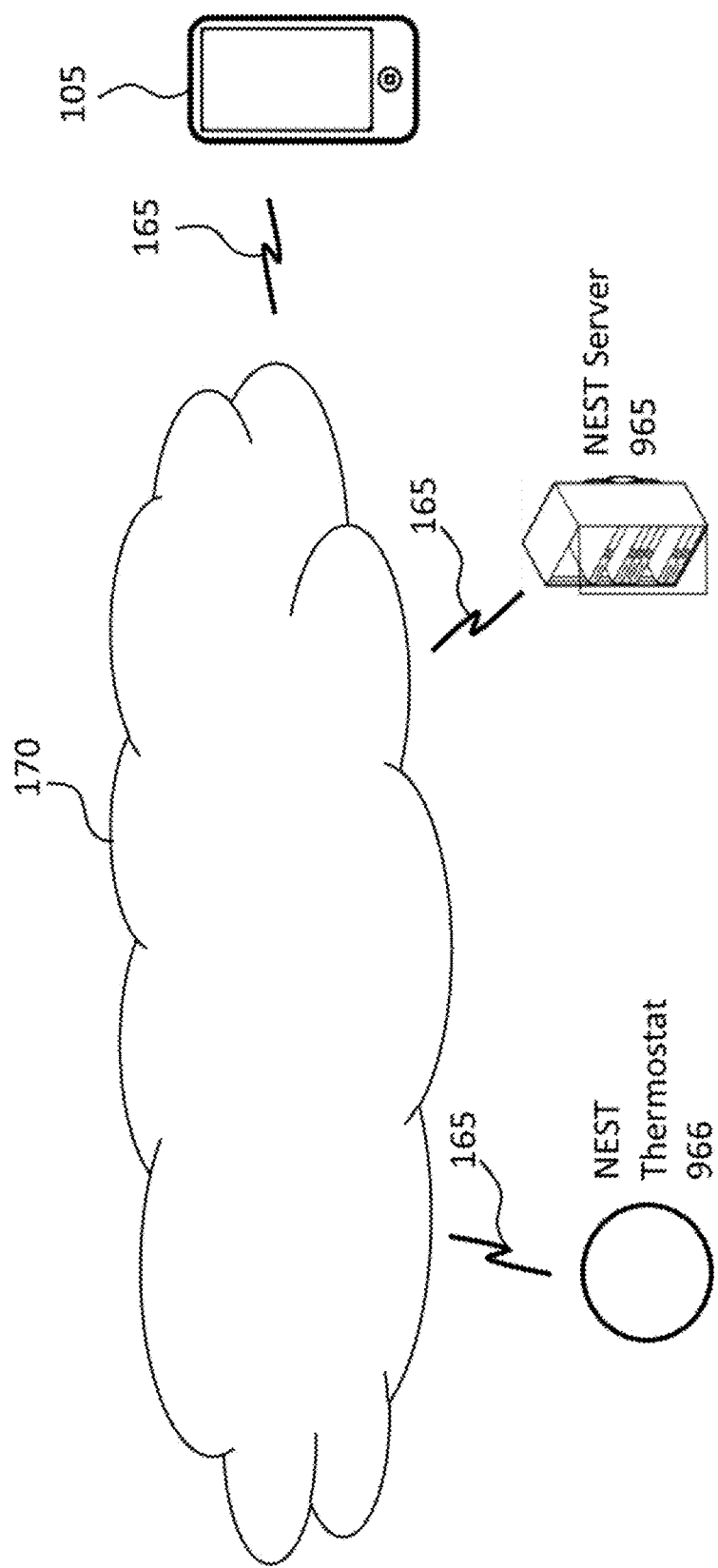
FIG. 11 depicts a NEST™ thermostat system and server.

Even though NEST™ products can be accessed by the Internet, they cannot be directly connected to by a smart device for the control and operation a home heating system. FIG. 11 depicts a smart phone 105 connected via a packet network 165 to the cloud 170. In order for the user to access his or her home thermostat 966, the user needs to access their page on the NEST™ Services server 965. However, the traditional role of web server and browser has been expanded since the emergence of the new HTML 5 standard. There has been what looks like a role reversal of the server and browser, one where the web server is now the smart thermostat; this server is simply serving small amounts of data to a fixed URL in the cloud running a browser. This browser in the cloud can be accessed by a user using a smart device or computer from virtually anywhere to read or interact with their thermostat. Using the web server in this role is now a key and underlying concept of the IoT, one where complexity and cost are greatly reduced.

FIGS. 12 through 16 depict software architecture abstraction from devices to the cloud. It is inevitable two things will happen in the near future: first, wireless bandwidth will continue to grow exponentially, with gigabit service on the horizon; and second, the Internet of Things (IoT) architecture will deploy as it continues to deploy today—very rapidly. What is needed are methods and systems disclosed on how an identification engine can strategically develop within a rapidly evolving ecosystem. FIGS. 12 through 16 depict an abstraction transition model from mobile and/or wearable devices to the cloud.

Figure 12:
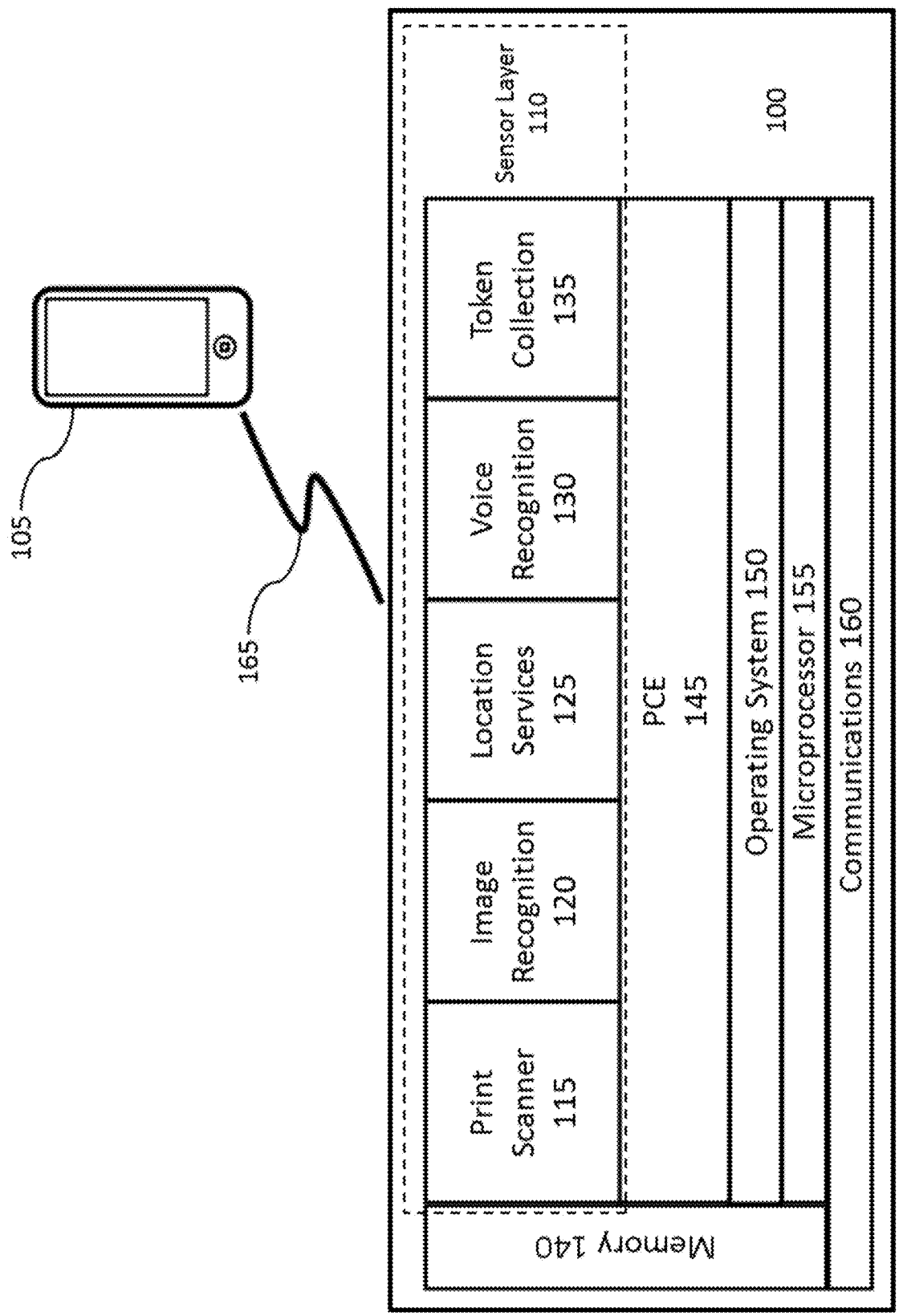
FIG. 12 depicts exemplary smart phone system architecture prior to abstraction.

FIG. 12 depicts an embodiment of smart phone 105 software architecture 100 prior to abstraction to the cloud. At the beginning of the transition, the embedded smart phone 105 includes a number of tools, applications, or utilities operating in the FOG as a combined real-time service. The smart phone 105 may be wirelessly connected to another smart device (such as a tablet, laptop, or home or office PC) or simply to the Internet through an 802.11 link 165. All of the services operate in the smart phone 105, microprocessor 155, or are stored in a memory 140. This embodiment could operate as a stand-alone computer, with an operating system (OS) 150, sensor layer 110, PCE 145, micro-processor(s) 155, communications 160, and/or other logic elements. In some embodiments, the sensor layer may comprise a print scanner 115, image recognition 120, location services 125, voice recognition 130, and token collection 135. In a first transition step of the first embodiment, some of the non-real-time applications may be off loaded to applications run on other smart devices. However, this first transition embodiment would still be highly dependent on the locally available resources in the smart phone 105 to operate as intended.

Figure 13:
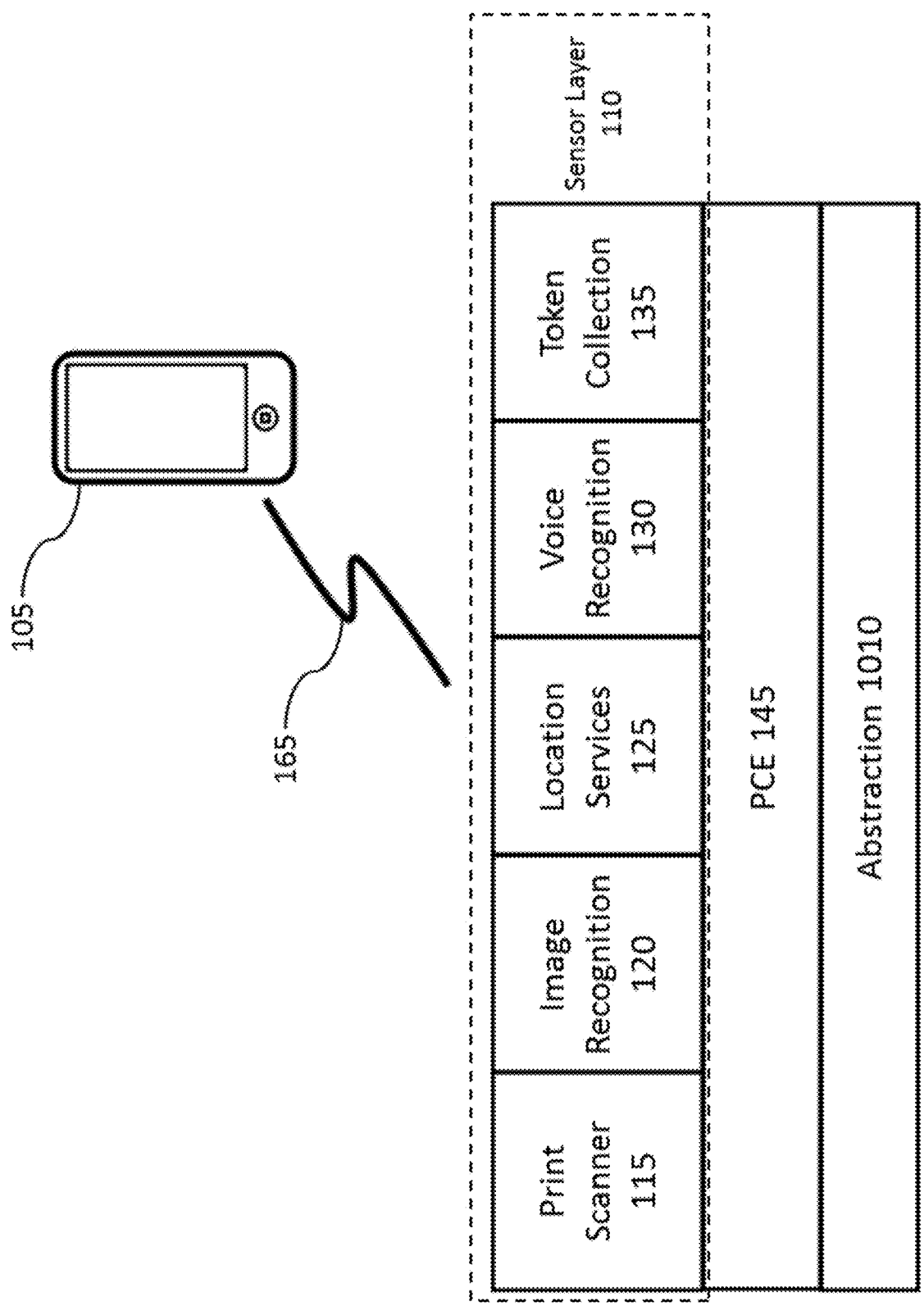
FIG. 13 depicts smart phone system architecture of FIG. 12 with the processing capabilities abstracted to the cloud.
Figure 14:
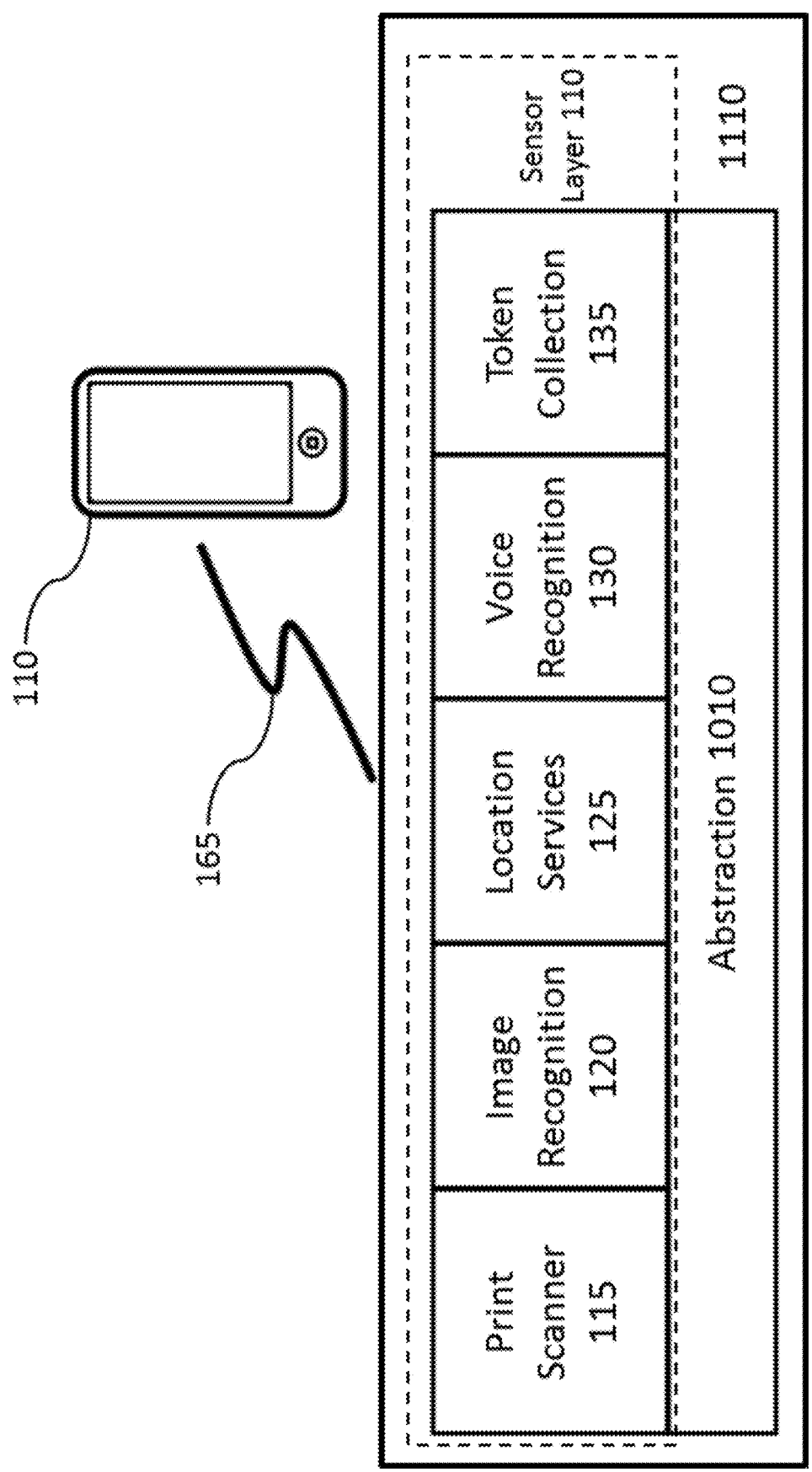
FIG. 14 depicts smart phone system architecture of FIG. 12 with processing capabilities and the Persona Credential Engine abstracted to the cloud.
Figure 15:
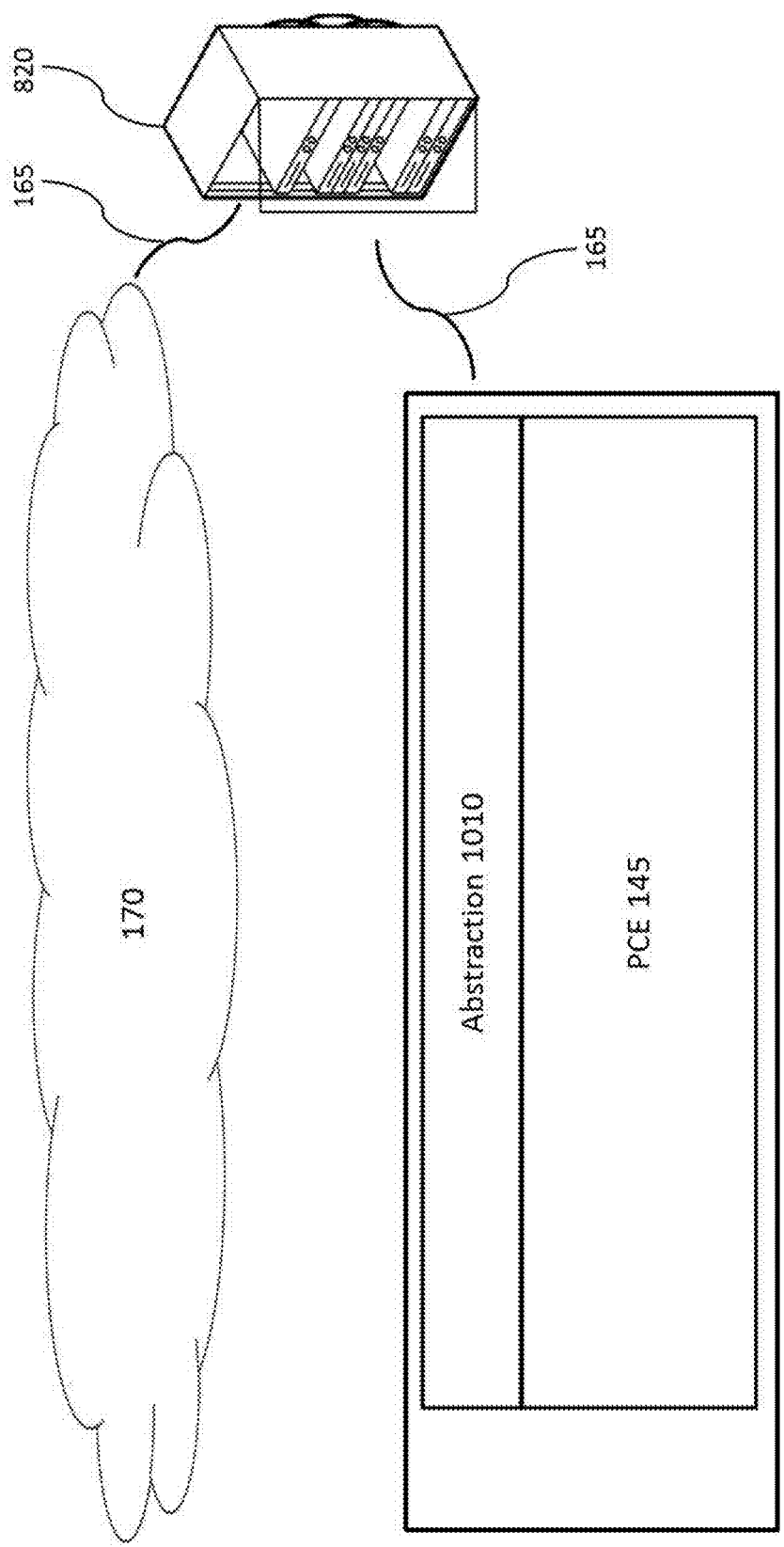
FIG. 15 depicts the architecture that was abstracted from the smart phone of FIG. 12 moved to a remote server.

FIGS. 13 through 15 depict a second step in the transition from the software architecture of FIG. 12, where the wireless bandwidth is now near real-time. A web server and browser relationship exists operationally in parallel with the PCE 145 in the cloud 170. They operate and interact with each other in near real-time across the abstraction layer 1010. FIG. 13 depicts smart phone 105 software architecture 100 with the processing capabilities (memory 140, OS 150, microprocessor 155, and communications 160) abstracted to the cloud 170. The processing capabilities are replaced with an abstraction layer 1010. FIG. 14 depicts the smart phone 105 software architecture 100 of FIG. 12 with the PCE 145 abstracted to the cloud 170. At this point in the transition, the software architecture becomes the abstracted software architecture 1110. FIG. 15 depicts the PCE server 820, running software 1210 with the PCE 145 and abstraction layer 1010, communicating with the cloud 170. The smart phone 105 is connected to a centralized server-browser 820 that operates the PCE service interface; in some embodiments operating much like SIRI (Speech Interpretation and Recognition Interface) does for audio. PCE, like SIRI, may operate in the cloud 170. The smart phone 105 now operates with a minimum amount of software, a processor richer in features and configured with a limited or possibly no operating system using a publish/subscribe messaging scheme.

Figure 16:
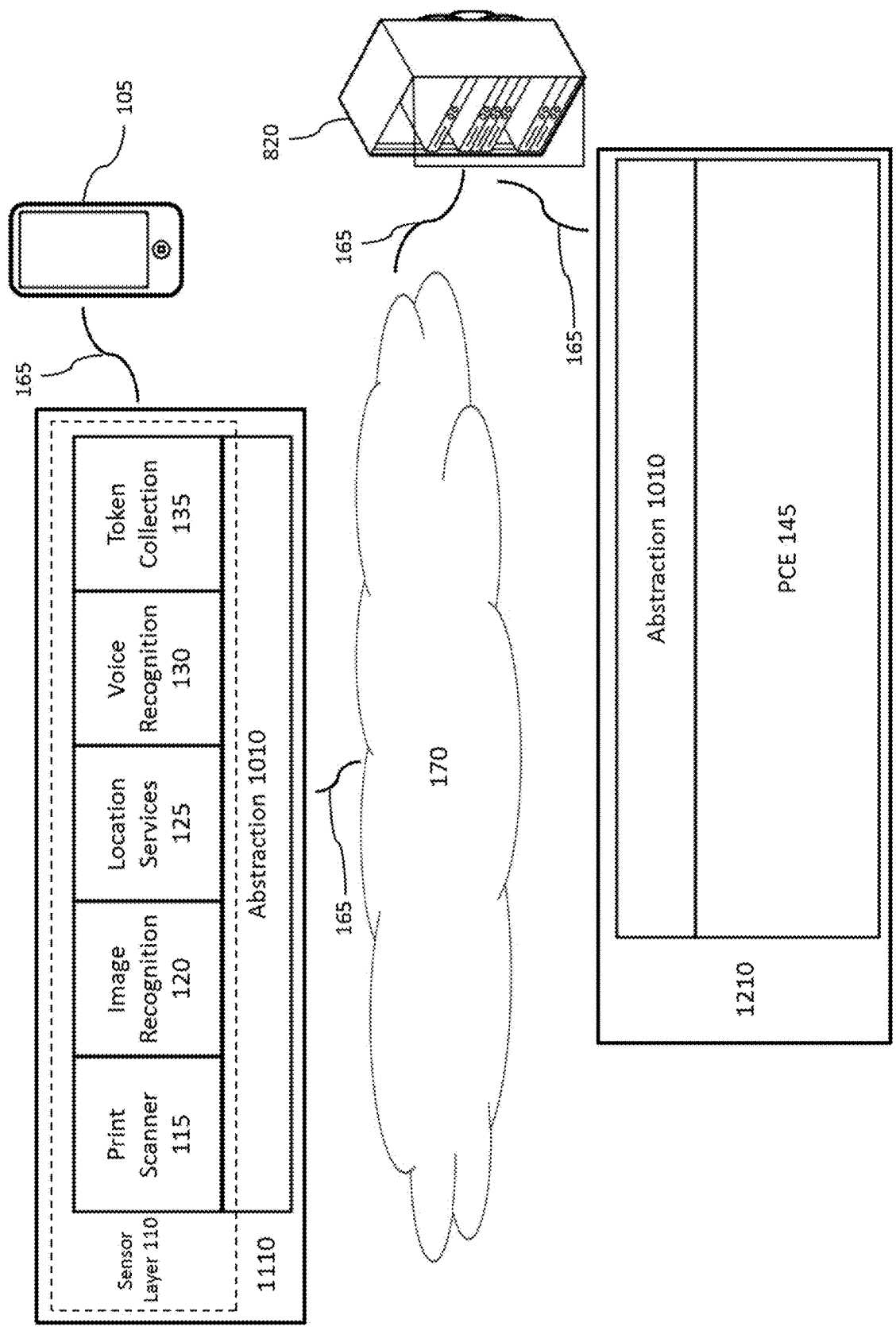
FIG. 16 depicts final evolution of the software of FIG. 12 with architecture remaining on the smart phone and the architecture on the remote server, both in communication with the cloud.

FIG. 16 depicts a cloud based implementation within an IoT architecture of a PCE server 820 connected by a very high speed packet based link, a wireless link that would rival or potentially outperform the typical communication bus in a local processor. These processor busses operate as subsystems of the processor to facilitate transfer of data between computer components or between computers. Typical bus types include front-side bus (FSB), which carries data between the CPU and memory controller hub; direct media interface (DMI), which is a point-to-point interconnection between an integrated memory controller and an I/O controller hub in the processor; and Quick Path Interconnect (QPI), which is a point-to-point interconnect between the CPU and the integrated memory controller. Other high speed busses have been used in the embedded computing industry to include SPI for inter-processor communication.

FIG. 16 is the final step in the transition of the embodiment of FIG. 12. The Internet is now prolific and operates at speeds in excess of processor buses. The PCE server 820 in this embodiment is cloud-based and real-time for all intents and purposes. Data are collected and aggregated in the PCE server 820. The data may be collected at least one of continuously, periodically, and via user initiation. The PCE server 820 in this embodiment is now capable of implementing advanced algorithms based on continuous learning, as well manual user inputs. The PCE server 820 can now make predictions on what the user will do next, changes in the environment of the user, and other various aspects of the user's daily life.

Figure 17:
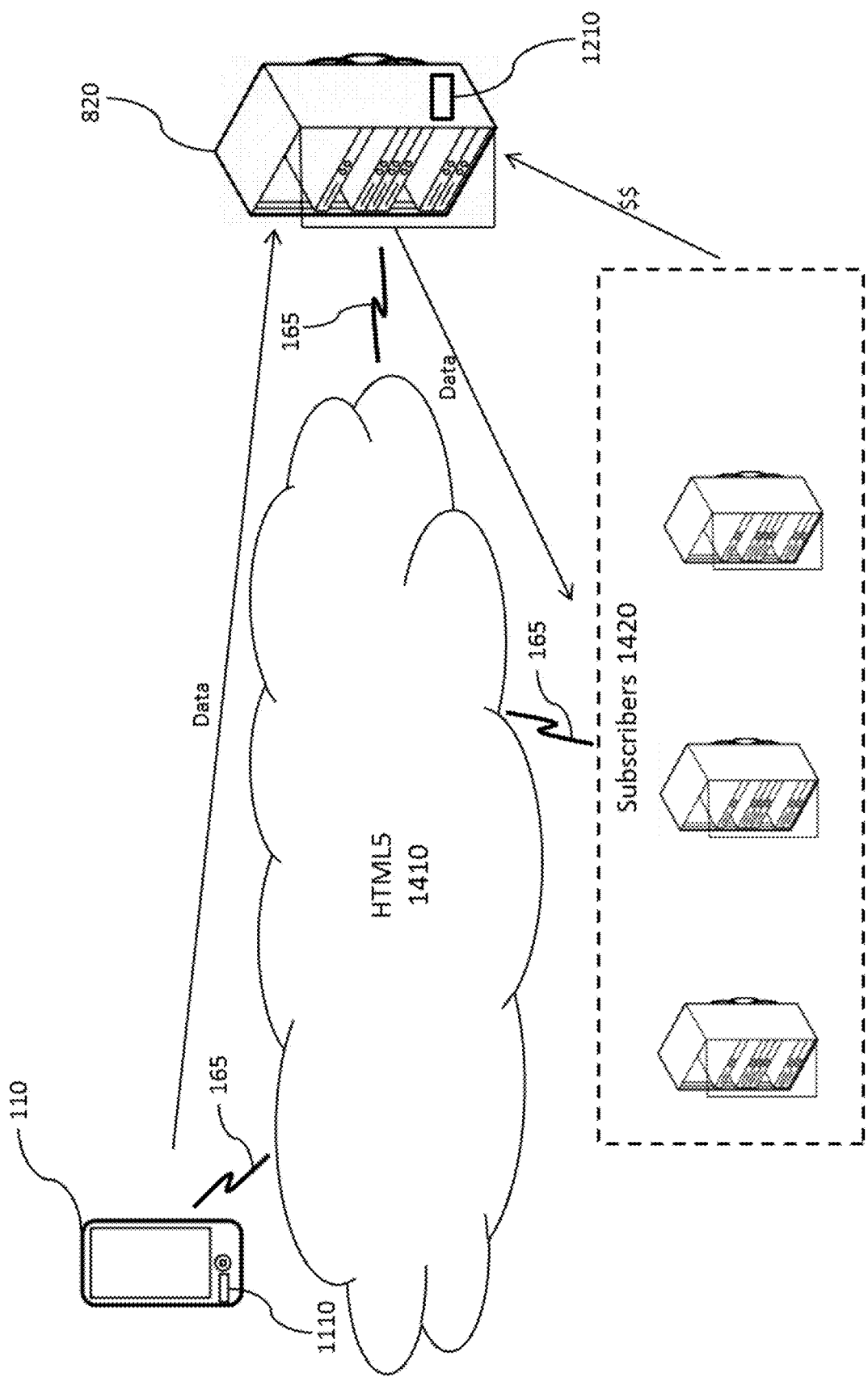
FIG. 17 depicts the abstracted PCE in use with HTML5, mobile devices, subscribers, and the server.

FIG. 17 depicts the PCE server 820 of FIGS. 15 and 16, with the abstracted software 1210, the smart phone 105 with abstracted software 1110, and subscribers 1420 in communication 165 with each other and the cloud using HTML5 1410. The smart phone 105 sends data to the PCE server 820 which, in turn, sends data to the subscribers 1420. The subscribers pay for the service provided by the PCE server 820.

Figure 18:
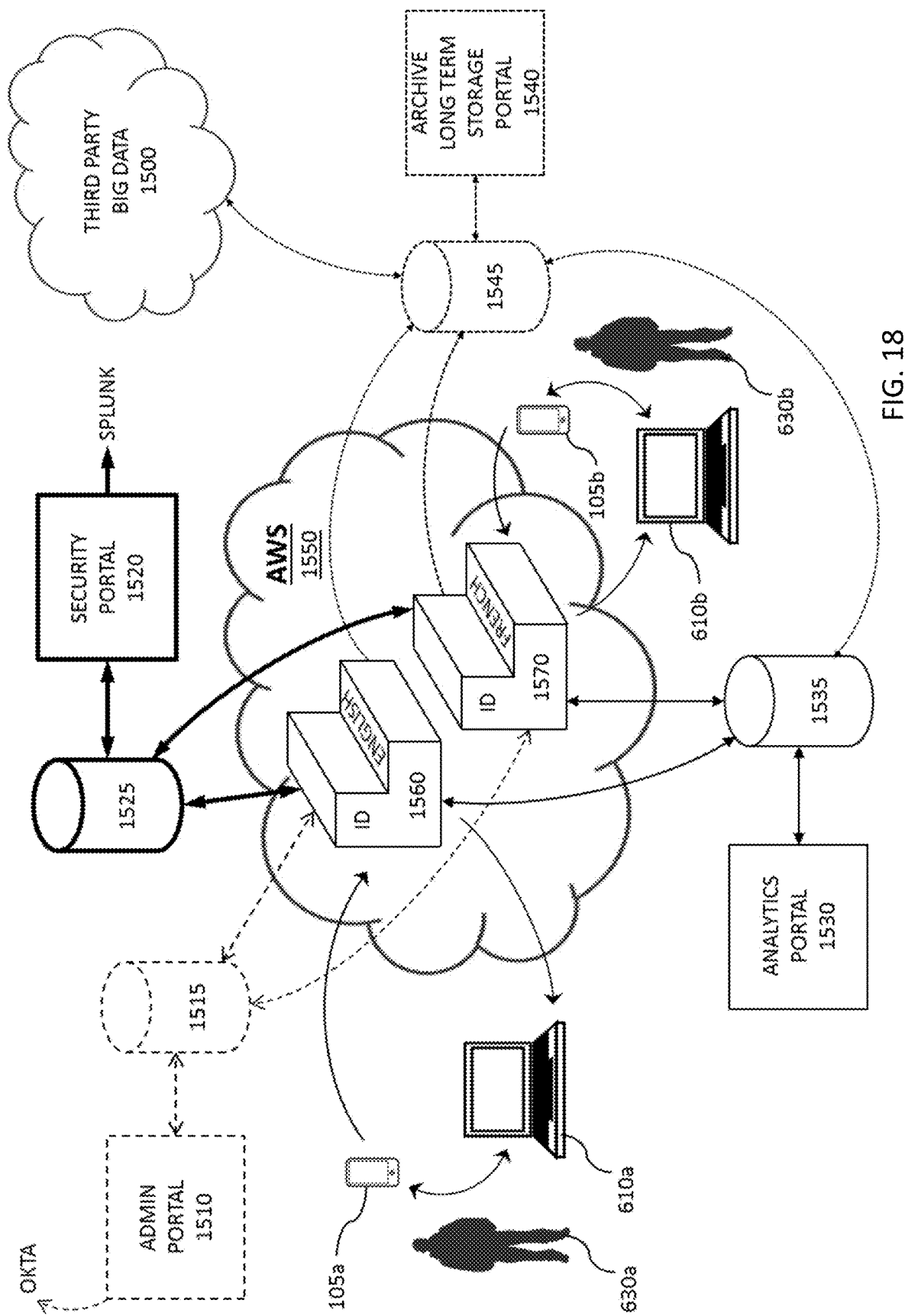
FIG. 18 depicts an overall communication scheme between various databases, users, and Amazon Web Services (AWS).

FIG. 18 depicts an embodiment of an overall communication scheme between various databases, users, and Amazon Web Services (AWS) 1550. In the depicted embodiment, two ID engines are depicted running on the AWS 1550. A first user 630a is using his laptop 610a and smart phone 105a in communication with each other and with the English language IDE 1560. A second user 630b is using his laptop 610b and smart phone 105b in communication with each other and with the French language IDE 1570. Both IDEs 1560 and 1570 in the depicted embodiment may communicate with a number of databases such as an administrative database 1515, security event database 1525, analytics database 1535, and an analytics archive database 1545. The administrative database 1515 may be connected to an administrative portal 1510 which may have integration to applications such as Okta. The security event database 1525 may be connected to a security portal 1520 which may have integration to applications such as Splunk. The analytics database 1535 may be connected to an analytics portal 1530. The analytics archive database 1545 may be connected to an archive long-term storage portal 1540 and third party big data 1500. The analytics archive database 1545 and the analytics database 1535 are in direct communication with each other in the depicted embodiment.

Mobile computing and/or sensing devices such as smart phones, tablets, smart watches, fitness trackers, laptops, and other mobile and/or wearable devices are generally represented herein by a smart phone for simplicity. In some embodiments, data providing sensors are not worn or carried by the user. For example, CCTV in a convenience store may provide user identification data such as location, date, time, and facial recognition. As another example, the checkout in a grocery store may provide user identification data such as location, date, time, total amount paid, number of items, and name on the card used to pay.

System Architecture

Figure 19:
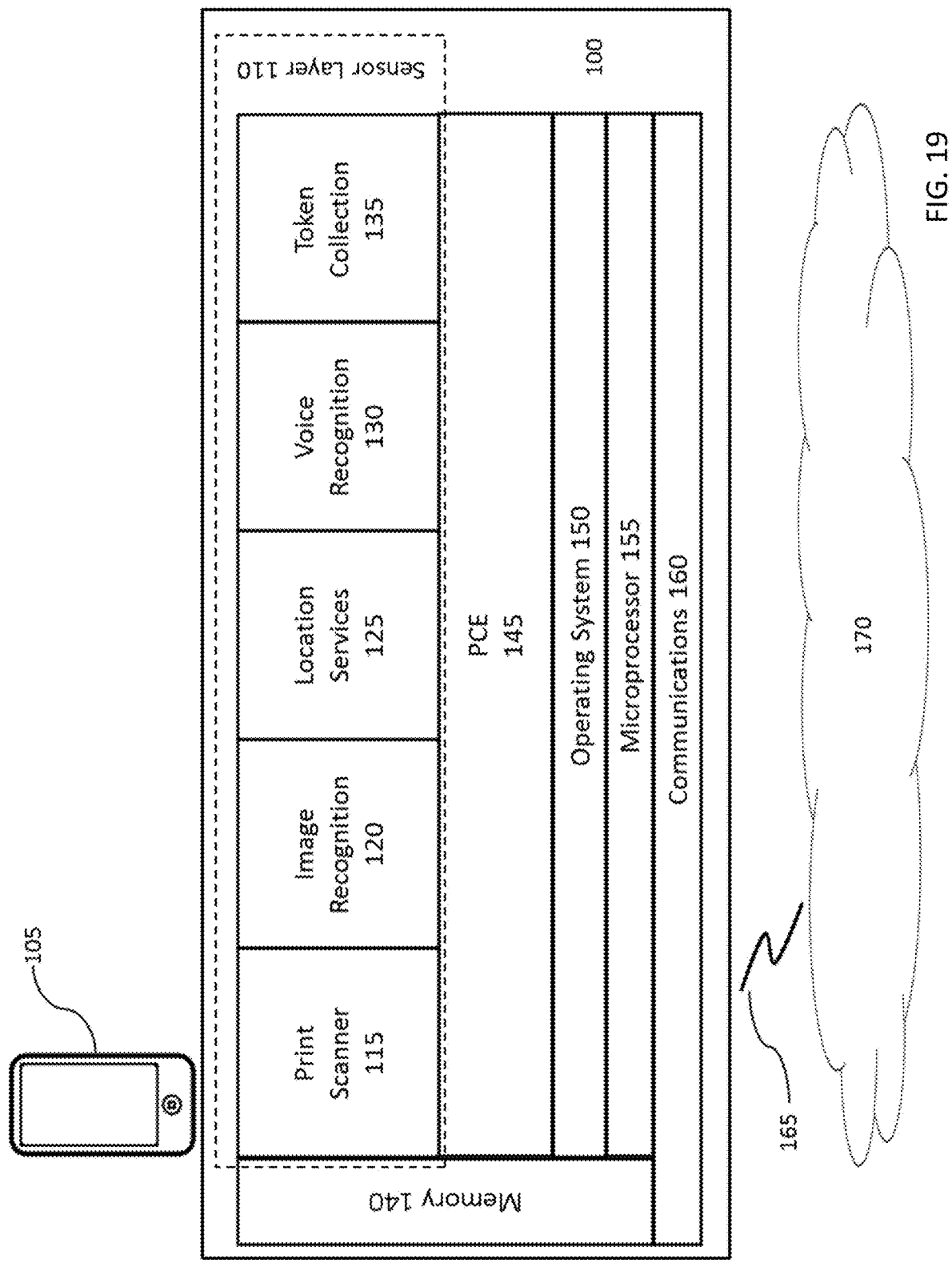
FIG. 19 depicts software on a smart phone in communication with the cloud.

In an embodiment, FIG. 19 depicts software 100 on a smart phone 105 in communication 165 with the cloud 170. The software 100 comprises a sensor layer 110, memory 140, a Persona Credential Engine (PCE) 145, an operating system (OS) 150, microprocessor 155, and communications 160. The sensor layer in the depicted embodiment comprises print scanner 115, image recognition 120, location services 125, voice recognition 130, and token collection 135. In some embodiments, the sensor layer 110 may comprise a different set of sensors and/or fewer or more sensors. For instance, a laptop will likely have all of the sensors shown and described in FIG. 19, whereas a fitness tracker will likely not have any of the sensors of FIG. 19. For example, a fitness tracker may include an accelerometer and a heart rate monitor. Any sensor capable of providing data about the user, the user's environment, and any other data that can be used to increase the confidence of the user's identity are contemplated. The software architecture depicted in FIG. 19 represents the software architecture for a smart phone. The software architecture will likely vary for other mobile and/or wearable devices. For instance, most fitness trackers do not have sophisticated embedded software.

The print scanner 115 may be used to positively identify a user by one or more of fingerprint, thumb print, palm print, lip print, or any other feasible biometric print that is unique to the user. In some embodiments, the print scanner 115 may require the user to perform one or more of twist the print to a preset angle or drag in a preset pattern known only to the user as an additional verification method. For instance, the user enrolls his thumbprint and for added security includes the motion of an "L" shape from upper left to bottom right. When the user inputs his thumbprint for verification he first presses his thumb on the scanning device, waits for an initial scan to be performed, then, while still touching the scanning device, drags his thumb some distance directly downward, stops, and then drags his thumb to the right drawing the shape of an "L". Since the user is the only one who knows his personal verification movement, it prevents others from being able to access his devices by gaining access to his prints.

The image recognition sensor 120 may be used to identify a user by facial, eye or iris, or other identifying images unique to the user. In some embodiments, the image recognition sensor 120 may recognize friends, families, acquaintances, coworkers, or other people related to the user. Additionally, in some embodiments, the image recognition sensor 120 may recognize the environment of the user such as furniture and layout of their living room or office, a Starbucks® the user frequents, landmarks on the user's commute, or other characteristics in the environment a user is in.

Location services 125 may track the location of the user and gains confidence of the user's identity when the user travels in known patterns and/or locations. Examples of confidence gaining location information include the user's daily commute, the user's daily stop for coffee in the morning at the same Starbucks®, and the user's regular trip to the gym three nights a week. In many embodiments, at least some of the location information is also appended with time information that can be further used to increase the confidence of the identity of the user. For example, the user always commutes to work from 8:30 AM to 9:00 AM Monday through Friday, always stops at the Starbucks® on the way at 8:45 AM, and always goes to the gym on Monday, Wednesday, and Friday from 5:45 PM to 6:45 PM. When the user performs these regular activities confidence in the user's identity will rise. When the user performs these regular activities at the regular times confidence will rise even further.

If the user takes a different route in to work, confidence will decrease, particularly if he does it at a different time. For example, the user's wife's car is in the shop and he has to drop her off at her job before heading to his work. He will have to both leave earlier and drive a different route. He may even miss his regular coffee stop, hit it at a different time in the morning, or have to go to a different coffee shop. All of these factors will negatively impact the confidence in his identity. Should his identity confidence become so degraded, he may need to actively rebuild his identity confidence. As an example, he does stop for coffee at a different time and different location. In order to use his credit card to pay for it he may need to input one or more of a password, passcode, PIN, fingerprint, voice, or other identifier(s) in order to confirm his identity. When he performs confirmation successfully, his identity confidence will begin to rise again.

Voice recognition 130 may recognize the user's voice and speech patterns as well as the voices and speech patterns of people the user commonly interacts with. Voice recognition 130 may be active or passive. For instance, for a passive system, one or more of the user's devices may constantly be "listening" for the user's voice and speech pattern and/or other voices and speech patterns it recognizes. The confidence will increase every time it "hears" a voice or speech pattern it recognizes.

Additionally, in some embodiments, the voice recognition system 130 may recognize other sounds in the environment of the user. For example, the user watches "The Office" television show every Thursday night at 9:00 PM and thus the voice recognition system 130 recognizes the show's intro music and/or voices and speech patterns of the characters on the show. As another example, the user's alarm clock is set to go off once every weekday at 6:00 AM and play "Kashmir" by Led Zeppelin. The confidence will rise every morning at 6:00 AM when the alarm clock goes off. If the alarm goes off at 4:00 AM on a weekday and plays "More Than a Feeling" by Boston the confidence will go down, initially. If the user begins to consistently set the alarm for 4:00 AM and "More Than a Feeling", maybe because he is starting a new pre-work exercise regime, and he has established his identity, the confidence will begin to increase over time. In some embodiments, the confidence will increase by a greater amount when the system hears the user's voice and a smaller amount when it hears other voices or sounds it recognizes.

For active voice recognition, the system may request permission from the user to perform voice recognition, may not begin listening until the user accepts, and may only listen for the duration that the user authorizes. The user will have the ability to set voice recognition preferences as well as other preferences relating to how and what data is tracked.

FIG. 11 depicts the components of an embodiment of the Persona Credential Engine (PCE) 145. The PCE 145 comprises sensor manager 205, data manager 210, Facet manager 215, identity configuration 220, token manager 225, Persona Facet (PF) 230, Abstract Facet (AF) 235, Identity Facet (IF) 240, Identity Engine (IDE) 250, prognostics health management 255, database management 260, access log 265, persona policies 270, and key generator 275. The Persona Credential Engine (PCE) may house all aspects of a person's credentials from the insignificant to the vital. Each realm requiring authentication may define what subset of criteria is necessary to satisfy authorization as well as tolerance policies. Further abstractions may then fall into a Trust Level comprising a mixture of active and passive credentials. Allow for a policy driven algorithm that may passively adjust a user's Trust Level without requiring active input until absolutely necessary.

A Facet is a verifiable physical or virtual property of a person, a group of persons, or a digital entity which can be used to authenticate this person, group, or identity. The combination and rules relating these Facets are referred to herein as policy or configuration. In some embodiments, a Facet may carry a timestamped list of recent verification attempts and their outcomes (success or failure). Each Facet may have an interface function to check this verification list as well as a procedure to trigger a new try (which might trigger a prompt, dialog, haptic feedback, buzz, or audio for a user to provide necessary information for the attempt—i.e. unlock the phone, touch a Near Field Communication (NFC) tag, scan a barcode, shake a phone). Each Facet may also have a list of public keys of other ID Engines which are allowed to access this Facet. In some embodiments, they may have to encrypt their request with their private key, so origin of the request can be ensured. The answer is encrypted with the respective public key. This also allows for fine grained access permissions to be set and also allows a user to revoke these later. ID Engines generally trust the results of these requests. Should any aspect of the system become compromised, single Facets of single entities may be revoked and re-connected.

In some embodiments, one or more Facets may be related either directly or indirectly to one or more other Facets. Some Facets may be entirely independent of all other Facets. Facets may be replaceable due to waning favor, compromise, or for any reason that renders the Facet ineffective. The ID Engine, however, maintains the Trust Level (to be defined what and who exactly the Trust Level defines, kind of a weight somebody can attach to one Facet) of each Facet.

Some example Facets include:
- Unlocked Devices (phones, tablets, laptops, and other handheld computing devices or wearables) where user was able to provide valid logon credentials
- Common User Locations (Pattern of locations with according timestamps—For example: A user always goes to the Starbucks® on Fifth Avenue at 8:00 AM on weekdays and then to work)
- Network Access where user was able to provide valid logon credentials
- Password
- Possession and Proximity of Devices Registered to the User (phone, laptop, tablet, badge, smartwatch, fitness tracker, and wearables in general)
- Proximity to Known People or Environments
- Fulfilled Credentials in Corporate Network which also may include Timestamps (for example: recorded gate or door access, phone calls recorded from employee's phone, etc.)
- Behavior/Behavior History
- Biometrics
- Fulfilled challenge on any combination of other Facets and devices
- Scan Barcode (to prove event for multiple persons' presence at defined or the same location)

In some embodiments, the user can set preferences to choose what is tracked and what is not. For instance, the user may choose to use manual face or voice recognition and choose to never allow passive face or voice recognition. The user may connect as much or as little of his data, applications, and activities to his Persona Credential as he chooses. In some embodiments, at least some of the tracking preferences may be predetermined mandatory sets as defined by policy when there are organizational or institutional requirements to be met. In some embodiments, policies may mature to eventually be adaptive in nature.

In some embodiments, some Facets may take longer periods of time to obtain an initial baseline history by which to begin comparisons to. While this is regarded as temporary to the Facet, earlier Facets may be "brought online" before the later ones. Facets that initialize earlier may be less reliable than later initializing Facets. Facets that take longer to initialize are likely to be more reliable because longer initialization implies longer intrinsic sampling times based on larger trend data sets. In some embodiments, some Facets will tend to degrade in Trust Level over time if they are not updated. In some embodiments, over time Trust is either gained or diminished for each Facet or neighborhood of Facets as additional data is gathered. Trust Levels may increase/decrease due to an accumulation of success/failure factors. In some embodiments, rate of change in either direction may be policy driven and not necessarily instantaneous.

A Facet's initialization may be learned, trained, or preloaded. For instance, habits such as which Starbucks® the user frequents, how often he goes to Starbucks®, and his usual order may be learned over time. Trained data includes learned data that may be manipulated by the user. For instance, the user may allow the PCE to ask him questions regarding his activities. For example, after going to a new gym the PCE may ask the user if he has switched gyms and is now planning to regularly attend the new gym. Preloaded Facets may include sourcing information from social media and related data, answers to a series of questions, item or movie ratings on a connected Amazon™ account, other data the user adds, or data from applications the user allows access to.

Figure 21:
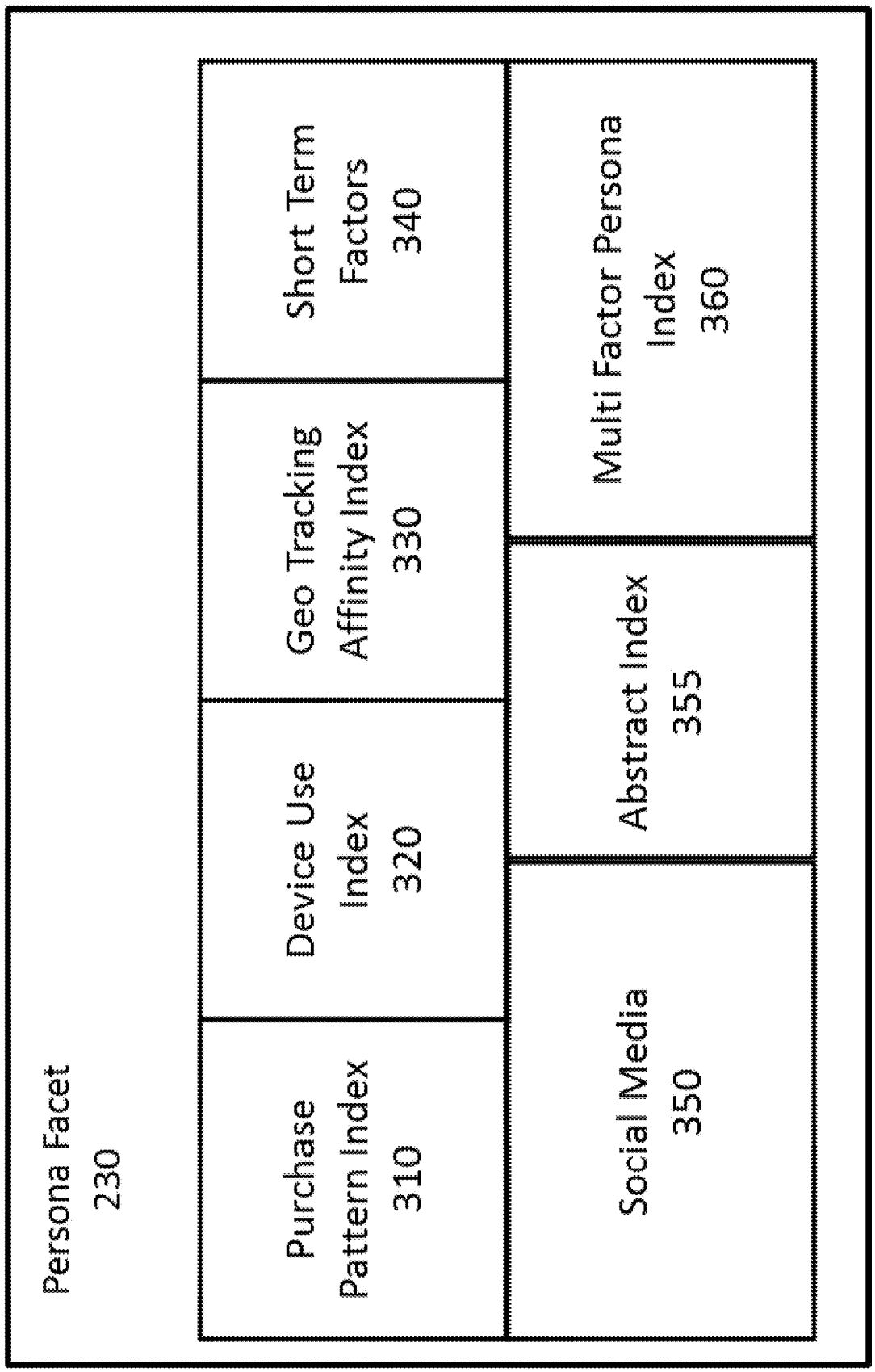
FIG. 21 depicts the components of an embodiment of a Persona Facet.
Figure 23:
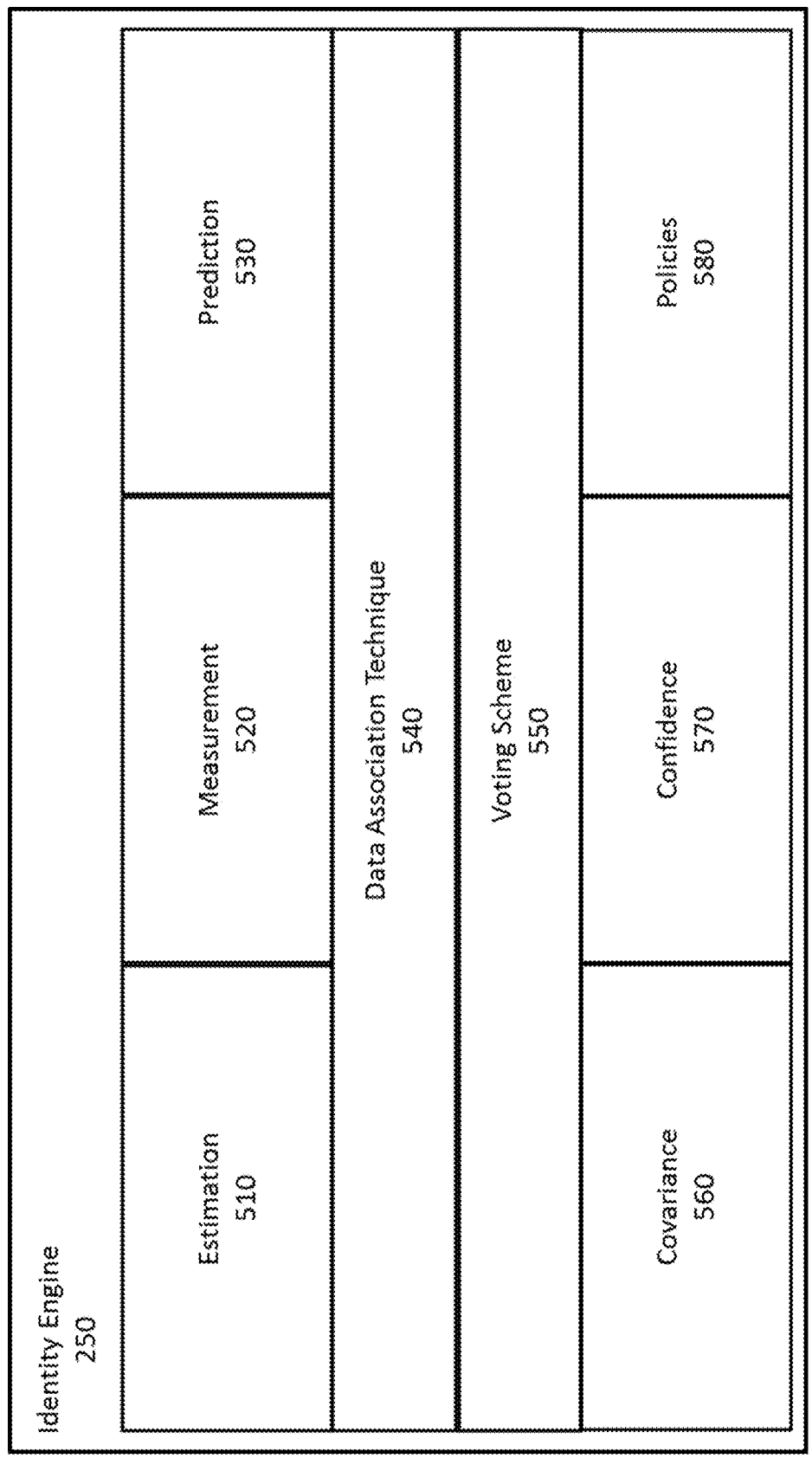
FIG. 23 depicts the components of an embodiment of an Identity Engine.
Figure 24:
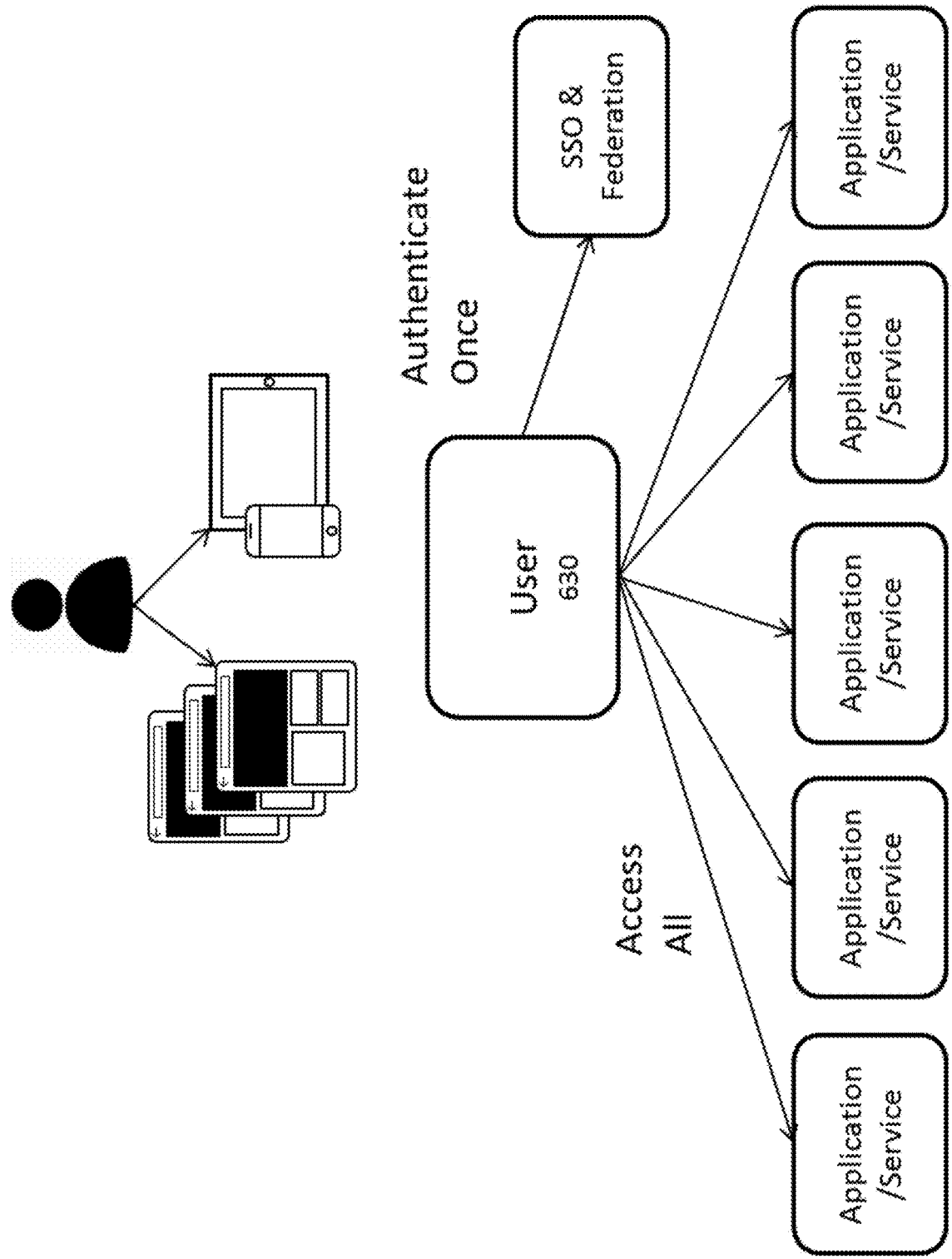
FIG. 24 depicts example Single Sign-On (SSO) architecture.

FIG. 21 depicts the components of an embodiment of a Persona Facet (PF) 230. Persona Facets 230 are dynamic in nature and represent a user's perceived or evident personality. The depicted PF 230 comprises purchasing patterns 310, device use index 320, geo track affinity index 330, short term factors 340, social media 350, abstract index 355, and multi-factor persona index 360. The purchase pattern index 310 may track the user's standard purchasing patterns such as Starbucks® latte 7 AM weekdays, 76 Gas™ every Thursday at 5 PM, Dominos™ every Friday at 8 PM, and so on. The device use index 320 may include information about a user's registered devices such as time and duration of use including last accessed, upgrade, power status, and common activity log. The geo track affinity index 350 may include locations the user visits including frequency of visits and time of the week probability, same location by multiple sources, and "friend" associations. Short term factors 330 may include data such as the user going to a restaurant, movie, or concert (things that don't happen frequently or consistently). For example, the geo track may identify the events listed in the user's personal calendar or may identify the venues via a GPS indication on an electronic map application. Social media 350 may include data from social media sites such as Facebook™, Tumblr, Instagram, YouTube, etc.

FIG. 22 depicts the components of an embodiment of an identity Facet (IF) 240. Identity Facets 240 are data sets representing characteristics that are unique to the user and relatively static, i.e. they update less often than Persona Facets 230 (FIG. 21). For instance, a user's surname will likely not change more than a few times, or not at all. The depicted IF 240 comprises permanent factors 410, biometrics 420, long term factors 430, password index 440, device affinity index 450, professional media 460, abstract index 465, and multi-factor identity index 470. Permanent factors 410 may comprise data such as date of birth, social security number, and national identification number (NIN). Biometrics 420 may comprise any form of biometric identification including fingerprints, face recognition, voice recognition, and other biometric data unique to the user. Long term factors 430 may comprise data such as primary address, employer ID, and surname. The password index 440 may comprise standard passwords, passcodes, PINs, and/or security questions. The device affinity index 450 may comprise information about a user's registered devices such as: International Mobile Station Equipment Identity (IMEI) or Media Access Control (MAC) ID. Professional media 460 may comprise professional media sites such as LinkedIn.

Figure 20:
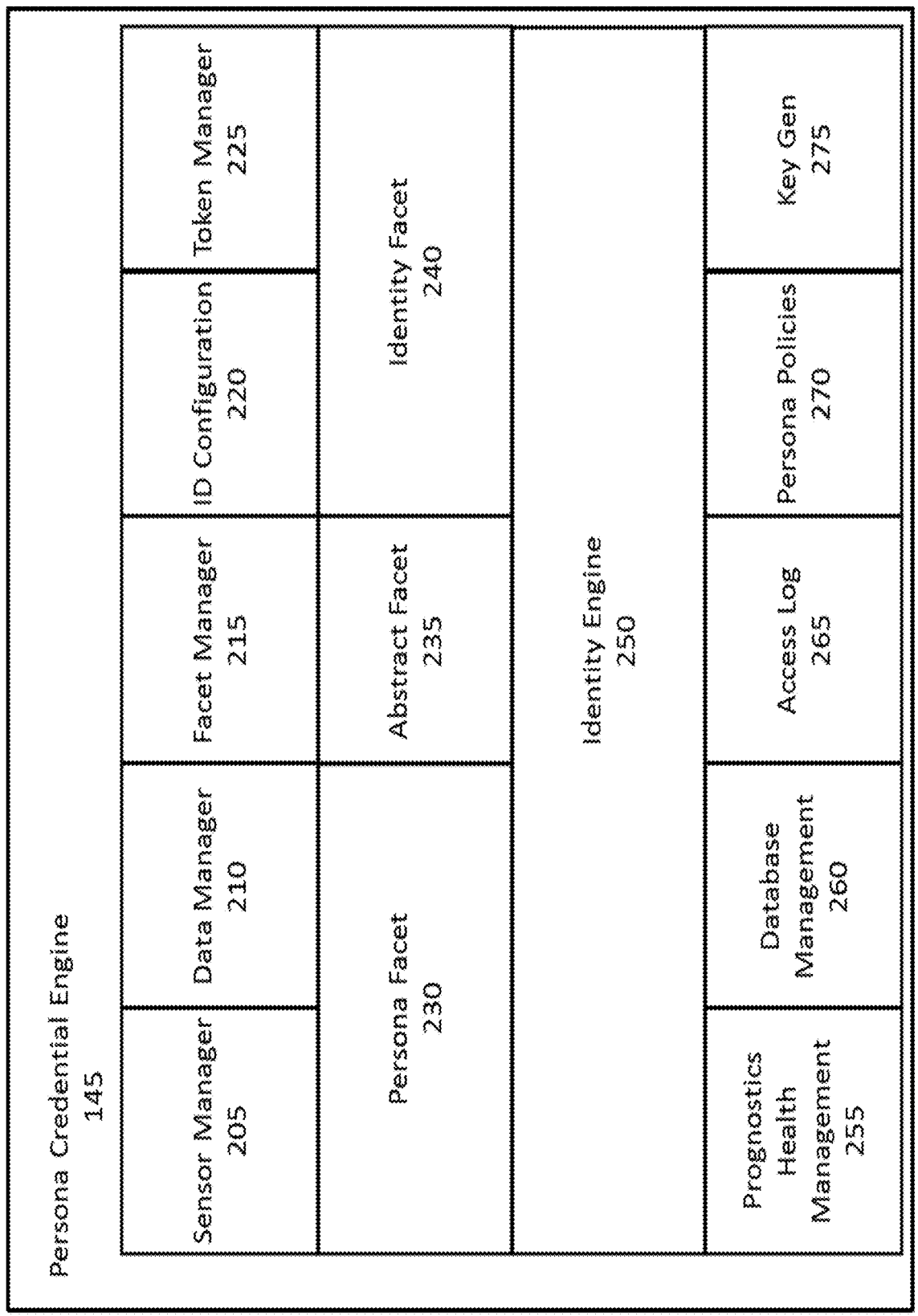
FIG. 20 depicts the components of an exemplary Persona Credential Engine (PCE).

Multi-factor indexes 360 (FIG. 21) and 470 may include Google authenticator, multi-account round trip, and work required tokens, among other things. They are typically combinations of other Facet aspects. After enrollment, data is continuously built up into databases and contributes to an ever-evolving Facet weighting scheme that generates in a dynamic Trust Score based on a Trust strategy. Abstract indexes 355 (FIG. 21) and 465 may be used to interact with Abstract Facets 235. Abstract Facets 235 (FIG. 20) are Facets based on either inputs from multiple other Facets or from someone else's PCE 145.

In some embodiments, common methods of rotation that are applied to security are typically based in a one-dimension context. For example, when some users choose new passwords they may only change a single character in an otherwise repeated string. A multi-dimensional rotation scheme mathematically (exponentially) improves an inability to predict (hack) the outcome. This scheme is particularly effective if each axis of rotation follows a different input source to force the rotation.

A Persona Credential is multi-dimensional and dynamic. Specific elements of the key change every second. This, integrated with a fluid and dynamic Trust policy, makes cracking the key mathematically almost impossible. Normal uses of cryptography may apply; however, the system is further safe-guarded by the fact that credentials are generally never static for long periods of time.

FIG. 15 depicts the components of an embodiment of an Identity Engine (IDE) 250. The depicted IDE 250 comprises estimation 510, measurement 520, prediction 530, data association technique 540, voting scheme 550, covariance 560, confidence 570, and policies 580. In some embodiments, there may be multiple IDEs 250 running multiple models. There may be many different types of models and/or there may be many similar models running concurrently.

For the most part policies 580 may be industry or segment specific; however, there will be some reoccurring logic patterns which may need to be abstracted such that the patterns may be reused between such industries and segments. In some embodiments, there may be a small, yet significant, set of segment specific patterns that may never have an abstraction to be used by any other segment but, of course, are mandatory in that particular segment. There may need to be a generic policy engine which can be configured to execute a set of policies. The expected behavior of the combination of the policy engine and specific policies configured to execute is to ultimately follow a decision-making flowchart regardless of input variations (similar to a finite state machine). Ideally, the main goal of this policy engine is to maintain the highest Trust Level possible all the time based on which Facets are available. In some embodiments, once a Trust Level can no longer be satisfied, normal friction based credentials may once again be required.

FIG. 16 depicts an embodiment of Single Sign-On (SSO) architecture. SSO provides an authentication substrate acting as an authentication virtual private network (VPN). SSO includes provisions for secure channels of communication. IDE end point agents can perform cross verification for access. Within the SSO environment is the IDE policy server (a special IDE instance). The IDE end point agents can grant access or unlock both virtual and physical resources. The SSO may be used in a new way and not necessarily to the exclusive basis of authentication. SSO provisions may become a common meeting place for Facet based authorization and authentication for the enterprise. Facet based authorization and authentication may be deployed alone without an SSO substrate; however, such a deployment may be categorized as non-enterprise.

What SSO provides is conceptually a Virtual Private Network (VPN) for Facet based authorization and authentication. As Facet based access becomes more common and reliable, services, resources, and transactions may be moved further back outside of the SSO realm and placed behind Facet based access. Security basics still apply in the sense that the common practices to secure a person's unique ID, their certificate credentials, and the need to guard a small set of secrets and/or private data/keys still remains necessary. This allows for the use of classic cryptography, X509 certificates and secure protocols such as Transport Layer Security (TLS) to maintain overall integrity of the system. Integration is then targeted towards end resources beginning with frictionless device access. As pressures to increase additional layers of security are required to reach beyond devices, the integration to the farther end resource which may be other programs are then required.

Optionally, the user 630 may connect any one or more of their applications to the PCE. The PCE can be used to access connected applications and connected applications can be used to provide additional Facet data to the PCE. For instance, a user may connect their FitBit™ application to the PCE and one or more additional Facets may be created and/or one or more existing Facets may be updated to include information such as the user's daily step average, hours asleep, weight, and other health data tracked and stored by the FitBit™ application. In some embodiments, the PCE may share data between applications. For instance, if a user has a FitBit Flex™ (i.e. it does not have the ability to track heart rate) and a heart rate sensor on their phone, the data from the phone's heart rate sensor may be shared with the FitBit™ application. Additionally, in some embodiments, the PCE may provide additional information to the user from other sources.

Figure 25:
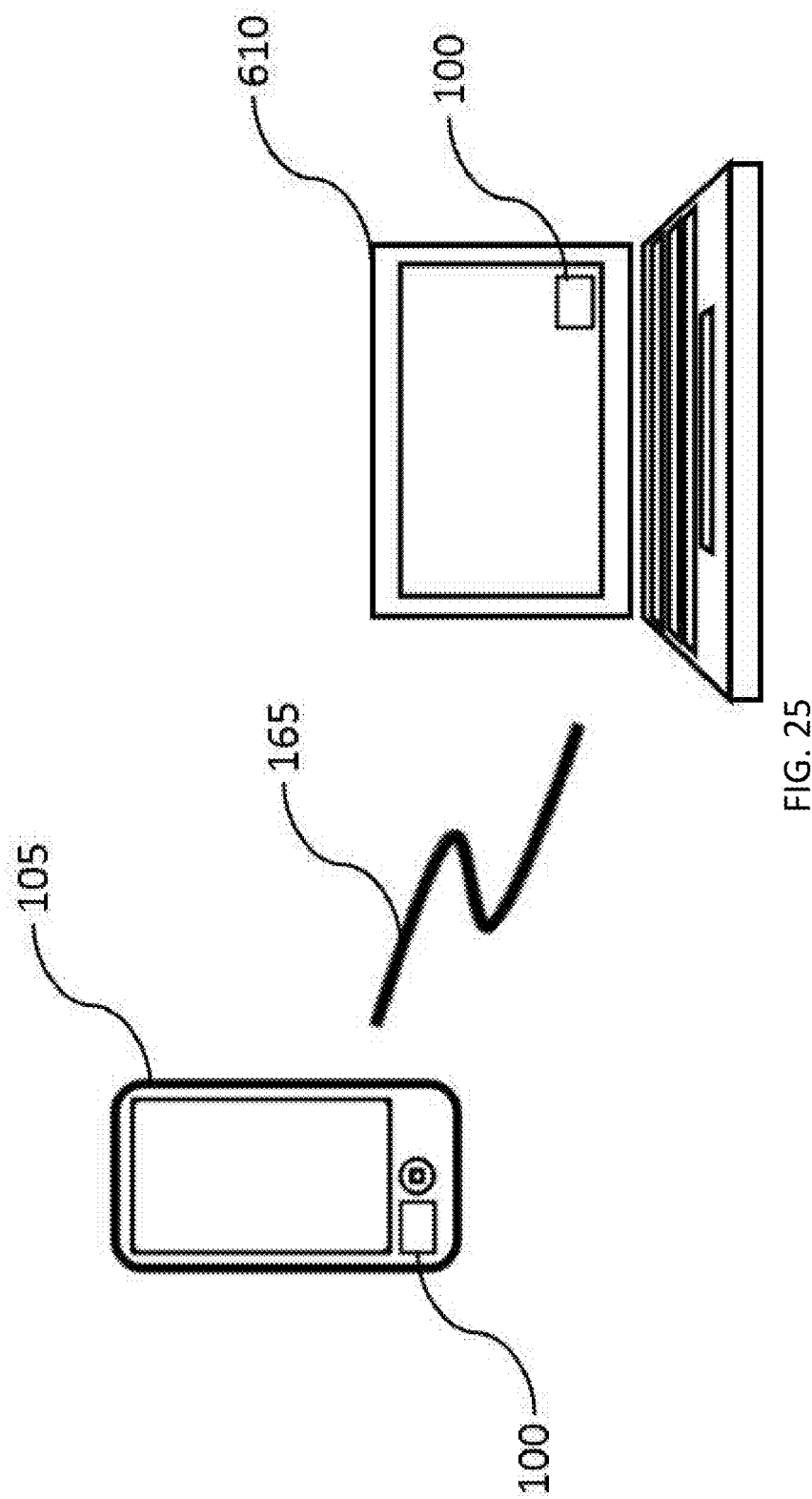
FIG. 25 depicts a smart phone communication with a laptop, both equipped with PCE software.
Figure 26:
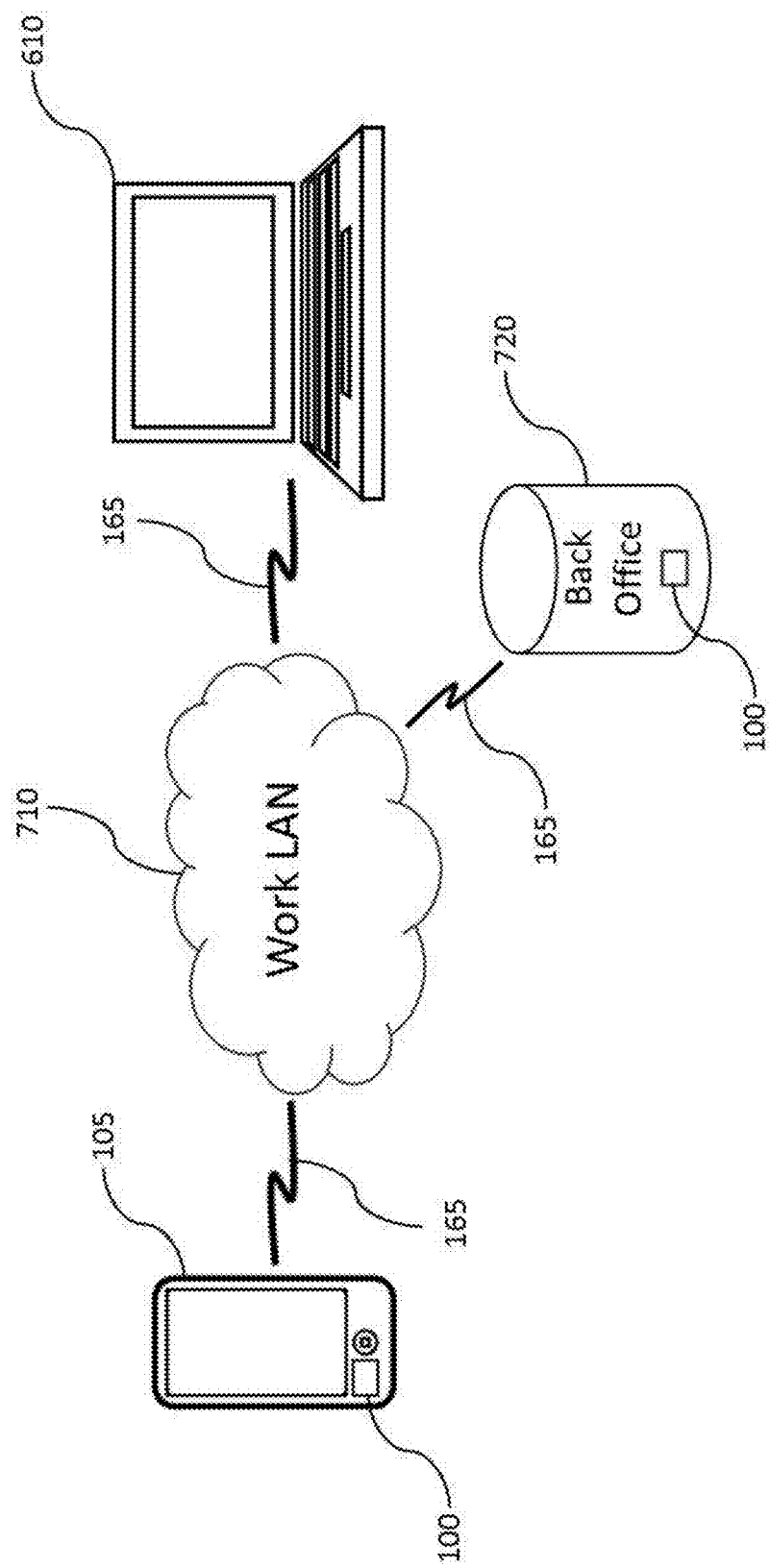
FIG. 26 depicts computing devices in communication with a work LAN and office server.

FIG. 25 depicts a smart phone 105 communicating 165 with a laptop 610, both equipped with software 100 including a PCE. FIG. 26 depicts an example embodiment at an office. A smart phone 105 and an office server 720, both equipped with software 100 including a PCE, communicate 165 with a work LAN 710 and other devices that are connected to the work LAN 710, such as a laptop 610. In the depicted embodiment, the laptop 610 does not have the PCE software block. If preferences have been set on the laptop 610 to require a level of identity verification for logon that the laptop 610 does not have the capability to support, an outside device connected to the same network, and equipped with the appropriate software and hardware, may be used to provide the identity verification data to the laptop 610.

For example, the smart phone 105 includes PCE software 100 along with a sensor layer 110, as depicted in FIG. 12, including image recognition, print recognition, location services, passwords, passcodes, security questions, and other identity verification capabilities. The smart phone 105 can therefore be used to provide identification credentials to the laptop 610. If both the smart phone 105 and the laptop 610 are recognized as belonging to the same user and the user is capable of providing identity authenticating data to the smart phone 105, and the smart phone 105 is in communication with the laptop 610, the authentication data can be one of manually or automatically applied to login to the laptop 610. This capability is discussed in greater detail in the Example Use Scenarios section below.

Figure 27:
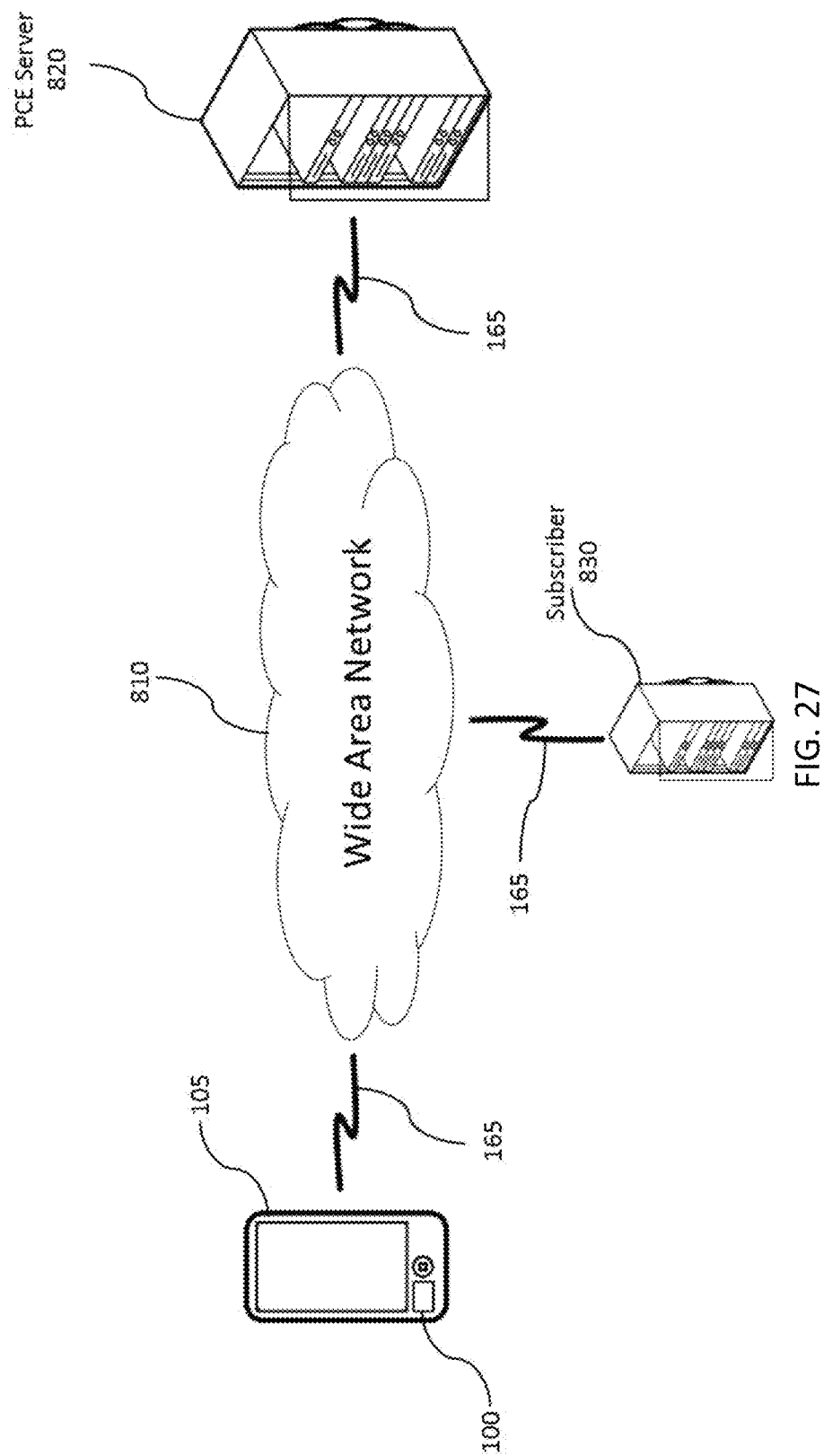
FIG. 27 depicts a wide area network communication between a PCE server, subscriber, and a smart phone.

FIG. 27 depicts a smart phone 105 with software 100 including PCE connected 165 to a wide area network 810. A PCE server 820 and one or more subscriber servers 830 are also in communication with the wide area network 830. Some embodiments may include redaction filters that clean the data of any PCI, PHI, and PII information. These filters keep the data clean from any association to the individuals that the data came from. For example, analytics may want to know how many people may be within 100 meters of a specific location, but not necessarily who they are.

Figure 28:
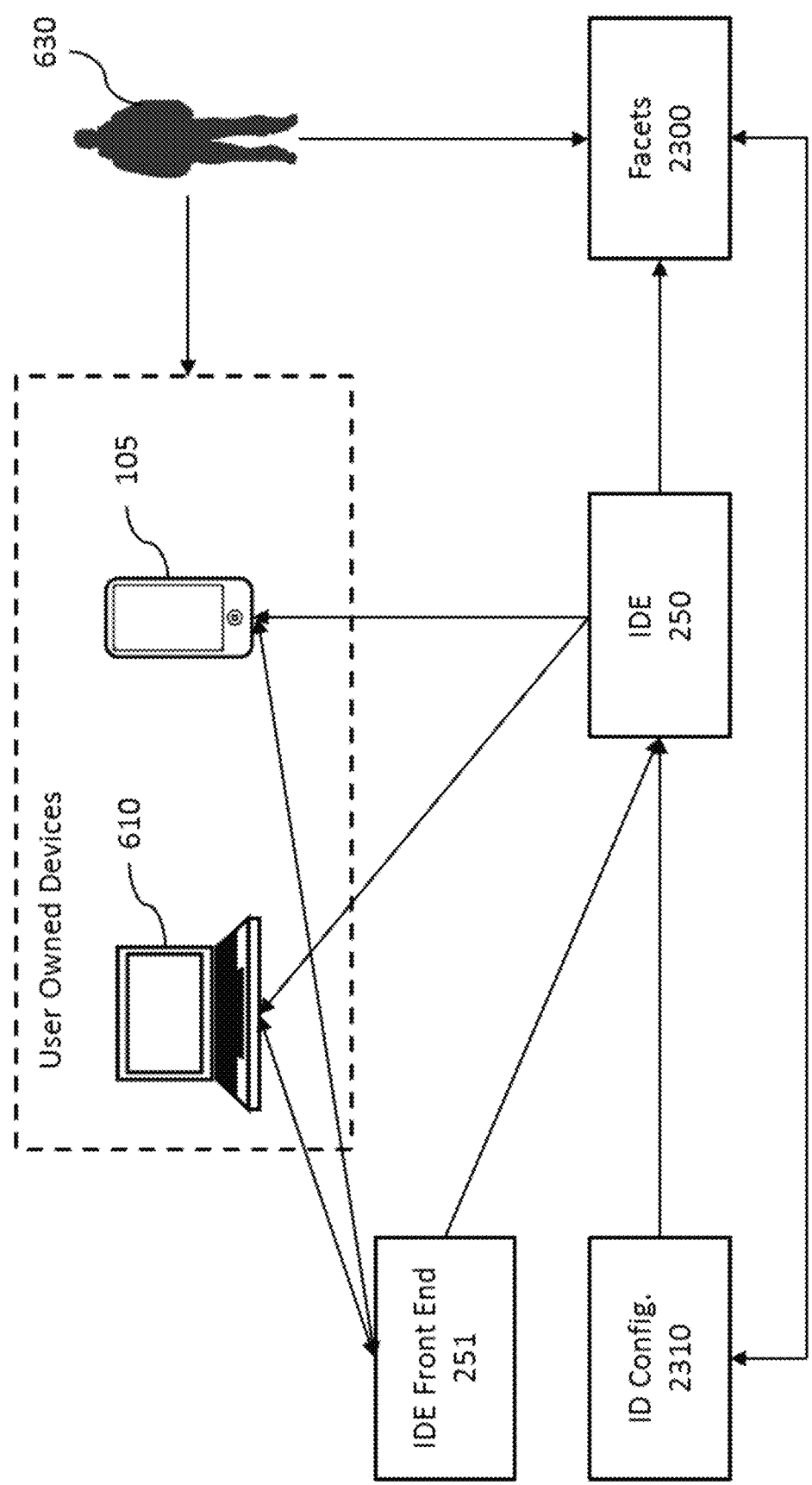
FIG. 28 depicts an embodiment of the general architecture of a PCE for a single user.

FIG. 28 depicts an embodiment of the general architecture of the PCE for a single user 630. The user 630 owns devices such as a laptop 610 and a smart phone 105. The devices run the IDE 250 and the IDE front end 251. The user 630 may interact with the IDE front end 251 through one or more of his devices and the IDE front end 251 relays the user's 630 inputs back to the IDE 250. The IDE 250 tracks user activity in a log and stores data in an internal database, in the depicted embodiment. The user's 630 activity information directly affects the Facets 2300 that define the user 630. Facets 2300 are dynamic. As Facets 2300 change and update the information is relayed to the ID configuration 2310 which updates in turn and feeds the new information into the IDE 250. The result is a constantly updating Persona Credential that is essentially tamper-proof.

Figure 29:
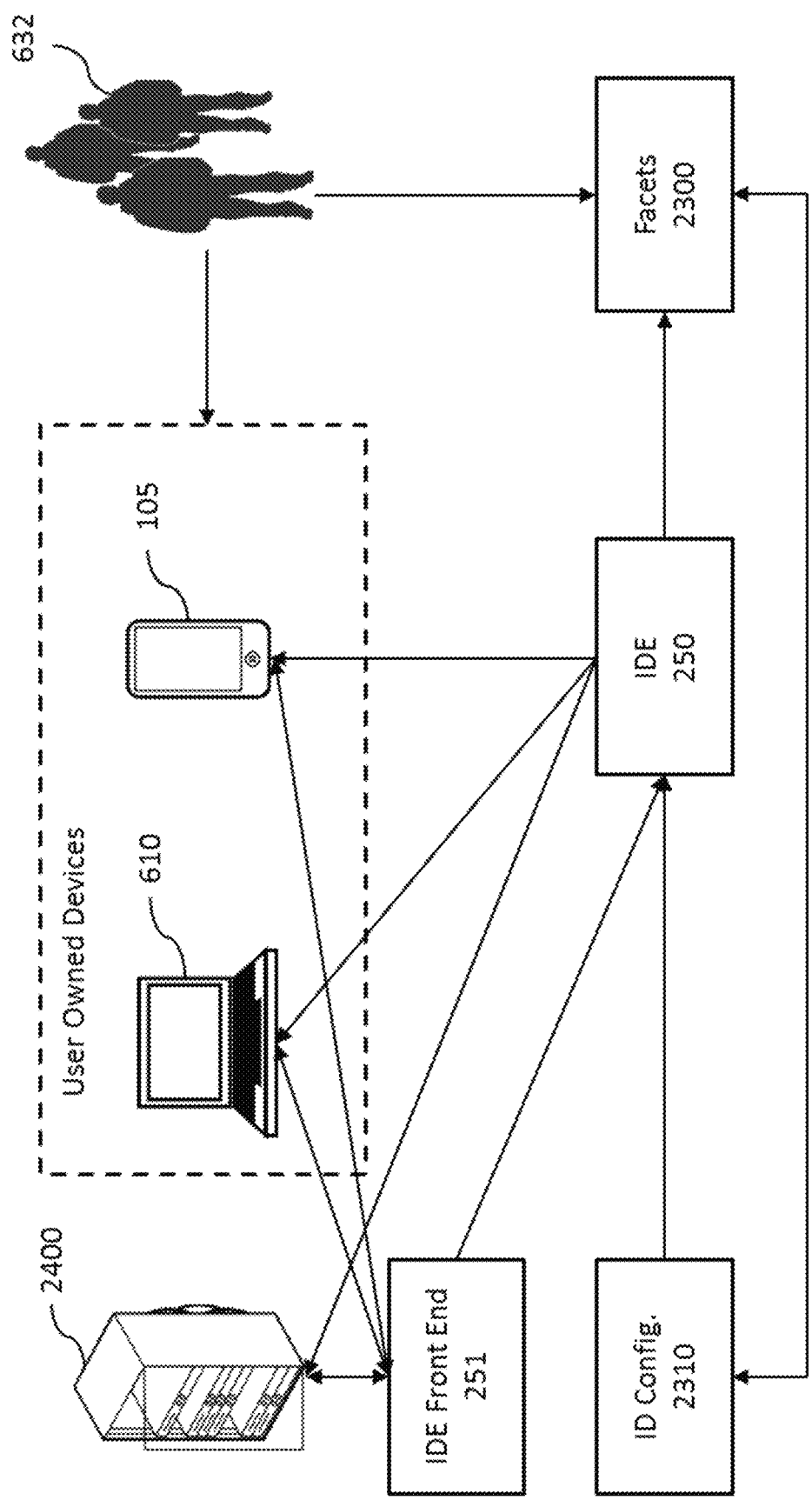
FIG. 29 depicts an embodiment of the general architecture of a PCE for multiple users and/or organizations.

FIG. 29 depicts an embodiment of the general architecture of the PCE for multiple users and/or organizations 632. This architecture is essentially the same as the single user architecture depicted in FIG. 28 with the addition of a corporate or home server 2400. In the embodiment of FIG. 29, the IDE 250 further comprises internal, external, or distributed databases of managed user IDs.

In embodiments where devices are shared between users, the PCE may be able to distinguish between the users and associate use data to the appropriate user. When the PCE is uncertain of which user is operating the device, it may not associate the use data with any Persona Credential (for instance, public computers that are not being used to access personal data of any sort, i.e. no authentication is required). In some embodiments, the PCE may track the activity, but not attribute it to a user profile until it has passively or actively positively ascertained the identity of the user.

Figure 30:
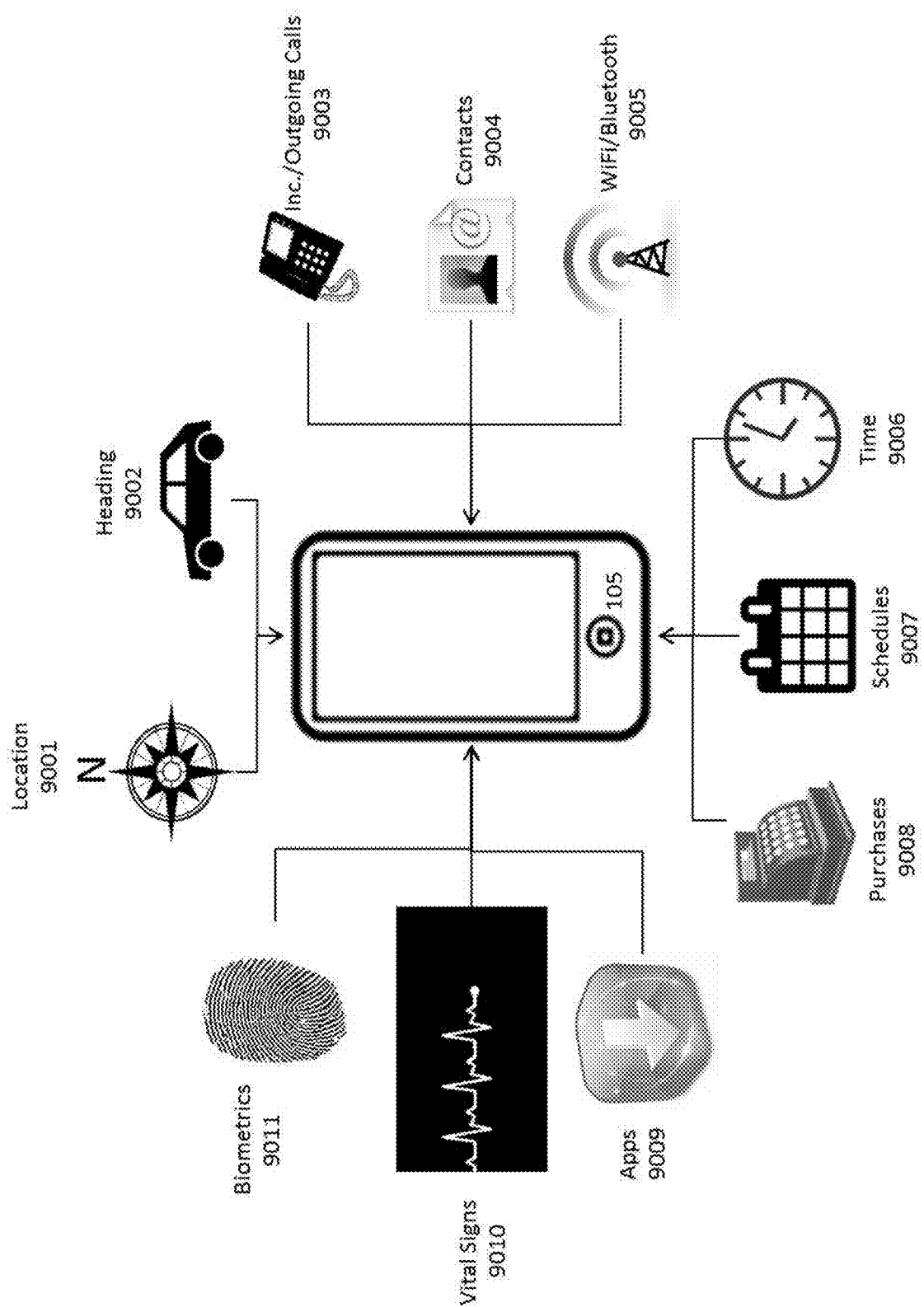
FIG. 30 depicts an example of several different sources that a user's smartphone may receive data from which can be used to update his Persona Credential.

FIG. 30 depicts an example of different sources that a user's smartphone 105 may receive data from which can be used to update his Persona Credential. The depicted sources include location 9001, heading 9002, incoming/outgoing calls 9003, contacts 9004, network connectivity 9005, time 9006, schedules 9007, purchases 9008, applications 9009, vital signs 9010, and biometrics 9011. The user's smartphone 105 in the depicted embodiment is equipped with GPS and location services that can be used to track the user's current position 9001 and the direction he is heading 9002 in. This data can be used to correlate to common places that the user frequents and raise Trust Level or determine anomalous activities and reduce Trust Level. Further, the data can be used to predict his next actions if it determines he is performing activities in locations that he frequents.

The user's smartphone 105 in the depicted embodiment can use his call status 9003 and contacts 9004 to determine if he is making or receiving a regular or anomalous call or if he is talking to someone who is listed in his contacts. Network connectivity 9005 can be used as an alternate method for determining the user's location and whether or not he is in a familiar area. Time 9006 data can be incorporated with other data to provide stronger Trust Levels with lower covariance for activities that the user performs within common regular timeframes or that align with scheduled 9007 events. Time 9006 can also be used to predict where the user will be based on his standard patterns, such as work five days a week. Schedules 9007, such as personal or work calendars, can be used to predict where the user is going to be and add to Trust Level when it is determined that the user has kept an appointment.

Purchases 9008 may be tracked by the smartphone 105 when it is used to perform purchases either through NFC tap payments, online payments performed through a browser or application on the phone 105, or other payments that occur through the phone 105. Regular purchases 9008 such as weekly groceries from the same store may increase the user's Trust Level and anomalous purchases 9008 such as buying an engagement ring at a jeweler may, at least temporarily in some embodiments, reduce the user's Trust Level unless further user action of friction based authentication is received. The user's data may be tracked by any one or more applications 9005 on his phone 105 such as a FitBit™ application that tracks his health data 9010. Biometrics 9011 may be used to confirm the user's identity.

In some embodiments, should a user fail to login for some reason, or their Trust Level is not high enough, the user may be presented with a series of questions to prove their identity. Some of the questions may be preset security questions the user designates at enrollment (or later in preferences) such as "What is the name of your first childhood pet?" Additionally, some of the questions may be habitual and/or activity based. For instance, questions like "How often do you jog each week?", "Where do you usually buy your coffee?", "How many times did you go to Safeway™ last week?", "Which European country did you travel to last year and how long were you there?" and "Where was your most recent VISA credit card transaction?" may be presented, as a few examples. In some embodiments, a mixture of question types and difficulties may be presented. The question difficulty may vary based on user settings and/or the application they are trying to login to and/or if they are trying to access from settings the user would not normally find themselves in.

Example Use Scenarios

Proximity Desktop Unlock with 3-4 Facets. The first example involves unlocking a computer, such as a desktop or a laptop, using Facets fulfilled by a mobile device. The user is able to provide the logon credentials to authenticate himself to his mobile device. The proximity of the unlocked, authenticated, mobile device is therefore sufficient to log the user into the computer. The requirements for such an interaction are (1) the user has been able to authenticate himself to the mobile device within a set time period, (2) the mobile device and the computer are able to exchange data, through Bluetooth as an example, (3) further authentication based on another Facet, for instance, geo-location, and (4) optionally, an even further authentication based on yet another Facet, for instance, confirmation of known contacts in a call log (family, friends, colleagues).

Regarding (1), the time period can be one of preset based on required Trust Level, preset according to various user preferences, the time period the phone is set to be unlocked for, or any one or more other factors. The amount of necessary Facets required to unlock the computer depend upon the required Trust Level for access. For instance, if it is a public terminal it may only require one Facet to initially login then further Facets if the user begins performing actions requiring higher Trust Levels, for instance, online banking. Regarding (4) the user may present a list of any number of frequently called persons and, additionally, may rank them in order of call frequency. To authenticate, the system may confirm one or more of the persons in the list. Confirmation may be random or may be based upon the ranking. The preferences may be changed at any time; however, a very drastic change to preferences may negatively impact the Trust Level until sufficient new data is gathered. In some embodiments, the system may warn the user that the Trust Level may be impacted. In some embodiments, the system may provide an estimate of the Trust Level that would result from the change and the length of time needed to establish a stronger Trust Level.

In the example use scenario the desktop stays unlocked as long as the mobile device can be detected nearby, for as long at the mobile device remains authenticated, or other time periods as preset by policy, the user, or based on required Trust Level. In some embodiments, when signal from the mobile device disappears the computer may be locked. Depending on how long the signal is lost, the user may need to re-authenticate on the mobile device in order to regain access to the computer. If the signal is only lost for a moment, the user may not be required to re-authenticate depending on preset settings. The time period for lockout may be dependent on Trust Level, policies, and user preferences. In some embodiments, the authentication window is set based on location. For instance, at Starbucks®, once the user is enrolled and then authenticated, the authentication window is active for 24 hours. In some embodiments, the authentication level may decay over the 24-hour window until the session is timed out.

In order for this example use scenario to be possible, the user may have to enroll in the particular system they are attempting to log in to, Starbucks® for instance. In some embodiments, enrollment may be required directly after installation.

Scenario: Example in Use

Jeremy is an employee of Starbucks® Headquarters. He has an iPhone™ and a MacBook™ that are registered to him and is enrolled in the PCE. Jeremy carries his personal devices through the entrance to the Starbucks® HQ and, as he passes through, multiple Facets are satisfied and his Trust Level increases. In some embodiments, the Facets are all verified without Jeremy having to perform any actions. In this scenario, the Facets are (1) arrival at a known location at a specific time (work in the morning) and (2) proximity of mobile devices registered to him. When Jeremy gets to his desk he gets out his iPhone™ and his MacBook™, which are initially locked. Depending on one or more of a variety of factors such as make and model of the devices, corporate policies, and user preferences, the screens may display prompts for one or more forms of authentication, or may simply state that they are locked. The second option merely stating that the device is locked may be preferable for a higher level of security so that potential "trespassers" are not notified of which specific Facets the user has employed to secure their devices. Due to the high level of possible Facets to be used, this option could exponentially increase the difficulty of tampering.

Jeremy chooses to authenticate his devices with biometrics on his iPhone™. He unlocks his phone with his fingerprint. Because his Trust Level was already raised based on Geo-Location (with time) and proximity of devices registered to him the ability to unlock his phone allows the Trust Level to reach the required level for company computer access and therefore his desktop unlocks. In some embodiments, the unlock may be automatic or it may require a manual input from the phone (to prevent accidental unlock). Jeremy has set his preferences, incorporating corporate policy, to lock his computer immediately when the authenticating device (phone) has moved beyond communication range. He has set the lock to be considered 'partial' for 5 minutes or less of inactivity and to be considered 'full' after 15 minutes of inactivity. Inactivity includes lack of use of the computer (i.e. no detected inputs from the mouse, keyboard, or other input devices), removal of the authenticating device (i.e. phone is transported out of communication range), or any one or more of several other factors which may be set according to user preferences and/or corporate policy.

Jeremy locks the phone again and puts it back into his pocket. He walks away from the desktop to get something off of the printer. The desktop locks immediately after it loses contact with the phone. He returns to the desktop two minutes later and the desktop unlocks automatically.

Because he returned with the authenticating device in less than five minutes, and the desktop was in a 'partial' lock state according to his preferences he is able to access it again without any further authentication. At lunch time, Jeremy leaves the office with his phone. His desktop locks immediately upon losing contact with the phone. Jeremy returns after an hour. Because he was gone longer than the 15 minutes he specified in his preferences, the desktop entered the 'full' lock state which requires Jeremy to re-authenticate. Jeremy swipes his fingerprint to gain access to his phone and the desktop unlocks again. This system of 'partial' and 'full' locks allows the computer to be secure at all times with minimal input, friction, from Jeremy.

Narrative: A Day in the Life of Calvin

In the following example, Calvin's phone is being used as the primary sensor for tracking his Trust Level as he performs activities that positively identify him as Calvin (via his regular/routine activities) and activities that lower his Trust Levels (anomalous/rare activities).

Calvin's phone alarm woke him up at 6:30 AM. He took it off airplane mode and connected to his home's Wi-Fi like he does every morning to let that night's texts come through, raising the Trust Level. He brought his phone with him to the bathroom, linked it to his Bluetooth speaker, and decided to listen to some Bobby Darren while he took a shower. This also raised the Trust Level because this is music he listens to often. After he showered and got dressed, he made himself a bowl of cereal and browsed Reddit.com while eating to catch up on current events and look at funny pictures. Due to pre-arranged camera settings, the viewfinder on Calvin's phone camera automatically detected the brand of cereal he ate was the kind he has had for the past week, further increasing the Trust Level that he is, in fact, Calvin.

On his way to work, he stopped by Dunkin' Doughnuts™ to grab coffee. He prefers Starbucks®, but they were closed for renovations. The Persona Credential Engine recognized that this is not his usual place for coffee, but calculated that within standard limits of deviation, getting coffee in the morning is still one of Calvin's standard behaviors, so his Trust Level is unaffected or only slightly reduced. After that, he arrived at his office, and settled in for the morning. One of Calvin's projects was reaching out to a prospective client. He hadn't spoken to them before, so he got the number from their website, and gave them a call. This number was unknown to Calvin's database, but because the PCE had high confidence at that point that he is Calvin, it simply adds the new number to its records, and does not lower the Trust Level.

Around 10:00 AM Calvin stepped outside to get some fresh air and stretch his legs. He usually does this every day, so the Trust Level remained high that he is still Calvin. After an hour and a half more of work, he walked up to the local grocery store to get lunch. He usually gets a sandwich for lunch, but he was feeling a bit under the weather, so instead he got a can of chicken noodle soup and a little bottle of ibuprofen. This was the first time he purchased soup for lunch instead of a sandwich, so his Trust Score was lowered slightly and the soup purchase was added to his database as a rare event.

Back at work, he finished up his last project for the day, saved it, and sent it off to his boss. He left the building, and made his way to his bus stop, as he does every day at this time, further raising or maintaining his Trust Level. He waited for the bus for about 20 minutes, and when it arrived, he purchased the fare by using his phone. The phone automatically processes the charge for him since it is one that is routinely made, as well as the fact that his Trust Level was already well established.

When he arrived at his usual bus stop near home, he got off the bus and hopped into his friend's car. This was anomalous because this friend and his vehicle were not in Calvin's database. Calvin's phone asked him to confirm identity with his thumb print and PIN, but he was distracted and did not see it. Calvin's Trust Level reduces to $2\sigma$. Calvin's phone locked him out of automatic purchases and higher level accounts. He proceeded to his friend's house for a LAN party (Gaming Party). When they arrived, Calvin unpacked his bag, settled in, and booted up his laptop. Calvin has his laptop set to require $3\sigma$ confidence to login. Because Calvin's Trust Level was only $2\sigma$ he had to swipe his fingerprint and enter a password (these identity inputs may be set in user preferences) to access his computer. Calvin logged on to his friend's Wi-Fi, and Calvin's gaming account is set to require $2\sigma$ confidence. Because his confidence was $3\sigma$ after inputting his password and fingerprint he was automatically logged into his gaming account. While the PCE did not recognize the location, vehicle, or the friend of Calvin, it recognized the acts of logging into the laptop, connecting to a network, and opening up a video game as a set of activities that Calvin regularly performs at various locations. The PCE added the previously unidentified friend's information to Calvin's database. Calvin's Trust Level was unaffected as he had established $3\sigma$ confidence to log into his computer (recognized by the PCE) and was performing routine activities.

Later that evening Calvin arrived back home and ate dinner. This return to routine activities further increased the Trust Level, allowing Calvin to make purchases with his phone and unlock higher level accounts if he chooses to do so. After dinner, on his main tower computer, he logged into another common game and played for a while. That night as Calvin was falling asleep, he browsed Reddit.com for some end of the day stories, and right before he fell asleep, he set an alarm for 6:30 AM and put his phone on airplane mode. Calvin always does this around the same time each night, continuing to maintain his Trust Level to the PCE that Calvin is currently, as well as was, in possession of the phone all day.

Profiles

In some embodiments, the user may create separate profiles, for work and personal use. These embodiments work well for users with jobs requiring erratic locations, such as an Uber™ driver or delivery driver. When a user's job location is erratic, their Facets may not build up sufficient confidence and will therefore not be as efficient or capable of authentication as Facets for a user with more consistent activities and job locations. The profiles may be toggled manually or automatically. Automatic toggling can include one or more of face, environment, or audio recognition, as well as numerous other factors that the system recognizes as specific to work or personal use. For example, for an Uber™ driver, the profile may be toggled to the work profile when the user logs into or opens the Uber™ application. The user's calendar events may also serve to trigger automatic profile toggling. For instance, a self-employed handyman who does odd jobs may mark appointments in his calendar. When an appointment starts, his profile may automatically switch from personal to work. If he sets calendar reminders, the reminders may additionally prompt the user to perform a manual profile switch, or, depending on the user's preferences, automatically trigger profile toggling.

In some embodiments, additional uses for a work profile include work situations where an employee needs to be tracked, for instance armored truck drivers. The employee would need to allow her employer access to her location but may not want to allow the employer access to her personal profile. With separate work and personal profiles, the employee will be able to allow her employer access to only her work profile and is therefore able to keep her personal profile private. In an example embodiment, the work profile could be used individually or in conjunction with other tracking mechanisms to track an armored truck driver, alert the driver of missed stops, alert the employer of unplanned deviations, or other such uses. The work profile can be used to improve efficiency, provide better logistics planning, improve driver safety, and provide increased accountability, among other things.

Vector Based Facets

In another embodiment, the Facet may be thought of as a program, filter, formula, or device which can channel a consistent information stream such that the stream may be described as a mathematical vector having both magnitude and direction. Each unique information stream which sources information from the same mechanism (device) belongs to the same mathematical dimension. Likewise, information streams from different mechanisms belong in different dimensions. If two different information streams from the same dimension are sent through the same Facet, then the resulting vectors may be compared and may also exhibit measurable differences. A Facet's measurements are bound by points in time and the same information stream may exhibit an observable deviation in vector values. A basis of acceptance, or non-acceptance, criteria may be determined by using historical vectors from the same information stream and comparing it to subsequent vectors to determine if the new vector falls within the deviation or not. Once compared, and regardless of acceptance, the new vector value is able to be incorporated into a new deviation for subsequent comparisons.

If the concept is extended such that a Facet can produce a vector, and the vectors from multiple Facets are expected to intersect in order to converge on one individual, then Faceted Navigation is generally the course guidance necessary to get to a location. In the model a location is a person. In an example embodiment, authentication is disregarded and Google Glass™ and geo-location are the only mechanisms in use. If a user navigated to a location in space where many Persona Credentials have approximately similar Google Glass™ and GPS based telemetry, a group of people generally in the same location all looking at the same thing have been identified.

Continuing with the previous example of Jeremy at Starbucks, in some embodiments, if Jeremy fences off some perimeter for both Google Glass™ telemetry and location such that such values may be searched, then presumably Jeremy has the ability to at least count how many people are looking towards the same thing. If other Facet information just happens to return as attributes of that result, then presumably, Jeremy can cull that into subgroups such as number of males and number of females. In many embodiments, Jeremy will only be able to access information that does not violate the privacy of others. A faceted classification is at least one of an analytic and synthetic classification that uses semantic categories that are at least one of general and subject-specific, wherein the semantic categories are used to create a full classification entry, and wherein the full classification entry is the identity of a user. In some embodiments, the full classification is based on at least one policy and at least one data set. In some embodiments, a Trust Level in the range of 1-100 may be assigned to the classification entry. In some embodiments, the Trust Level of the classification entry may degrade with time according to one or more rules.

In another embodiment, the initial set of Facets is arbitrary. In the example in equation (A) below, the initial set of Facets is three. If either trust T or $\lambda(t)$ decay negate and remove a Facet, an arbitrary Facet previously not considered may replace or supplement the set. Each Facet is represented as a line in arbitrary space. The intersection of the initial set of Facets is set to $\square$.

$$\square = [L_1 \lambda_1 T_1 \cap L_2 \lambda_2 T_2 \cap L_3 \lambda_3 T_3] \quad (A)$$

where $$L_1(t) = \vec{r}_a + \vec{r}_x | t \in \square^n \quad (B)$$

$$L_2(t) = \vec{r}_b + \vec{r}_y | t \in \square^n \quad (C)$$

$\lambda(t)$=natural decay as related to t and is specific to Facet, and T=Trust Level for the specific Facet Time, t, is an external parametric to indicate that time must coincide with all Facets in order to maintain relevance of intersection. Trust, T, is meant as a "kill switch" that removes any effect of the Facet upon a moment's notice as an indication of loss of Trust in association with a specific Facet independently. Decay, $\lambda(t)$, is used to dynamically adjust trust information from a Facet. When instantaneous telemetry is not feasible, Trust may decay over some period of time, t, since the last valid sampling. Trust decay may continue until information is received that increases Trust. Should any parameter for a Facet approach zero, which would disqualify the Facet, inactive Facets may be activated and dynamically pulled into the active Facet set to substitute the disqualified Facet, in some embodiments.

Telemetry that is fed from each Facet may be thought of as a vector representation that when trended and compared to historical patterns will consistently point in a similar direction. This directionality can then be represented mathematically as a line that exists in a specific dimension ($L_1$, $L_2$ . . . $L_n$). Facets that use the same source may be considered to exist in the same dimension, while Facets from different information sources may be considered to be from different dimensions. These dimensions may intersect in some embodiments, but the one common axis shared for the intersection is time (t) such that intersections can only occur at the same point in time. Facet strength may be adjusted by a decay factor $\lambda(t)$ where the decay is a function of time. $\lambda(t)$ approaches zero as time approaches infinity. Facet strength is also adjusted by a trust factor, T, where any Facet may be deemed no longer trustworthy due to compromise or other factors such as major lifestyle changes (i.e. user changed activity level from sedentary to active by jogging a mile every morning).

There is the consensus application which illustrated possible voting schemes. There is also the method by which Facets are selected and in what priority order and the assumption that some Facets may not actively be involved in the policy engine. Also, as a computational optimization, the policy engine should maintain a minimal set of active Facets necessary to achieve the satisfactory Trust Level and only fault into action Facets when the Trust Level is low.

Facet deviations may be statistically analyzed to produce a probability spread over the deviation range. Such a spread can then be used as a confidence factor or Trust Level as measured against the information stream as well as the Facet. For example, a vector measured beyond the deviation range can be deemed untrustworthy. Since a vector is always measured at a specific time, the probability that subsequent vectors will differ from prior vectors increases over time. If a vector history is based on measurements gathered from a predetermined sampling rate, then adjacent measurements should be more likely to be the same while measurements spanning multiple sampling periods are less likely to be the same. This probability can then be represented as a diminishing probability over time or a Decay Factor. A Decay Factor acts similarly to a Trust Factor in that intrinsic confidence diminishes. Unlike a Trust Factor, rather than diminishing due to the degree of deviation, confidence diminishes due to the length of time between samples.

Inferencing is simply a stacked Facet. The data which leads to inferencing should be regarded as the outcome of a more primitive Facet. Individual Facets are influenced by prior events (vectors) within their own dimension, while one Facet type combined to another Facet type may have a tug-of-war proportionality as it is applied to an overall Trust Level.

Facets based on different information streams may only be compared through the vector's magnitude which they produce at the same moment in time. If the different information streams stem from different mechanisms from the same entity (person), then these time converged vectors can be characterized as intersecting. Vectors from multiple intersecting Facets may be aggregated to form a higher concept of trust in the sense that when an adequate number of vectors intersect, probability increases that an entity (person) is trustworthy and authentic. This probability increases as more vectors intersect. The aggregate probability is the Trust Level. Not all vectors may contribute equally to derive such a Trust Score and magnitude normalization should be applied against each Facet based on the Facet's proportion of trust contribution. A Facet's vector may act as an information stream into different Facets in a unidirectional manner such that there is no circular information stream influence. Facets which receive another Facet's vector as an information stream are referred to as "Stacked Facets". Facets which receive information streams stemming from multiple mechanisms are regarded as "Multi-Dimensional Facets".

Other Uses

Aside from personal identity authentication, the systems and methods disclosed herein and the data gathered for the purposes thereof may be used in many additional ways, and are not limited by a single embodiment.

The Identity Facet is an integral part of the systems and methods in some embodiments. It tracks things such as the user's age and updates automatically each year on the user's birthday. As such, age data will be known when a user attempts to make a transaction. Therefore, if a user is attempting to purchase an age-restricted item and is not of legal age, they will be prevented from doing so.

Additionally, the data can be used in connection with smart vehicles in multiple ways, including:

Detecting and preventing a user from driving while intoxicated or otherwise incapacitated. For instance, the car may not start unless the user is able to provide sufficient proof that they are capable of operating the vehicle safely. Sufficient proof may be reliant on the sensing capabilities of the vehicle, or other user owned devices. Additionally, sufficient proof may be based in law, company policy, or other associated factors.

Bringing a vehicle to a gradual stop if the user begins to deviate too far from their established driving model. As an example, a user swerves, speeds more, or drives generally more erratically as a result of physical distress such as a stroke or heart attack. Further, should the vehicle need to stop, OnStar or other built in software may automatically call to check on the user and alert the authorities should the user fail to respond, or if the user asks for help.

Prevent a vehicle from being driven by anyone other than the owner, and permitted drivers as specified by the owner. This prevents the vehicle from being stolen as well as prevents underage people from driving the vehicle (for instance, the owner's children).

Allowing only licensed drivers to operate a vehicle. For instance, the vehicle may access data related to the user's license status when the user enters the vehicle. As an example, a user climbs into a semi tractor-trailer, the vehicle detects that his Commercial Driver's License (CDL) is currently expired. The user will not be able to operate the semi tractor-trailer.

Affecting auto insurance rates. The user's driving models may be tracked and updated regularly. As such, should the user choose to, the data may be provided to an insurance firm to adjust the user's insurance rates.

Authenticating devices used in the Internet of Things. Much like logging a human's behavioral data over time to authenticate and build Trust, objects connected to the Internet that generate data can also generate a Trust Level. As an example, if a fork lift in a plant operates autonomously moving goods around, it operates within certain boundaries, and certain courses over time. Its speed, its route, and generally how it operates over time is used to associate a level of confidence. If another device operating autonomously, such as a forklift, shows up at a station to pick up a high value package, and the Trust Levels are low, the high value pack may not be released until the other forklift has been validated.

This approach can be applied to other devices, and not limited to autonomous vehicles as disclosed above; it could be a pet, trained to do certain things, like nudging his bowl for water. Over a period of time, if the dog is where you would expect him to be, the Trust Level is high enough to open the door and let him in, feed him, etc. This example supports a combination of Trust and artificial intelligence (AI) in regards to a system that learns over time. Not only will it learn, it will be able to relearn a set of events over time by continually updating the events globally and generating a new confidence and resulting Trust Level; thus, allowing for dynamic security.

As data on a variety of aspects of a user's life is gathered and stored, reports can be generated for specific activities. The user can set preferences to generate specific reports, how the reports are delivered, etc. For instance, a user may want to review a report via email monthly regarding how much money they are spending on gas and how often they are purchasing gas. Essentially, the data gathered for identity verification can be further used as life tracking software, providing numerous graphs and charts that can be viewed over varying time intervals much like FitBit™.

Optionally, a user can choose to allow third party access to one or more specific data sets. For instance, a user may choose to connect some of their data to a dating site, or other social media. In this way the data and algorithms already processing and updating regularly in the IDE can be applied to find a match more reliably than existing dating/social software because the match would be based on many more factors, confirmed to be authentic, and easier to use because it would be generated automatically. Matches could be made that are even more intuitive and based on a wider, or more specific data set (per user preferences).

In some embodiments if a user's activity were to become anomalous (i.e. deviate extensively from their established models), authorities may be contacted and location services on one or more of the user's devices may be used to track down the user or their devices. In some embodiments, the user may alert the software pre-emptively of planned anomalous activity. Additionally, in some embodiments, the user may perform friction based actions to raise their Trust Level retroactively after degrading it by having performed anomalous activities. In some embodiments, the user may manually edit one or more aspects of their Persona Credential. In some embodiments, the PCE will alert or query the user when anomalous activity is detected. In many embodiments, the user will be able to set alert/query preferences.

In some embodiments, the data collected by the PCE may also be used for better tracking, logistics, and accountability for delivery and other related fields; the data collected by the PCE may also be used to quantify brand loyalty. The stored data can be used to store behavioral characteristics of the user over time, such a dynamic data set is to be considered data unique to the individual user by which it was created from and as this data set's Trust degrades over that same period of time, may reinvigorate Trust by demonstration of a repeat of prior occurrence which was previously stored in a database.

In some embodiments, this continuous collection of data over time is described using common metric standards of the real world which is shared by all other users. The use of a user's data set stored in a database is for determination of repeats of prior occurrences. In order to protect against unintended use of this data set stored in a database, each user's data set may be mapped into a mathematical universe uniquely created for this user. Characteristics of this mapping may be one directional in nature such that the original metrics can no longer be reverse-mapped once mapping has occurred. However, this mapping may maintain relative distance between occurrences in a manner such that a repeat of prior occurrences can continue to be detected, thus supporting maintaining calculation of Trust Level. The stored data in a database is for the purposes of preventing unintended use into a unique mathematical universe created specifically for the user.

In some embodiments, each user maintains their own unique mathematical universe. When information from other individuals is used to calculate a person's Trust Level, a new universe may be created to store this relationship. This concept can be expanded for two or more individuals. In some embodiments, when a user's data set is based upon a data set created by one or more additional users via proximity to other individuals such events measured by using common metric standards must be observed together in the same real world. Once observed and subsequently stored in a database, the data may be mapped into a mathematical universe specifically shared by the participating set of users. This joint universe is separate from the user's individual universe and only represents a new universe shared by all participating individuals. Ownership of such shared universes is consequentially also shared and thus contributes to faceted data that contributes to a Trust Level of each individual. In some embodiments, the stored data represents a unique schema but is independent from a user's actual identity.

Privacy

Following is an example embodiment of a user scenario related to privacy: Every day a user leaves work at 3 PM and picks up her children from school at 3:30 PM. She then arrives home at 4 PM. The PCE may track and recognize this regular path as one of the factors in her Trust Level. In some embodiments, to increase data security regarding the user's private data, the shape of this regular trip may be mapped without putting it in context of actual location. The shape of her path of travel can be regularly compared to affect her Trust Level; however, in the event of a security breach with the user data being accessed inappropriately, the "trip shape" and details of her path will be meaningless because there is no context back to an actual map or location.

Data other than the shape or path of her trip may be gathered such as rate and acceleration from sensors in her vehicle, cell phone, GPS, and/or other devices/sensors. In some embodiments, this data can also be applied and compared without actual context with respect to a map, route, starting location, ending location, or other identifying data. In some embodiments, this data can be applied to the trip shape without location context, i.e. it is location independent. The data may have different intensities with respect to the covariance between trips, such as performing the same trip 15 minutes later than usual, or traffic causing the length of time the trip normally takes to be extended.

Any one or more aspect of her everyday activities, or other data tracked by her PCE system, may be mapped and/or recorded in such a way as to have no contextual meaning outside of the PCE system, in order to increase data security and user privacy. This concept applies to individual universes as well as group universes. In some embodiments universes created for two or more individuals may exist only for brief periods of time and then be eliminated when they are no longer valid.

Processor Embodiment

One or more databases may be configured to store user data. User data may be in one or more different forms and generated from one or more different sources. For instance, user data may be static (e.g. name, birthday, biometrics), behavioral (e.g. frequenting Starbucks® on workdays, regular jogs on Saturday mornings), physical (e.g. weight, heart rate), proximity based (e.g. device affinity, network connectivity), or any number of other possibilities. The one or more databases may be local (e.g. on a smart device) and/or remote (e.g. in the cloud) to the user.

The PCE may be operatively configured to run on one or more processors, one or more of which may be connected to one or more data sources. For instance, the PCE may run on a user's smartphone. The smartphone may include one or more sensors such as a fingerprint reader, voice recorder, face recognition, and GPS. The phone may additionally connect to and gather data from other external sources such as a FitBit™ fitness tracker, Aria™ smart scale, WiFi networks, and any number of other sources. The data may be processed locally on the smartphone processor and/or remotely in the cloud. In some embodiments, more than one processor may process data simultaneously. In some embodiments, more than one processor may run the PCE simultaneously. In some embodiments, the data may be stored remotely such that any one or more processors may access it given they have required permissions. In some embodiments, data processing may be automatically performed by one of the processor in closest proximity to the user or the processor currently being interacted with by the user. In some embodiments, the data processing is entirely remote to the user (e.g. in the cloud).

In some embodiments, wherein the one or more processors may be configured to correlate a biometric measurement data set and determine the user's activities match other user stored records. The processor may be further configured to use a second policy to update the Trust Level of the classification entry and store the updated Trust Level in the full classification entry. The processor may be further configured to use a third policy to update the full classification entry to generate at least one of a private security key and a public security key based on the Trust Level and the third policy. The keys may be stored in memory.

Non-Transitory Computer Readable Medium

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of two computing components, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc; where "disks" usually reproduce data magnetically, and "discs" reproduce data optically with lasers. Thus, in some aspects, a computer readable medium may comprise non-transitory computer readable medium (e.g., tangible media). In addition, in some aspects a computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. Processes or steps described in one implementation can be suitably combined with steps of other described implementations.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

It is to be understood that the claims are not limited to the precise configuration and components illustrated above. Various modifications, changes and variations may be made in the arrangement, operation and details of the methods and apparatus described above without departing from the scope of the claims.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the systems, methods, processes, and/or apparatuses disclosed herein in a preferred embodiment thereof, it should be apparent that the systems, methods, processes, and/or apparatuses may be modified in arrangement and detail without departing from such principles. Claim is made to all modifications and variation coming within the spirit and scope of the following claims.

The invention claimed is:

1. A system for collecting data related to a user's activities and authenticating a user comprising:
    one or more processors, wherein the one or more processors are configured to process operations comprising:
        creating a faceted classification, wherein the faceted classification is at least one of an analytic and synthetic classification that uses semantic categories that are at least one of general and subject-specific, wherein the semantic categories are used to create a full classification entry, and wherein the full classification entry is the identity of a user and
        correlating a biometric measurement data set, determining the user's activities match other user stored records;
        using at least a second policy to update the trust level of the classification entry and storing the updated trust level in the full classification entry;
        using a third policy to update the full classification entry to generate at least one of a private security key and a public security key based on the trust level and the third policy; and
        storing the keys in the memory;
    one or more sensors operably coupled to the one or more processors, wherein a first sensor is operatively configured to generate user data;
    a database operatively configured to categorize and store user data;
    non-transitory computer readable memory having a plurality of executable instructions stored thereon, wherein the instructions, when executed by the one or more processors, cause the one or more processors to process operations, comprising:
    configuring the one or more processors to operate in a first processing mode;
    creating at least one rule based on user inputs;
    configuring the one or more processors to operate in a second processing mode;
    comparing at least one set of stored data to the at least one rule;
    generating a score based on the comparison of the one set of stored data to the at least one rule, wherein the as a percentage of the population of data sets compared that agree with the rule, and wherein the score is represented as a standard deviation of scores from a median;
    use the score to generate a trust level;
    store the trust level and time the trust level was generated in a memory.

2. The system of claim 1, wherein the system is operatively configured as a dynamically evolving cognitive architecture, wherein the architecture includes processing the stored data using state models that make predictions of state, receive observations of state, compare the predictions to the observations of state, and use the differences to change the state model.

3. The system of claim 1, wherein the trust level represents the value of a secure key.

4. The system of claim 1, wherein the one or more sensors collect at least one of biometric data of a user and behavioral data of a user, wherein the behavioral data includes at least one of location data and time, proximity to other identifiable devices, proximity to other individuals and activities conducted on the one of more processors.

5. The system of claim 1, wherein the full classification is based on at least one policy and at least one data set, establish a trust level in the range of 1 to 100 and assign it to the classification entry, and wherein the trust level of the classification entry degrades over time according to the at least one rule.

6. The system of claim 1, wherein the data collected is at least one of described using common standards, stored in a database for determination of repeats of prior occurrences, and mapped into a mathematical universe uniquely created for a user.

7. The system of claim 6, wherein the characteristics of the mapping is one directional in nature such that the original metrics can no longer be reverse mapped once mapping has occurred, and wherein the mapping maintains relative distance between occurrences in a manner such that a repeat of prior occurrences can continue to be detected for supporting the validity of the trust level.

8. The system of claim 6, wherein when two or more users share data used to determine their individual trust levels a new mathematical universe is created unique to this relationship.

9. The system of claim 1, wherein the first sensor generates acceleration and rate about an axis of travel over time, wherein the data generated represents a route, wherein the route has a shape, and wherein the shape of the route is stored as user data.

10. The system of claim 9, wherein the data generated is location independent.

11. The system of claim 9, wherein the data generated is used to support trust values.

12. The system of claim 1, wherein the first sensor generates data related to a user's activities over time, wherein the user's activities have been at least one of pre-defined by a user and collected from a data generating device and stored, and wherein the stored data includes a match to at least one activity and a variance.

13. The system of claim 12, wherein the stored data is independent from a user's identity.

14. A method for collecting data related to a user's activities and determining a trust level, comprising:
    coupling one or more processors to a first sensor, wherein:
        the first sensor is operably configured to generate and store data about a user, the one of more processors include non-transitory computer readable memory having a plurality of executable instructions stored thereon, the instructions, when executed by the one or more processors, cause the one or more processors to process operations; and
    the one or more processors are configured to process operations comprising:
        creating a faceted classification, wherein the faceted classification is at least one of an analytic and synthetic classification that uses semantic categories that are at least one of general and subject-specific, wherein the semantic categories are used to create a full classification entry, and wherein the full classification entry is the identity of a user;
        correlating a biometric measurement data set;

determining the user's activities match other user stored records;

using at least a second policy to update the trust level of the classification entry and storing the updated trust level in the full classification entry:

using a third policy to update the full classification entry to generate at least one of a private security key and a public security key based on the trust level and the third policy; and storing the keys in the memory;

configuring a data base to categorize and store the data;

configuring the one or more processors to operate in a first processing mode;

creating at least one rule based on user inputs;

configuring the one or more processors to operate in a second processing mode;

comparing at least one set of stored data to the at least one rule;

generating a score based on the comparison of the one set of stored data to the at least one rule, wherein the as a percentage of the population of data sets compared that agree with the rule, and wherein the score is represented as standard deviation of scores from a median;

using the score to generate a trust level; and storing the trust level and time the trust level was generated in a memory.

15. The method of claim 14, including a system operatively configured as a dynamically evolving cognitive architecture, wherein the architecture includes processing the stored data using state models that make predictions of state, receive observations of state, compare the predictions to the observations of state, and use the differences to change the state model.

16. The method of claim 14, wherein the trust level represents the value of a secure key.

17. The method of claim 14, wherein the one or more sensors collect at least one of biometric data of a user and behavioral data of the user, wherein the behavioral data includes at least one of location data and time, proximity to other identifiable devices, proximity to other individuals and activities conducted on the one or more processors.

18. The method of claim 14, wherein the full classification is based on at least one policy and at least one data set, establish a trust level in the range of 1 to 100 and assign it to the classification entry, and wherein the trust level of the classification entry degrades over time according to the at least one rule.

19. The method of claim 14, wherein collecting the data is at least described using common standards, stored in a data base for determination of repeats of prior occurrences, and mapped into a mathematical universe uniquely created for a user.

20. The method of claim 19, wherein the characteristics of the mapping is one directional in nature such that the original metrics can no longer be reverse mapped once mapping has occurred, and wherein the mapping maintains relative distance between occurrences in a manner such that a repeat of prior occurrences can continue to be detected for supporting the validity of the trust level.

21. The method of claim 19, wherein when two or more users share data used to determine their individual trust levels a new mathematical universe is created unique to this relationship.

22. The method of claim 14, wherein the first sensor generates acceleration and rate about an axis of travel over time, wherein the data generated represents a route, wherein the route has a shape, and wherein the shape of the route is stored as user data.

23. The method of claim 22, wherein the data generated by the first sensor includes a rate and an acceleration and is location independent.

24. The method of claim 22, wherein the data generated by the first sensor includes a rate and an acceleration and is used to support trust values.

25. The method of claim 14, wherein the first sensor generates data related to a user's activities over time, wherein the user's activities have been at least one of pre-defined by a user and collected from a data generating device and stored, and wherein the stored data includes a match to at least one activity and a variance.

26. The method of claim 25, wherein the stored data is independent from a user's identity.

* * * * *